US008308862B2

(12) United States Patent
Kawanishi et al.

(10) Patent No.: US 8,308,862 B2
(45) Date of Patent: Nov. 13, 2012

(54) OPTICAL CELLULOSE ACYLATE FILM, POLARIZING PLATE AND LIQUID CRYSTAL DISPLAY DEVICE

(75) Inventors: Hiroyuki Kawanishi, Minami-Ashigara (JP); Yosuke Nishiura, Minami-Ashigara (JP); Takako Nishiura, legal representative, Odawara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 1213 days.

(21) Appl. No.: 11/596,562

(22) PCT Filed: May 13, 2005

(86) PCT No.: PCT/JP2005/009204
§ 371 (c)(1),
(2), (4) Date: Apr. 18, 2008

(87) PCT Pub. No.: WO2005/111124
PCT Pub. Date: Nov. 24, 2005

(65) Prior Publication Data
US 2008/0254236 A1 Oct. 16, 2008

(30) Foreign Application Priority Data

May 14, 2004 (JP) .............................. P2004-145294
Jun. 14, 2004 (JP) .............................. P2004-175904

(51) Int. Cl.
*C08L 1/12* (2006.01)
*C08L 1/00* (2006.01)
*C09D 101/12* (2006.01)
*C09D 101/00* (2006.01)
*C09J 101/12* (2006.01)

(52) U.S. Cl. ................ 106/171.1; 106/168.01; 264/208; 264/288.4; 264/291

(58) Field of Classification Search ............. 106/168.01, 106/171.1; 264/208, 288.4, 291
See application file for complete search history.

(56) References Cited

U.S. PATENT DOCUMENTS

| 4,839,113 | A | * | 6/1989 | Villaine et al. ................ 264/28 |
| 5,856,468 | A | * | 1/1999 | Shuto et al. .................... 536/64 |
| 5,977,347 | A | * | 11/1999 | Shuto et al. .................... 536/64 |
| 6,139,785 | A | * | 10/2000 | Shuto et al. .................. 264/207 |
| 6,630,973 | B1 | | 10/2003 | Matsuoka et al. |
| 2003/0020208 | A1 | | 1/2003 | Tasaka et al. |
| 2004/0001175 | A1 | * | 1/2004 | Ito ................................ 349/117 |
| 2004/0180149 | A1 | * | 9/2004 | Shibue et al. ................... 428/1.1 |
| 2005/0046074 | A1 | * | 3/2005 | Tasaka et al. .................. 264/207 |
| 2005/0142304 | A1 | * | 6/2005 | Kawanishi et al. ........... 428/1.31 |
| 2005/0163923 | A1 | * | 7/2005 | Sasada ........................... 427/160 |
| 2005/0186360 | A1 | * | 8/2005 | Oya et al. ........................ 428/1.1 |
| 2007/0172605 | A1 | * | 7/2007 | Ohtani et al. ................. 428/1.31 |
| 2007/0195226 | A1 | * | 8/2007 | Aminaka et al. ................ 349/96 |
| 2008/0226888 | A1 | * | 9/2008 | Kawanishi et al. ........... 428/220 |
| 2008/0309860 | A1 | * | 12/2008 | Nimura et al. ................ 349/117 |
| 2009/0027599 | A1 | * | 1/2009 | Ohgaru et al. ................... 349/96 |

FOREIGN PATENT DOCUMENTS

| CN | 1343314 A | | 4/2002 |
| EP | 0 911 656 B1 | | 4/1999 |
| EP | 1164391 A1 | | 12/2001 |
| JP | A-2001-166144 | | 6/2001 |
| JP | 2002-22956 A | | 1/2002 |
| JP | 2002-71957 A | | 3/2002 |
| JP | A-2002-189126 | | 7/2002 |
| JP | 2003-84271 A | | 3/2003 |
| JP | 2003-96209 A | | 4/2003 |
| JP | 2003-170492 A | | 6/2003 |
| JP | 2003-270442 A | | 9/2003 |
| JP | 2003-279729 A | | 10/2003 |
| JP | 2003-315551 A | | 11/2003 |
| JP | 2004-2883 A | | 1/2004 |
| JP | 2004-099775 A | | 4/2004 |
| JP | 2004-131637 A | | 4/2004 |
| JP | 2005017574 A | * | 1/2005 |
| KR | 10-2002-0091783 | | 12/2002 |

OTHER PUBLICATIONS

Machine Translation of JP 2005017574 A, 2011.*
Hatsumei Kyokai Kokai Giho (Journal of technical disclosure issued by Japan Institute of Invention and Innovation), Kogi No. 2001-1745, Mar. 15, 2001, pp. 2-6 "3.Embodiment".
Official Action issued in the corresponding Taiwanese Patent Application No. 094115577, Aug. 3, 2007.
Office Action issued Feb. 14, 2012 in corresponding Korean application No. 2006-7023860, with English language translation.

* cited by examiner

*Primary Examiner* — Liam Heincer
(74) *Attorney, Agent, or Firm* — Buchanan Ingersoll & Rooney PC

(57) ABSTRACT

An optical cellulose acylate film comprising a polymer component which is a cellulose acylate obtained by substituting hydroxyl groups of a cellulose by an acetyl group and an acyl group having 3 or more carbon atoms, wherein a substitution degree A of the acetyl group and a substitution degree B of the acyl group having 3 or more carbon atoms satisfy the following formulae (I) and (II): $2.0 \leq A+B \leq 3.0$ (I), $0<B$ (II), and the optical cellulose acylate film comprises a retardation-expressing agent which is at least one of a rod-like compound and a discotic compound or an elastic modulus E(MD) in a casting direction and an elastic modulus E(TD) in a casting width direction satisfy the following formulae (III) and (IV): $1{,}500 \text{ MPa} \leq E(MD) \leq 3{,}400 \text{ Mpa}$ (III) and $1{,}200 \text{ MPa} \leq E(TD) \leq 3{,}400 \text{ Mpa}$ (IV).

26 Claims, 1 Drawing Sheet

OPTICAL CELLULOSE ACYLATE FILM, POLARIZING PLATE AND LIQUID CRYSTAL DISPLAY DEVICE

TECHNICAL FIELD

The present invention relates to an optical cellulose acylate film, a polarizing plate using the film as the optical compensatory sheet, and a liquid crystal display device.

BACKGROUND ART

A liquid crystal display device is being widely used for monitors of personal computer or portable device and for televisions because of its various advantageous features, for example, operation with low voltage/low power-consumption and reduction in size/thickness of film can be realized. For such a liquid crystal display device, various modes have been proposed according to the aligned state of liquid crystal molecules in the liquid crystal cell. Conventionally, a TN mode having an aligned state such that liquid crystal molecules are twisted at about 90° toward the upper substrate from the lower substrate of the liquid cell is predominating.

In general, a liquid crystal display device comprises a liquid crystal cell, an optical compensatory sheet and a polarizer. The optical compensatory sheet is used for canceling the coloration of image or enlarging the viewing angle, and a film obtained by coating a liquid crystal on a stretched birefringent film or transparent film is used therefor. For example, Japanese Patent No. 2587398 discloses a technique where an optical compensatory sheet obtained by coating, aligning and fixing a discotic liquid crystal on a triacetyl cellulose film is applied to a TN-mode liquid crystal cell to enlarge the viewing angle.

However, the demand with respect to the viewing angle dependency of a liquid crystal display device for televisions having a large screen and being envisaged for viewing from various angles is severe and this requirement cannot be satisfied by the above-described technique. Therefore, liquid crystal display devices different from the TN mode are being studied, such as IPS (in-plane switching) mode, OCB (optically compensatory bend) mode and VA (vertically aligned) mode. Particularly, the VA mode assures high contrast and relatively high production yield and is attracting attention as a liquid crystal display device for TV.

Incidentally, the cellulose acylate film is characterized in that the optical isotropy is high (the retardation value is low) as compared with other polymer films. Accordingly, a cellulose acylate film is commonly used for usage where optical isotropy is required, such as polarizing plate.

On the other hand, the optical compensatory sheet (retardation film) of liquid crystal display device is contrarily required to have optical anisotropy (high retardation value). Particularly, the optical compensatory sheet for VA is required to have a front retardation (e) of 30 to 200 nm and a retardation (Rth) of 70 to 400 nm in the film thickness direction. Therefore, a synthetic polymer film having a high retardation value, such as polycarbonate film and polysulfone film, is commonly used for the optical compensatory sheet. The front retardation value and the retardation value in the film thickness direction are optical characteristic values calculated according to the following formulae (2) and (3), respectively:

$$Re=(nx-ny)\times d \quad \text{Formula (2)}$$

$$Rth=\{(nx+ny)/2-nz\}\times d \quad \text{Formula (3)}$$

(wherein nx is a refractive index in the x direction in the film plane, ny is a refractive index in the y direction in the film plane, nz is a refractive index in the direction orthogonal to the film surface, and d is a thickness (μm) of film).

In this way, it is a general principle in the technical field of optical materials to use a synthetic polymer film when optical anisotropy (high retardation value) is required of the polymer film, and use a cellulose acylate film when optical isotropy (low retardation value) is required.

In EP-A-0911656, by reversing this conventional general principle, use of a cellulose acetate film with a high retardation value usable also for usage requiring optical anisotropy has been proposed. According to this technique, in order to realize a high retardation value with cellulose triacetate, an aromatic compound having at least two aromatic rings, particularly, a compound having 1,3,5-triazine ring is added and then the film is stretched. In general, the cellulose triacetate is a polymer material difficult to stretch and known to be hardly increased in the birefringence, but the additive is simultaneously oriented at the stretching, whereby the birefringence is elevated and a high retardation value is realized. This film can serve also as a protective film for the polarizing plate and an inexpensive thin-film liquid crystal display device can be advantageously provided.

JP-A-2002-71957 discloses an optical film comprising a cellulose ester which contains an acyl group having from 2 to 4 carbon atoms as a substituent and assuming that the substitution degree of acetyl group is A and the substitution degree of propionyl or butyryl group is B, satisfies both of the following conditions:

$$2.0 \leq A+B \leq 3.0, \text{ and}$$

$$A<2.4,$$

wherein the refractive index Nx in the slow axis direction and the refractive index Ny in the fast axis direction at a wavelength of 590 nm satisfy the following condition:

$$0.0005 \leq Nx-Ny \leq 0.0050.$$

JP-A-2003-270442 discloses a polarizing plate for use in VA-mode liquid crystal display devices, which comprises a polarizer and an optically biaxial mixed fatty acid cellulose ester film and in which the optically biaxial mixed fatty acid cellulose ester film is disposed between the liquid crystal cell and the polarizer.

DISCLOSURE OF THE INVENTION

The methods disclosed in these patent publications are effective in that an inexpensive thin liquid crystal display device can be obtained. However, the opportunity of using a liquid crystal display device in various environments such as high humidity and high temperature is recently increasing, and the cellulose ester film utilizing the above-described techniques has a problem that the optical compensatory function decreases in such environments. Particularly, in the case of a cellulose ester film with a high Re retardation value and a high Rth retardation value utilizing the above-described technique, there is a problem that the Re retardation value and Rth retardation value are changed depending on the temperature or humidity and the optical compensation ability varies. In the high-humidity environment, another problem arises, that is, the film undergoes dimensional change and the optical compensation ability varies.

Therefore, it is demanded to develop a film less undergoing such change in the optical compensation ability due to environment and being capable of giving an inexpensive thin liquid crystal display device.

An object of the present invention is to provide an optical film ensuring excellent expression of retardation in both the frontal direction and the film thickness direction as well as less fluctuation of the retardation value due to environment such as humidity.

One of other objects of the present invention is to provide an optical film capable of expressing retardation with excellent wavelength dispersion property in the frontal and thickness directions and giving a liquid crystal display device having excellent properties with respect to the viewing angle, contrast and change in black color tint.

One of other objects of the present invention is to provide a liquid crystal display device undergoing less change in the viewing angle properties even when the environment is changed, and a polarizing plate for use in the liquid crystal display device.

As a result of intensive investigations to achieve these objects, the present inventors have found that it is effective to control the substitution degree of the raw material cellulose acylate for the cellulose acylate film. The present inventors have further made studies and found that when the specific substitution degree is taken and the specific retardation-expressing agent is used, the above-described objects can be attained, and in addition, when not only the substitution degree but also the elastic modulus and sound velocity are specified, the above-described objects can be attained. The present invention has been accomplished based on these findings.

That is, according to the present invention, an optical cellulose acylate film, a production method thereof, a polarizing plate and a liquid crystal display device, which are constituted as follows, are provided, whereby the objects of the present invention can be attained.

1. An optical cellulose acylate film with the film-constituting polymer component substantially comprising a cellulose acylate which is a mixed fatty acid ester of a cellulose obtained by substituting the hydroxyl groups of a cellulose by an acetyl group and an acyl group having 3 or more carbon atoms, wherein (i) the substitution degree A of the acetyl group and the substitution degree B of the acyl group having 3 or more carbon atoms satisfy the following Formulae (I) and (II):

$$2.0 \leq A+B \leq 3.0 \qquad \text{Formula (I)}$$

$$0 < B \qquad \text{Formula (II)}$$

and (ii) the optical cellulose acylate film comprises a retardation-expressing agent which is at least one of a rod-like compound and a discotic compound.

2. An optical cellulose acylate film with the film-constituting polymer component substantially comprising a cellulose acylate which is a mixed fatty acid ester of a cellulose obtained by substituting the hydroxyl groups of a cellulose by an acetyl group and an acyl group having 3 or more carbon atoms, wherein (i) the substitution degree A of the acetyl group and the substitution degree B of the acyl group having 3 or more carbon atoms satisfy the following Formulae (I) and (II):

$$2.0 \leq A+B \leq 3.0 \qquad \text{Formula (I)}$$

$$0 < B \qquad \text{Formula (II)}$$

and (ii) the elastic modulus E(MD) in the casting (transportation) direction and the elastic modulus E(TD) in the casting width direction (direction perpendicular to casting) satisfy the following Formulae (III) and (IV):

$$1{,}500 \text{ MPa} \leq E(MD) \leq 3{,}400 \text{ MPa} \qquad \text{Formula (III)}$$

$$1{,}200 \text{ MPa} \leq E(TD) \leq 3{,}400 \text{ MPa}. \qquad \text{Formula (IV)}$$

3. The optical cellulose acylate film as described in 2 above, wherein the sound velocity V(MD) in the casting (transportation) direction and the sound velocity V(TD) in the casting width direction (direction perpendicular to casting) satisfy the following Formulae (V) and (VI):

$$1.0 \text{ km/s} \leq V(MD) \leq 3.0 \text{ km/s} \qquad \text{Formula (V)}$$

$$1.0 \text{ km/s} \leq V(TD) \leq 3.0 \text{ km/s}. \qquad \text{Formula (VI)}$$

4. The optical cellulose acylate film as described in 2 or 3 above, wherein the elastic moduli E(MD) and E(TD) satisfy the following Formula (VII):

$$0.5 \leq E(MD)/E(TD) \leq 2 \qquad \text{Formula (VII)}$$

5. The optical cellulose acylate film as described in any one of 2 to 4 above, wherein the sound velocities V(MD) and V(TD) satisfy the following Formula (VIII):

$$0.5 \leq V(MD)V(TD) \leq 2 \qquad \text{Formula (VIII)}$$

6. The optical cellulose acylate film as described in any one of 1 to 5 above, wherein the acyl group is a butanoyl group.

7. The optical cellulose acylate film as described in any one of 1 to 6 above, wherein the acyl group is a propionyl group and the substitution degree B is 0.6 or more.

8. The optical cellulose acylate film as described in any one of 1 to 7 above, wherein $Re(\lambda)$ and $Rth(\lambda)$ defined by the following Formulae (IX) and (X) satisfy the following Formulae (XI) and (XII):

$$Re(\lambda)=(nx-ny) \times d \qquad \text{Formula (IX)}$$

$$Rth(\lambda)=\{(nx+ny)/2-nz\} \times d \qquad \text{Formula (X)}$$

$$30 \text{ nm} < Re_{(590)} \leq 200 \text{ nm} \qquad \text{Formula (XI)}$$

$$70 \text{ nm} \leq Rth_{(590)} \leq 400 \text{ nm} \qquad \text{Formula (XII)}$$

[wherein $Re(\lambda)$ is a front retardation value (unit: nm) at a wavelength of $\lambda$ nm, $Rth(\lambda)$ is a retardation value (unit: nm) in the film thickness direction at a wavelength of $\lambda$ nm, nx is a refractive index in the slow axis direction in the film plane, ny is a refractive index in the fast axis direction in the film plane, nz is a refractive index in the film thickness direction, and d is a film thickness].

9. The optical cellulose acylate film as described in 8 above, wherein $Re_{(590)}$ and $Rth_{(590)}$ satisfy the following Formulae (XIII) and (XIV):

$$40 \leq Re_{(590)} \leq 100 \qquad \text{Formula (XIII)}$$

$$170 \text{ nm} \leq Rth_{(590)} \leq 300 \text{ nm}. \qquad \text{Formula (XIV)}$$

10. The optical cellulose acylate film as described in any one of 1 to 9 above, wherein $Re_{(630)}$ and $Rth_{(630)}$ measured at 25° C. and an ambient humidity of 60% RH satisfy the following formulae (A) to (C):

$$46 \leq Re_{(630)} \leq 150 \qquad \text{Formula (A)}$$

$$Rth_{(630)}=a-5.9Re_{(630)} \qquad \text{Formula (B)}$$

$$580 \leq a \leq 670 \qquad \text{Formula (C)}$$

11. The optical cellulose acylate film as described in any one of 1 to 10 above, wherein $Re_{(400)}$, $Re_{(550)}$, $Re_{(700)}$, $Rth_{(400)}$, $Rth_{(550)}$ and $Rth_{(700)}$ satisfy the following formulae:

$$Re_{(400)} < Re_{(550)} < Re_{(700)} \quad \text{Formula (D1)}$$

$$Rth_{(400)} > Rth_{(550)} > Rth_{(700)} \quad \text{Formula (E1)}$$

12. The optical cellulose acylate film as described in any one of 1 to 11 above, wherein $Re_{(400)}$, $Re_{(550)}$, $Re_{(700)}$, $Rth_{(400)}$, $Rth_{(550)}$ and $Rth_{(700)}$ satisfy the following formulae (D2) and (E2):

$$0.2 \leq Re_{(400)}/Re_{(550)} \leq 0.8,\ 1.7 \geq Re_{(700)}/Re_{(550)} \geq 1.2 \quad \text{Formula (D2)}$$

$$1.7 \geq Rth_{(400)}/Rth_{(550)} \geq 0.90,\ 0.2 \leq Rth_{(700)}/Rth_{(550)} \leq 1.1 \quad \text{Formula (E2)}$$

13. The optical cellulose acylate film as described in any one of 1 to 12 above, wherein the moisture permeability (in terms of moisture permeability with a film thickness of 80 μm) at 60° C.–95% RH for 24 hours is from 400 to 3,500 g/m²·24 hr.

14. The optical cellulose acylate film as described in any one of 2 to 13 above, which comprises at least one retardation-expressing agent comprising a rod-like or discotic compound.

15. The optical cellulose acylate film as described in any one of 1 to 14 above, which comprises at least one member of a plasticizer, an ultraviolet absorbent and a separation accelerator.

16. The optical cellulose acylate film as described in any one of 1 to 15 above, wherein the film thickness is from 40 to 180 μm.

17. The optical cellulose acylate film as described in any one of 8 to 16 above, wherein the difference ΔRe (=Re10% RH−Re80% RH) between the Re value at 25° C.–10% RH and the Re value at 25° C.–80% RH is from 0 to 10 nm and the difference ΔRth (=Rth10% RH−Rth80% RH) between the Rth value at 25° C.–10% RH and the Rth value at 25° C.–80% RH is from 0 to 30 nm.

18. The optical cellulose acylate film as described in any one of 1 to 17 above, which is stretched by a monoaxial stretching method, a simultaneous biaxial stretching method or a successive biaxial stretching method.

19. The optical cellulose acylate film as described in 1 to 18 above, which is stretched at a temperature higher than the glass transition temperature of the film by 30 to 100° C.

20. The optical cellulose acylate film as described in any one of 1 to 19 above, wherein assuming that the maximum value, minimum value and average value of the film thickness in the width direction are Rmax, Rmin and Rave, respectively, the film thickness distribution R calculated according to R (%)=[(Rmax−Rmin)/Rave]×100 is adjusted to 0 to 8%.

21. The optical cellulose acylate film as described in any one of 1 to 20 above, wherein the $Re_{(590)}$ distribution is adjusted to 5% or less.

22. The optical cellulose acylate film as described in any one of 1 to 21 above, wherein the $Re_{(590)}$ distribution is adjusted to 10% or less.

23. A polarizing plate comprising a polarizer and two polarizing films for the polarizer, with at least one polarizing film comprising the optical cellulose acylate film described in any one of 1 to 22 above.

24. The polarizing plate as described in 23 above, wherein the single plate transmittance TT, parallel transmittance PT, cross transmittance CT and polarization degree P of the polarizing plate as measured at 25° C.–60% RH satisfy at least one of the following formulae (a) to (d):

$$40.0 \leq TT \leq 45.0 \quad (a)$$

$$30.0 \leq PT \leq 40.0 \quad (b)$$

$$CT \leq 2.0 \quad (c)$$

$$95.0 \leq P. \quad (d)$$

25. The polarizing plate as described in 23 or 24 above, wherein assuming that the cross transmittance at a wavelength of λ is T(λ), T(380), T(410) and T(700) satisfy at least one of the following formulae (e) to (g):

$$T(380) \leq 2.0 \quad (e)$$

$$T(410) \leq 0.1 \quad (f)$$

$$T(700) \leq 0.5. \quad (g)$$

26. The polarizing plate as described in 23 to 25 above, wherein when the polarizing plate is left standing at 60° C.–95% RH for 500 hours, the variation ΔCT of single plate cross transmittance and the variation ΔP of polarization degree satisfy at least one of the following formulae (j) and (k) (here, the variation means a value obtained by subtracting the measured value before standing for 500 hours from the measured value after standing for 500 hours):

$$-6.0 \leq \Delta CT \leq 6.0 \quad (j)$$

$$-10.0 \leq \Delta P \leq 0.0. \quad (k)$$

27. The polarizing plate as described in 26 above, wherein when the polarizing plate is left standing at 60° C.–90% RH for 500 hours, the variation ΔCT of single plate cross transmittance and the variation ΔP of polarization degree satisfy at least one or more of the following formulae (h) and (i):

$$-3.0 \leq \Delta CT \leq 3.0 \quad (h)$$

$$-5.0 \leq \Delta P \leq 0.0. \quad (i)$$

28. The polarizing plate as described in 27 above, wherein when the polarizing plate is left standing at 80° C. for 500 hours, the variation ΔCT of single plate cross transmittance and the variation ΔP of polarization degree satisfy at least one or more of the following formulae (l) and (m):

$$-3.0 \leq \Delta CT \leq 3.0 \quad (l)$$

$$-2.0 \leq \Delta P \leq 0.0. \quad (m)$$

29. The polarizing plate as described in 23 to 28 above, wherein at least one layer of a hard coat layer, an antiglare layer and an antireflection layer is provided on the surface of one protective film for the polarizer.

30. A liquid crystal display device comprising either the optical acylate film described in 1 to 18 above or the polarizing plate described in 23 to 29 above.

31. An OCB- or VA-mode liquid crystal display device using any one of the polarizing plates described in 23 to 29 above on the top and bottom of a cell.

32. A VA-mode liquid crystal display device using any one sheet of the polarizing plates described in 23 to 29 above on the backlight side.

The optical cellulose acylate film of the present invention ensures excellent expression of retardation both in the front and in the film thickness direction and less fluctuation of retardation value due to environment such as humidity.

The polarizing plate of the present invention using such an optical cellulose acylate film for the protective film of the polarizer gives a liquid crystal display device undergoing less change in the viewing angle properties even when the environment (humidity) is changed.

The optical cellulose acylate film of the present invention can express retardation with excellent wavelength dispersion property in the frontal and thickness directions and giving a liquid crystal display device having excellent properties with respect to the viewing angle, contrast and change in black color tint.

The liquid crystal display device of the present invention comprising the optical cellulose acylate film or polarizing plate of the present invention undergoes less change in the viewing angle properties even when the environment (humidity) is changed.

BEST MODE FOR CARRYING OUT THE INVENTION

Figure 1:
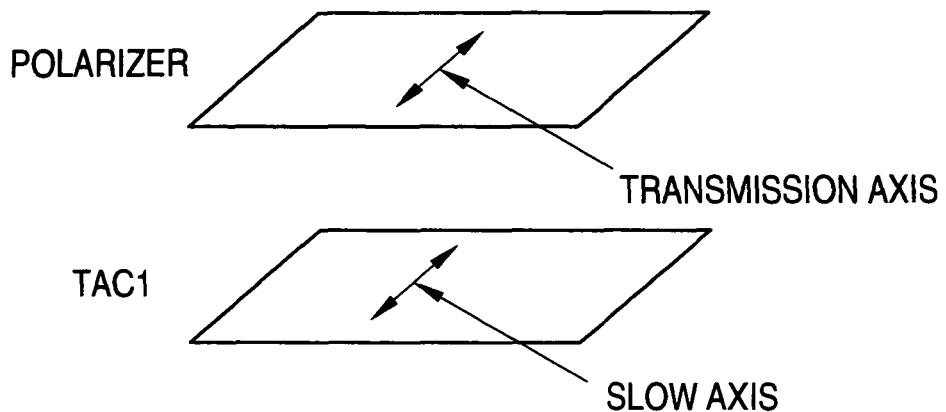
[FIG. 1] A schematic view showing the method of laminating the cellulose acylate film at the production of the polarizing plate of the present invention.

The present invention is described in detail below. In the present invention, when a numerical value denotes a physical property value, a characteristic value or the like, the term "from (numerical value 1) to (numerical value 2)" means "(numerical value 1) or more and (numerical value 2) or less". Also, the term "(meth)acryloyl" means "at least either one of acryloyl and methacryloyl". The same applies to "(meth)acrylate", "(meth)acrylic acid" and the like. Furthermore, when a hydrogen atom is replaced by an atom except for a hydrogen atom, the atom except for a hydrogen atom is expediently dealt with as a substituent.

The optical cellulose acylate film of the present invention is described below. The cellulose acylate film of a first embodiment of the present invention is characterized in that:

(i) in the cellulose acylate constituting the film, the substitution degree A of acetyl group and the substitution degree B of acyl group having 3 or more carbon atoms satisfy the following Formulae (I) and (II):

$$2.0 \leq A+B \leq 3.0 \quad \text{Formula (I)}$$

$$0 < B \quad \text{Formula (II)}$$

and (ii) the optical cellulose acylate film comprises a retardation-expressing agent which is at least one of a rod-like compound and a discotic compound.

The cellulose acylate film of a second embodiment of the present invention is characterized in that:

(i) in the cellulose acylate constituting the film, the substitution degree A of acetyl group and the substitution degree B of acyl group having 3 or more carbon atoms satisfy the following Formulae (I) and (II):

$$2.0 \leq A+B \leq 3.0 \quad \text{Formula (I)}$$

$$0 < B \quad \text{Formula (II)}$$

and (iii) the elastic modulus E(MD) in the casting (transportation) direction and the elastic modulus E(TD) in the casting width direction (direction perpendicular to casting) satisfy the following Formulae (III) and (IV):

$$1,500 \text{ MPa} \leq E(MD) \leq 3,400 \text{ MPa} \quad \text{Formula (III)}$$

$$1,200 \text{ MPa} \leq E(TD) \leq 3,400 \text{ MPa.} \quad \text{Formula (IV)}$$

In this way, the cellulose acylate film of the present invention is formed by using a specific cellulose acylate as the raw material.

[Cellulose Acylate]

The specific cellulose acylate for use in the present invention is described in detail below. In the present invention, two or more different cellulose acylates may be used as a mixture.

The specific cellulose acylate is a mixed fatty acid ester of a cellulose obtained by substituting the hydroxyl groups of a cellulose by an acetyl group and an acyl group having 3 or more carbon atoms, and this is a cellulose acylate where the substitution degrees to the hydroxyl groups of a cellulose satisfy the following Formulae (I) and (II):

$$2.0 \leq A+B \leq 3.0 \quad \text{Formula (I)}$$

$$0 < B \quad \text{Formula (II)}$$

wherein A and B each represents a substitution degree of acyl group substituted to the hydroxyl group of cellulose, A is a substitution degree of acetyl group, and B is a substitution degree of acyl group having 3 or more carbon atoms.

The β-1,4-bonded glucose unit constituting the cellulose has a free hydroxyl group at the 2-position, 3-position and 6-position. The cellulose acylate is a polymer where these hydroxyl groups are partially or entirely esterified by an acyl group. The acyl substitution degree is defined as a ratio of esterification of the cellulose at each of the 2-position, 3-position and 6-position (100% esterification is a substitution degree: of 1). When all hydroxyl groups at each of the 2-position, 3-position and 6-position are esterified, the sum total (A+B) of the substitution degrees A and B is calculated as 3.

In the present invention, the sum total (A+B) of the substitution degrees A and B to the hydroxyl groups (the sum of the substitution degrees A regarding the 2-position, the substitution degrees A regarding the 3-position, the substitution degrees A regarding the 6-position, the substitution degrees B regarding the 2-position, the substitution degrees B regarding the 3-position and the substitution degrees B regarding the 6-position) is from 2.0 to 3.0 as shown in formula (I), preferably from 2.2 to 2.9, more preferably from 2.40 to 2.85. The substitution degree B is a value exceeding 0 as shown in formula (II), preferably from 0.5 to 2.5, more preferably from 0.6 to 2.0, and still more preferably from 0.7 to 1.8.

If A+B is less than 2.0, the hydrophilicity is intensified and the film is readily affected by the ambient humidity.

If B is 0 and a cellulose acetate result, the film is readily affected by the ambient humidity.

In B, the substitution degree to the hydroxyl group at the 6-position preferably occupies 28% or more, more preferably 30% or more, still more preferably 31% or more, yet still more preferably 32% or more.

The sum total of the substitution degrees A and B to the hydroxyl group at the 6-position of cellulose acylate is preferably 0.75 or more, more preferably 0.80 or more, still more preferably 0.85 or more. In the case of such a cellulose acylate film, a solution with good solubility and filterability for the preparation of film can be produced and even with a chlorine-free organic solvent, a good solution can be produced. Furthermore, a solution having low viscosity and good filterability can be prepared.

The acyl group having 3 or more carbon atoms may be an aliphatic group or an aromatic hydrocarbon group and is not particularly limited. The cellulose acylate is, for example, an alkylcarbonyl ester, alkenylcarbonyl ester, aromatic carbonyl ester or aromatic alkylcarbonyl ester of cellulose, which may further have a substituted group. Preferred examples for B include a propionyl group, a butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a tert-butanoyl group, a cyclohexanecarbonyl group, an oleyl group, a benzoyl group, a naphthylcarbonyl group and a cinnamoyl group. Among these, more preferred are a propionyl group, a butanoyl group, a dodecanoyl group, an octadecanoyl group, a tert-butanoyl group, an oleoyl group, a benzoyl group, a naphthylcarbonyl group and a cinnamoyl group, still more preferred are a propionyl group and a butanoyl group. In the case of a propionyl group, the substitution degree B is preferably 1.3 or more.

Specific examples of the cellulose acylate include cellulose acetate propionate and cellulose acetate butyrate.

[Synthesis Method of Cellulose Acylate]

The basic principle of the synthesis method of cellulose acylate is described in Migita, et al., *Mokuzai Kagaku* (*Wood Chemistry*), pp. 180-190, Kyoritsu Shuppan (1968). A representative synthesis method is a liquid phase acetylation method using a carboxylic anhydride-acetic acid-sulfuric acid catalyst.

More specifically, a cellulose raw material such as cotton linter and wood pulp is pretreated with an appropriate amount of acetic acid and then charged into a previously cooled carboxylating mixed solution, thereby effecting esterification to synthesize a perfect cellulose acylate (the total of acyl substitution degrees at the 2-position, 3-position and 6-position is almost 3.00). The carboxylating mixed solution generally comprises an acetic acid as a solvent, a carboxylic anhydride as an esterifying agent, and a sulfuric acid as a catalyst. The carboxylic anhydride is usually used stoichiometrically in excess of the total of the cellulose with which the carboxylic acid reacts, and the moisture present in the system. After the completion of esterification reaction, an aqueous solution of neutralizer (for example, carbonate, acetate or oxide of calcium, magnesium, iron, aluminum or zinc) is added for hydrolyzing the excess carboxylic anhydride remaining in the system and partially neutralizing the esterification catalyst. The obtained perfect cellulose acylate is kept at 50 to 90° C. in the presence of a slight amount of a acetylation reaction catalyst (generally, remaining sulfuric acid), thereby effecting saponification and ripening to change into a cellulose acylate having desired acyl substitution degree and polymerization degree. At the time when the desired cellulose acylate is obtained, the cellulose acylate is separated by completely neutralizing the catalyst remaining in the system with use of the above-described neutralizer or instead of neutralization, charging the cellulose acylate solution into water or dilute sulfuric acid (or charging water or dilute sulfuric acid into the cellulose acylate solution), and then subjected to washing and stabilization, whereby the specific cellulose acylate can be obtained.

In the cellulose acylate film, the polymer component constituting the film preferably comprising substantially the above-described specific cellulose acylate. The term "substantially" means 55 mass % (weight %) or more (preferably 70 mass % or more, more preferably 80 mass % or more) of the polymer component.

The cellulose acylate is preferably used in the particle form. Also, 90 mass % or more of the particle used preferably has a particle diameter of 0.5 to 5 mm, and 50 mass % or more of the particle used preferably has a particle diameter of 1 to 4 mm. The cellulose acylate particle preferably has a shape close to sphere as much as possible.

The polymerization degree of the cellulose acylate preferably used in the present invention is, in terms of viscosity average polymerization degree, preferably from 200 to 700, more preferably 250 to 550, still more preferably from 250 to 400, yet still more preferably from 250 to 350. The average molecular weight can be measured according to the limiting viscosity method by Uda, et al. (Kazuo Uda and Hideo Saito, *JOURNAL OF THE SOCIETY OF FIBER SCIENCE AND TECHNOLOGY, JAPAN*, Vol. 18, No. 1, pp. 105-120 (1962)). Furthermore, this is described in detail in JP-A-9-95538.

When low molecular components are removed, the viscosity becomes lower than that of normal cellulose acylates despite increase in the average molecular weight (polymerization degree) and therefore, a cellulose acylate from which the low molecular components are moved is useful as the above-described cellulose acylate. The cellulose acylate reduced in low molecular components can be obtained by removing low molecular components from a cellulose acylate synthesized according to a normal method. The low molecular components can be removed by washing the cellulose acylate with an appropriate solvent. In the case of producing a cellulose acylate reduced in low molecular components, the amount of the sulfuric acid catalyst in the acetylation reaction is preferably adjusted to 0.5 to 25 parts by mass per 100 parts by mass of the cellulose acylate. When the amount of the sulfuric acid catalyst is adjusted to this range, a cellulose acylate preferred also in view of molecular weight distribution (having a uniform molecular weight distribution) can be synthesized. In use for the production of a cellulose acylate, the water content thereof is preferably 2 mass % or less, more preferably 1 mass % or less, still more preferably 0.7 mass % or less. The cellulose acylate in general contains water and the water content is generally from 2.5 to 5 mass %. For obtaining this water content, drying is preferably performed and the method therefor is not particularly limited as long as the objective water content can be obtained.

As for the raw material cotton and synthesis method of cellulose acylate, the raw material cotton and synthesis method described in detail in *JIII Journal of Technical Disclosure*, No. 2001-1745, pp. 7-12, Japan Institute of Invention and Innovation (Mar. 15, 2001) can be employed.

The cellulose acylate film of the present invention can be obtained by dissolving the specific cellulose acylate and, if desired, additives in an organic solvent and forming a film from the resulting solution.

[Additives]

In the first embodiment of the present invention, examples of the additive which can be used in the above-described cellulose acylate solution include a plasticizer, an ultraviolet absorbent, a deterioration inhibitor, a fine particle, a separation accelerator and an infrared absorbent. In the second embodiment of the present invention, examples of the additive which can be used in the above-described cellulose acylate solution include a plasticizer, an ultraviolet absorbent, a deterioration inhibitor, a retardation (optical anisotropy) expressing agent, a fine particle, a separation accelerator and an infrared absorbent, and a retardation-expressing agent is preferably used. Also, one or more members of a plasticizer, an ultraviolet absorbent and a separation accelerator are preferably used.

These additives may be a solid or an oily product. That is, the melting point and boiling point thereof are not particularly limited. For example, a mixture of ultraviolet absorbents having a melting point of 20° C. or less and a melting point of 20° C. or more may be used. Similarly, a mixture of plasticizers may be used. These are described, for example, in JP-A-2001-151901.

The ultraviolet absorbent may be freely selected according to the purpose and, for example, salicylic acid ester-based, benzophenone-based, benzotriazole-based, benzoate-based, cyanoacrylate-based or nickel complex salt-based absorbents can be used. Among these, preferred are benzophenone-based, benzotriazole-based and salicylic acid ester-based absorbents. Examples of the benzophenone-based ultraviolet absorbent include 2,4-dihydroxybenzophenone, 2-hydroxy-4-acetoxybenzophenone, 2-hydroxy-4-methoxybenzophenone, 2,2'-dihydroxy-4-methoxybenzophenone, 2,2'-dihydroxy-4,4'-methoxybenzophenone, 2-hydroxy-4-n-octoxybenzophenone, 2-hydroxy-4-dodecyloxybenzophenone and 2-hydroxy-4-(2-hydroxy-3-methacryloxy)propoxybenzophenone. Examples of the benzotriazole-based ultraviolet absorbent include 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole, 2-(2'-hydroxy-3',5'-di-tert-butylphenyl)-5-chlorobenzotriazole and 2-(2'-hydroxy-5'-tert-octylphenyl)benzotriazole. Examples of the salicylic acid ester-based ultraviolet absorbent include phenyl salicylate, p-octylphenyl salicylate and p-tert-butylphenyl salicylate. Among these ultraviolet absorbents, preferred are 2-hydroxy-4-methoxybenzophenone, 2,2'-dihydroxy-4,4'-methoxybenzophenone, 2-(2'-hydroxy-3'-tert-butyl-5'-methylphenyl)-5-chlorobenzotriazole, 2-(2'-hydroxy-5'-tert-butylphenyl)benzotriazole, 2-(2'-hydroxy-3',5'-di-tert-amylphenyl)benzotriazole and 2-(2'-hydroxy-3',5'-di-tert-butylphenyl)-5-chlorobenzotriazole.

A plurality of ultraviolet absorbents differing in the absorption wavelength are preferably used in combination because a high shielding effect can be obtained over a wide wavelength range. The ultraviolet absorbent for liquid crystal preferably has excellent capability of absorbing ultraviolet light at a wavelength of 370 nm or less from the standpoint of preventing deterioration of liquid crystal, and absorbing less visible light at a wavelength 400 nm or more in view of liquid crystal display property. In particular, the ultraviolet absorbent is preferably the above-described benzotriazole-based compound, benzophenone-based compound or salicylic acid ester-based compound, with the benzotriazole-based compound being more preferred because of less occurrence of unnecessary coloration for the cellulose acylate.

Also, the compounds described in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509 and JP-A-2000-204173 can be used as the ultraviolet absorbent.

In the light of bringing out the effect by the addition and preventing the ultraviolet absorbent from bleeding out to the film surface, the amount of the ultraviolet absorbent added is preferably from 0.001 to 5 mass %, more preferably from 0.01 to 1 mass %, based on the cellulose acylate. The ultraviolet absorbent may be added simultaneously at the time of dissolving the cellulose acylate or may be added to the dope after the dissolution. In particular, a form of adding an ultraviolet absorbent solution to the dope using a static mixer or the like immediately before casting is preferred.

The ultraviolet absorbent may be added simultaneously at the time of dissolving the cellulose acylate or may be added to the dope after the dissolution. In particular, a mode of adding the ultraviolet absorbent solution to the dope immediately before casting by using a static mixer or the like is preferred because the spectral absorption properties can be easily adjusted.

The deterioration inhibitor prevents deterioration or decomposition of cellulose triacetate or the like. Examples of the deterioration inhibitor include compounds such as butylamine, hindered amine compound (JP-A-8-325537), guanidine compound (JP-A-5-271471), benzotriazole-based UV absorbent (JP-A-6-235819) and benzophenone-based UV absorbent (JP-A-6-118233).

The plasticizer is preferably a phosphoric acid ester or a carboxylic acid ester. Specific preferred examples of the plasticizer include triphenyl phosphate (TPP), tricresyl phosphate (TCP), cresyl diphenyl phosphate, octyl diphenyl phosphate, diphenyl biphenyl phosphate, trioctyl phosphate, tributyl phosphate, dimethyl phthalate (DMP), diethyl phthalate (DEP), dibutyl phthalate (DBP), dioctyl phthalate (DOP), diphenyl phthalate (DPP), diethylhexyl phthalate (DEHP), triethyl O-acetylcitrate (OACTE), tributyl O-acetylcitrate (OACTB), acetyltriethyl citrate, acetyltributyl citrate, butyl oleate, methylacetyl ricinoleate, dibutyl sebacate, triacetin, tributyrin, butylphthalyl butyl glycolate, ethylphthalyl ethyl glycolate, methylphthalyl ethyl glycolate and butylphthalyl butyl glycolate. More preferred plasticizers include (di)pentaerythritol esters, glycerol esters and diglycerol esters.

Examples of the separation accelerator include ethyl esters of citric acid, and examples of the infrared absorbent include those described in JP-A-2001-194522.

These additives may be added at any stage in the dope preparation step, but a step of adding the additives may be provided as a final preparation step of the dope preparation step. The amount of each material added is not particularly limited as long as its function can be exerted. When the cellulose acylate film is a multilayer film, the kind or amount added of the additive may be different among respective layers. This is a conventionally known technique described, for example, in JP-A-2001-151902.

The cellulose acylate filter of the present invention has an elastic modulus such that, as described above, the elastic modulus E(MD) in the casting (transportation) direction and the elastic modulus E(TD) in the casting width direction (direction perpendicular to casting) satisfy the following Formulae (III) and (IV). The elastic moduli E(MD) and E(TD) preferably satisfy the following Formula (VII). The elastic modulus can be measured by a tensile tester (Strography R2 (manufactured by Toyo Seiki Seisaku-Sho, Ltd.)).

$$1{,}500\ \mathrm{MPa} \leq E(MD) \leq 3{,}400\ \mathrm{MPa} \qquad \text{Formula (III)}$$

$$1{,}200\ \mathrm{MPa} \leq E(TD) \leq 3{,}400\ \mathrm{MPa}. \qquad \text{Formula (IV)}$$

$$0.5 \leq E(MD)/E(TD) \leq 2. \qquad \text{Formula (VII)}$$

The elastic modulus of the cellulose acylate film of the present invention can satisfy these Formulae by selecting the kind or amount added of the plasticizer.

The reasons why the elastic modulus E(MD) in the casting (transportation) direction and the elastic modulus E(TD) in the casting width direction (direction perpendicular to casting) are specified to satisfy Formulae (III) and (IV) are as follows. When the environment (humidity) is changed, shrinkage or expansion takes place in constituent portions of a polarizing plate comprising an adhesive layer, a retardation film, a polarizer, a protective film and the like, and a stress is generated between respective portions. When this stress is well balanced in the constituent portions of the polarizing plate, a liquid crystal display device with a polarizing plate undergoing less change in the viewing angle properties despite change in the ambient humidity is provided and thus good results are obtained.

The cellulose acylate film of the present invention preferably has a glass transition point Tg of 70 to 150° C., more preferably from 80 to 135° C. The glass transition point Tg can be measured by a dynamic viscoelasticity meter (Bibron DVA-225 (manufactured by IT Keisoku Seigyo K.K.)). The glass transition can also be adjusted to this range by appropriately selecting the kind or amount added of the plasticizer. In the cellulose acylate film of the present invention, the glass transition point Tg is preferably in the above-described range in view of suitability for the working of polarizing plate and for the step of fabricating a liquid crystal display device.

Furthermore, additives described in detail in *JIII Journal of Technical Disclosure*, No. 2001-1745, page 16 et seq., Japan Institute of Invention and Innovation (Mar. 15, 2001) can be appropriately used.

[Retardation-Expressing Agent]

In the first embodiment of the present invention, a retardation-expressing agent which is at least one of a rod-like compound and a discotic compound is used.

In the second embodiment of the present invention, a retardation-expressing agent is preferably used so as to attain expression of a preferred retardation value, and as the retardation-expressing agent, a rod-like or discotic compound is preferably used.

As for the rod-like or discotic compound, a compound having at least two aromatic rings can be used.

The amount added of the retardation-expressing agent comprising a rod-like compound is preferably from 0.1 to 30 parts by mass, more preferably from 0.5 to 20 parts by mass, per 100 parts by mass of the polymer components including the cellulose acylate.

The discotic retardation-expressing agent is preferably used in the range from 0.05 to 20 parts by mass, more preferably from 0.1 to 10 parts by mass, still more preferably from 0.2 to 5 parts by mass, and most preferably from 0.5 to 2 parts by mass, per 100 parts by mass of the polymer components including the cellulose acylate.

The discotic compound is superior to the rod-like compound in the Rth retardation-expressing property and therefore, is preferably used in the case where a large Rth retardation is particularly required.

Two or more retardation-expressing agents may be used in combination.

The retardation-expressing agent comprising a rod-like or discotic compound preferably has a maximum absorption in the wavelength region of 250 to 400 nm and preferably has substantially no absorption in the visible region.

The discotic compound is described below. As for the discotic compound, a compound having at least two aromatic rings can be used.

In the present invention, the "aromatic ring" includes an aromatic hydrocarbon ring and an aromatic heterocyclic ring.

The aromatic hydrocarbon ring is preferably a 6-membered ring (that is, benzene ring).

The aromatic heterocyclic ring is generally an unsaturated heterocyclic ring. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom. Examples of the aromatic heterocyclic ring include a furan ring, a thiophene ring, a pyrrole ring, an oxazole ring, an isoxazole ring, a thiazole ring, an isothiazole ring, an imidazole ring, a pyrazole ring, a furazan ring, a triazole ring, a pyran ring, a pyridine ring, a pyridazine ring, a pyrimidine ring, a pyrazine ring and a 1,3,5-triazine ring.

Preferred examples of the aromatic ring include a benzene ring, a furan ring, a thiophene ring, a pyrrole ring, an oxazole ring, a thiazole ring, an imidazole ring, a triazole ring, a pyridine ring, a pyrimidine ring, a pyrazine ring and a 1,3,5-triazine ring, with a 1,3,5-triazine ring being more preferred. Specifically, compounds disclosed, for example, in JP-A-2001-166144 are preferably used as the discotic compound.

The number of aromatic rings in the discotic compound is preferably from 2 to 20, more preferably from 2 to 12, still more preferably from 2 to 8, and most preferably from 2 to 6.

The bonding relationship of two aromatic rings is classified into (a) a case where two aromatic rings form a condensed ring, (b) a case where two aromatic rings are directly bonded by a single bond, and (c) a case where two aromatic rings are bonded through a linking group (a spiro bond cannot be formed because the rings are an aromatic ring). The bonding relationship may be any one of (a) to (c).

Examples of the condensed ring (condensed ring formed by two or more aromatic rings) in (a) include an indene ring, a naphthalene ring, an azulene ring, a fluorene ring, a phenanthrene ring, an anthracene ring, an acenaphthylene ring, a biphenylene ring, a naphthacene ring, a pyrene ring, an indole ring, an isoindole ring, a benzofuran ring, a benzothiophene ring, an indolizine ring, a benzoxazole ring, a benzothiazole ring, a benzimidazole ring, a benzotriazole ring, a purine ring, an indazole ring, a chromene ring, a quinoline ring, an isoquinoline ring, a quinolizine ring, a quinazoline ring, a cinnoline ring, a quinoxaline ring, a phthalazine ring, a pteridine ring, a carbazole ring, an acridine ring, a phenanthridine ring, a xanthene ring, a phenazine ring, a phenothiazine ring, a phenoxathiine ring, a phenoxazine ring and a thianthrene ring. Among these preferred are a naphthalene ring, an azulene ring, an indole ring, a benzoxazole ring, a benzothiazole ring, a benzimidazole ring, a benzotriazole ring and a quinoline ring.

The single bond in (b) is preferably a bond between carbon atoms of two aromatic rings. Two aromatic rings may be bonded by two or more single bonds to form an aliphatic or non-aromatic ring between those two aromatic rings.

The linking group in (c) is also preferably bonded to carbon atoms of two aromatic rings. The linking group is preferably an alkylene group, an alkenylene group, an alkynylene group, —CO—, —O—, —NH—, —S— or a combination thereof. Examples of the linking group comprising the combination are set forth below. In the following examples, right and left sides of the linking group may be reversed.

c1: —CO—O—
c2: —CO—NH—
c3: -alkylene-O—
c4: —NH—CO—NH—
c5: —NH—CO—O—
c6: —O—CO—O—
c7: —O-alkylene-O—
c8: —CO-alkenylene-
c9: —CO-alkenylene-NH—
c10: —CO-alkenylene-O—
c11: -alkylene-CO—O-alkylene-O—CO-alkylene-
c12: —O-alkylene-CO—O-alkylene-O—CO-alkylene-O—
c13: —O—CO-alkylene-CO—O—
c14: —NH—CO-alkenylene-
c15: —O—CO-alkenylene- The aromatic ring and the linking group each may have a substituent.

Examples of the substituent include a halogen atom (e.g., F, Cl, Br, I), a hydroxyl group, a carboxyl group, a cyano group, an amino group, a nitro group, a sulfo group, a carbamoyl group, a sulfamoyl group, a ureido group, an alkyl group, an alkenyl group, an alkynyl group, an aliphatic acyl group, an aliphatic acyloxy group, an alkoxy group, an alkoxycarbonyl group, an alkoxycarbonylamino group, an alkylthio group, an alkylsulfonyl group, an aliphatic amido group, an aliphatic sulfonamido group, an aliphatic substituted amino group, an aliphatic substituted carbamoyl group, an aliphatic substituted sulfamoyl group, an aliphatic substituted ureido group and a non-aromatic heterocyclic group.

The alkyl group preferably has from 1 to 8 carbon atoms. A chained alkyl group is more preferred than a cyclic alkyl group, and a linear alkyl group is particularly preferred. The alkyl group may further have a substituent (e.g., hydroxyl, carboxy, alkoxy, alkyl-substituted amino). Examples of the alkyl group (including a substituted alkyl group) include a methyl group, an ethyl group, an n-butyl group, an n-hexyl group, a 2-hydroxyethyl group, a 4-carboxybutyl group, a 2-methoxyethyl group and a 2-diethylaminoethyl.

The alkenyl group preferably has from 2 to 8 carbon atoms. A chained alkenyl group is more preferred than a cyclic alkenyl group, and a linear alkenyl group is particularly preferred. The alkenyl group may further have a substituent. Examples of the alkenyl group include a vinyl group, an allyl group and a 1-hexenyl group.

The alkynyl group preferably has from 2 to 8 carbon atoms. A chained alkynyl group is more preferred than a cyclic alkynyl group, and a linear alkynyl group is particularly preferred. The alkynyl group may further have a substituent. Examples of the alkynyl group include an ethynyl group, a 1-butynyl group and a 1-hexynyl group.

The aliphatic acyl group preferably has from 1 to 10 carbon atoms. Examples of the aliphatic acyl group include an acetyl group, a propanoyl group and a butanoyl group.

The aliphatic acyloxy group preferably has from 1 to 10 carbon atoms. Examples of the aliphatic acyloxy group include an acetoxy group.

The alkoxy group preferably has from 1 to 8 carbon atoms. The alkoxy group may further have a substituent (e.g., alkoxy). Examples of the alkoxy group (including a substituted alkoxy group) include a methoxy group, an ethoxy group, a butoxy group and a methoxyethoxy group.

The alkoxycarbonyl group preferably has from 2 to 10 carbon atoms. Examples of the alkoxycarbonyl group include a methoxycarbonyl group and an ethoxycarbonyl group.

The alkoxycarbonylamino group preferably has from 2 to 10 carbon atoms. Examples of the alkoxycarbonylamino group include a methoxycarbonylamino group and an ethoxycarbonylamino group.

The alkylthio group preferably has from 1 to 12 carbon atoms. Examples of the alkylthio group include a methylthio group, an ethylthio group and an octylthio group. The alkylsulfonyl group preferably has from 1 to 8 carbon atoms. Examples of the alkylsulfonyl group include a methanesulfonyl group and an ethanesulfonyl group.

The aliphatic amido group preferably has from 1 to 10 carbon atoms. Examples of the aliphatic amido group include an acetamido group.

The aliphatic sulfonamido group preferably has from 1 to 8 carbon atoms. Examples of the aliphatic sulfonamido group include a methanesulfonamido group, a butanesulfonamido group and an n-octanesulfonamido group.

The aliphatic substituted amino group preferably has from 1 to 10 carbon atoms. Examples of the aliphatic substituted amino group include a dimethylamino group, a diethylamino group and a 2-carboxyethylamino group.

The aliphatic substituted carbamoyl group preferably has from 2 to 10 carbon atoms. Examples of the aliphatic substituted carbamoyl group include a methylcarbamoyl group and a diethylcarbamoyl group.

The aliphatic substituted sulfamoyl group preferably has from 1 to 8 carbon atoms. Examples of the aliphatic substituted sulfamoyl group include a methylsulfamoyl group and a diethylsulfamoyl group.

The aliphatic substituted ureido group preferably has from 2 to 10 carbon atoms. Examples of the aliphatic substituted ureido group include a methylureido group.

Examples of the non-aromatic heterocyclic group include a piperidino group and a morpholino group.

The molecular weight of the retardation-expressing agent comprising a discotic compound is preferably from 300 to 800.

As the rod-like compound, a rod-like compound having a linear molecular structure can be preferably used. The linear molecular structure means that the molecular structure of the rod-like compound is linear when the structure is thermodynamically most stable. The thermodynamically most stable structure can be determined by crystal structure analysis or molecular orbital computation. For example, the molecular orbital computation is performed by using a molecular orbital computation software (e.g., WinMOPAC2000 from Fujitsu), and the molecular structure of giving a smallest heat of formation of the compound is determined. The linear molecular structure means that in a thermodynamically most stable structure determined by the computation above, the angle of main chain in the molecular structure is 140° or more.

The rod-like compound is preferably a rod-like compound having at least two aromatic rings, and the rod-like compound having at least two aromatic rings is preferably a compound represented by the following formula (1):

Ar$^1$-L$^1$-Ar$^2$    Formula (1)

In formula (1), Ar$^1$ and Ar$^2$ each independently represents an aromatic group.

In the present invention, the aromatic group includes an aryl group (aromatic hydrocarbon group), a substituted aryl group, an aromatic heterocyclic group and a substituted aromatic heterocyclic group.

The aryl or substituted aryl group is more preferred than the aromatic heterocyclic group and the substituted aromatic heterocyclic group. The hetero-ring in the aromatic heterocyclic group is generally unsaturated. The aromatic heterocyclic ring is preferably a 5-, 6- or 7-membered ring, more preferably a 5- or 6-membered ring. The aromatic heterocyclic ring generally has a largest number of double bonds. The heteroatom is preferably a nitrogen atom, an oxygen atom or a sulfur atom, more preferably a nitrogen atom or a sulfur atom.

The aromatic ring for the aromatic group is preferably a benzene ring, a furan ring, a thiophene ring, a pyrrole ring, an oxazole ring, a thiazole ring, an imidazole ring, a triazole ring, a pyridine ring, a pyrimidine ring or a pyrazine ring, more preferably a benzene ring.

Examples of the substituent for the substituted aryl group and the substituted aromatic heterocyclic group include a halogen atom (e.g., F, Cl, Br, I), a hydroxyl group, a carboxyl group, a cyano group, an amino group, an alkylamino group (e.g., methylamino, ethylamino, butylamino, dimethylamino), a nitro group, a sulfo group, a carbamoyl group, an alkylcarbamoyl group (e.g., N-methylcarbamoyl, N-ethylcarbamoyl, N,N-dimethylcarbamoyl), a sulfamoyl group, an alkylsulfamoyl group (e.g., N-methylsulfamoyl, N-ethylsulfamoyl, N,N-dimethylsulfamoyl), a ureido group, an alkylureido group (e.g., N-methylureido, N,N-dimethylureido, N,N,N'-trimethylureido), an alkyl group (e.g., methyl, ethyl, propyl, butyl, pentyl, heptyl, octyl, isopropyl, s-butyl, tert-amyl, cyclohexyl, cyclopentyl), an alkenyl group (e.g., vinyl, allyl, hexenyl), an alkynyl group (e.g., ethynyl, butynyl), an acyl group (e.g., formyl, acetyl, butyryl, hexanoyl, lauryl), an acyloxy group (e.g., acetoxy, butyryloxy, hexanoyloxy, lauryloxy), an alkoxy group (e.g., methoxy, ethoxy, propoxy, butoxy, pentyloxy, heptyloxy, octyloxy), an aryloxy group (e.g., phenoxy), an alkoxycarbonyl (e.g., methoxycarbonyl, ethoxycarbonyl, propoxycarbonyl, butoxycarbonyl, pentyloxycarbonyl, heptyloxycarbonyl), an aryloxycarbonyl group (e.g., phenoxycarbonyl), an alkoxycarbonylamino group (e.g., butoxycarbonylamino, hexyloxycarbonylamino), an alkylthio group (e.g., methylthio, ethylthio, propylthio, butylthio, pentylthio, heptylthio, octylthio), an arylthio group (e.g., phenylthio), an alkylsulfonyl group (e.g., methylsulfonyl, ethylsulfonyl, propylsulfonyl, butylsulfonyl, pentylsulfonyl, heptylsulfonyl, octylsulfonyl), an amido group (e.g., acetamido, butylamido, hexylamido, laurylamido), and a non-aromatic heterocyclic group (e.g., morpholyl, pyrazinyl).

Among these substituents for the substituted aryl group and the substituted aromatic heterocyclic group, preferred are a halogen atom, a cyano group, a carboxyl group, a hydroxyl group, an amino group, an alkyl-substituted amino group, an acyl group, an acyloxy group, an amido group, an alkoxycarbonyl group, an alkoxy group, an alkylthio group and an alkyl group.

The alkyl moiety in the alkylamino group, alkoxycarbonyl group, alkoxy group and alkylthio group, and the alkyl group each may further have a substituent. Examples of the substituent for the alkyl moiety and the alkyl group include a halogen atom, a hydroxyl group, a carboxyl group, a cyano group, an amino group, an alkylamino group, a nitro group, a sulfo group, a carbamoyl group, an alkylcarbamoyl group, a sulfamoyl group, an alkylsulfamoyl group, a ureido group, an alkylureido group, an alkenyl group, an alkynyl group, an acyl group, an acyloxy group, an acylamino group, an alkoxy group, an aryloxy group, an alkoxycarbonyl group, an aryloxycarbonyl group, an alkoxycarbonylamino group, an alkylthio group, an arylthio group, an alkylsulfonyl group, an amido group and a non-aromatic heterocyclic group. Among these substituents for the alkyl moiety and the alkyl group, preferred are a halogen atom, a hydroxyl group, an amino group, an alkylamino group, an acyl group, an acyloxy group, an acylamino group, an alkoxycarbonyl group and an alkoxy group.

In formula (1), $L^1$ represents a divalent linking group selected from an alkylene group, an alkenylene group, an alkynylene group, —O—, —CO— and a combination thereof.

The alkylene group may have a cyclic structure. The cyclic alkylene group is preferably a cyclohexylene group, more preferably a 1,4-cyclohexylene group. As for the chained alkylene group, a linear alkylene group is more preferred than a branched alkylene group.

The alkylene group preferably has from 1 to 20 carbon atoms, more preferably from 1 to 15 carbon atoms, still more preferably from 1 to 10 carbon atoms, yet still more preferably from 1 to 8 carbon atoms, and most preferably from 1 to 6 carbon atoms.

The alkenylene group and the alkynylene group each preferably has a chained structure rather than a cyclic structure, more preferably a linear structure rather than a chained structure having a branch.

The alkenylene group and the alkynylene group each preferably has from 2 to 10 carbon atoms, more preferably from 2 to 8 carbon atoms, still more preferably from 2 to 6 carbon atoms, yet still more preferably from 2 to 4 carbon atoms, and is most preferably a 2-(vinylene or ethynylene) group.

The arylene group preferably has from 6 to 20 carbon atoms, more preferably from 6 to 16 carbon atoms, still more preferably from 6 to 12 carbon atoms.

In the molecular structure of formula (1), the angle formed by $Ar^1$ and $Ar^2$ via $L^1$ is preferably 140° or more.

The rod-like compound is more preferably a compound represented by the following formula (2):

$$Ar^1\text{-}L^2\text{-}X\text{-}L^3\text{-}Ar^2 \hspace{2cm} \text{Formula (2)}$$

In formula (2), $Ar^1$ and $Ar^2$ each independently represents an aromatic group. The definition and examples of the aromatic group are the same as those described above for $Ar^1$ and $Ar^2$ in formula (1).

In formula (2), $L^2$ and $L^3$ each independently represents a divalent linking group selected from an alkylene group, —O—, —CO— and a combination thereof.

The alkenylene group preferably has a chained structure rather than a cyclic structure, more preferably a linear structure rather than a chained structure having a branch.

The alkenylene group preferably has from 1 to 10 carbon atoms, more preferably from 1 to 8 carbon atoms, still more preferably from 1 to 6 carbon atoms, yet still more preferably from 1 to 4 carbon atoms, and is most preferably a 1- or 2-(methylene or ethylene).

$L^2$ and $L^3$ each is preferably —O—CO— or —CO—O—.

In formula (2), X represents 1,4-cyclohexylene, vinylene or ethynylene.

Specific examples of the compounds represented by formulae (1) and (2) are set forth below.

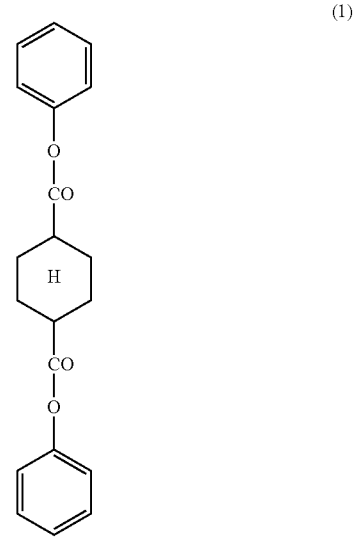

(1)

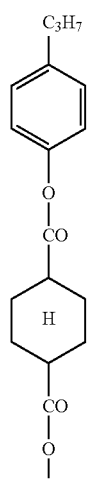
(2)
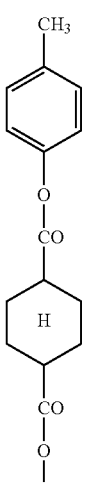
(4)
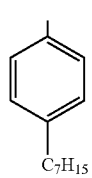
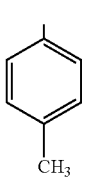
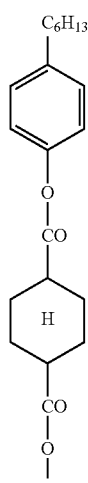
(3)
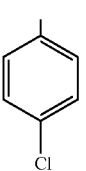
(5)
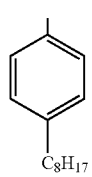

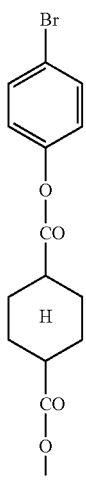 (6)
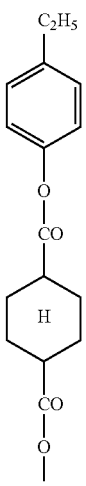 (8)
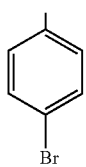
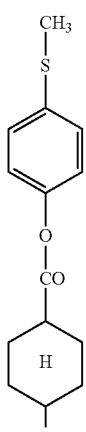 (7)
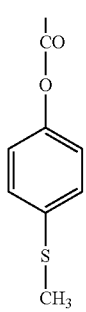 (9)

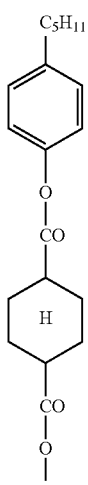 (10)
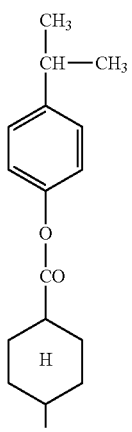 (11)
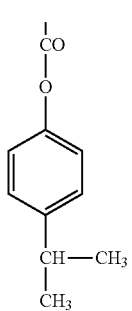
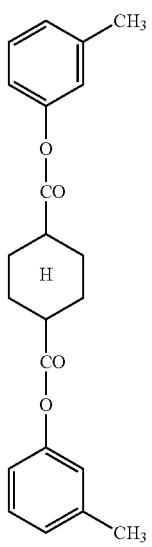 (12)
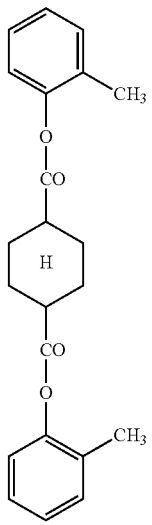 (13)
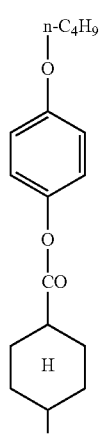 (14)

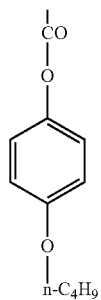
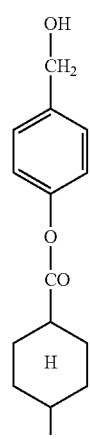
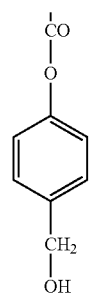
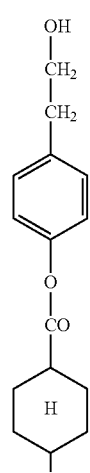
(15)
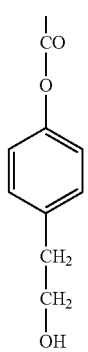
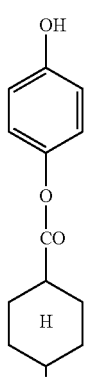
(16)
(17)
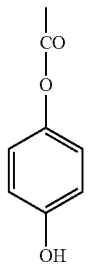
(18)
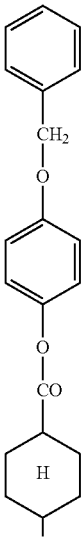

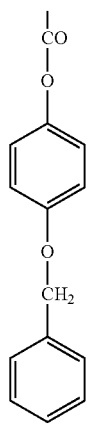
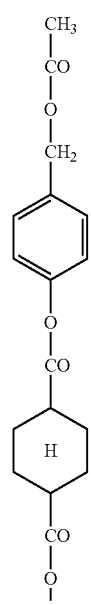
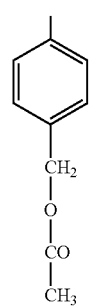
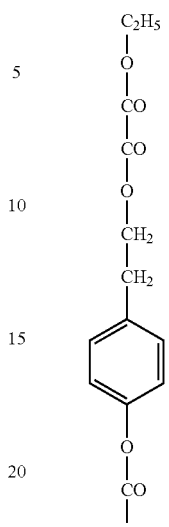
(19)
(20)
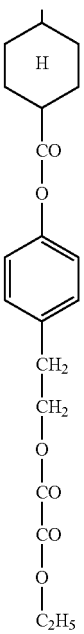

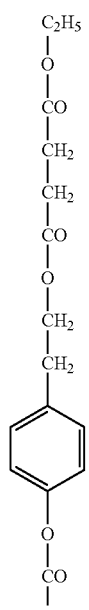
(21)
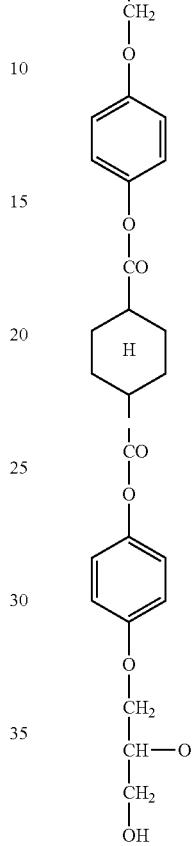
(22)
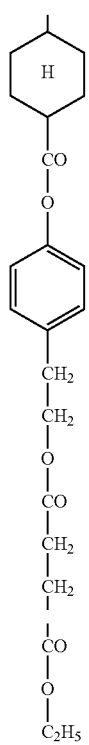
(23)

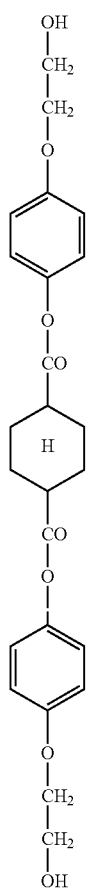
(24)
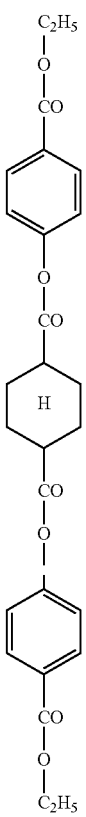
(26)
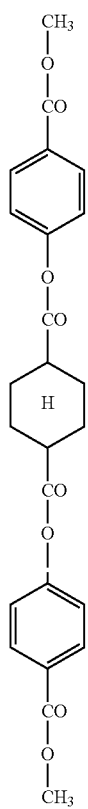
(25)
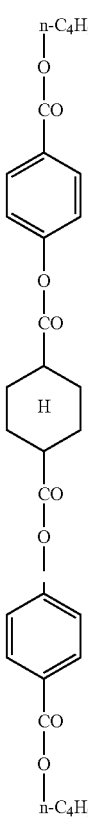
(27)

(28)
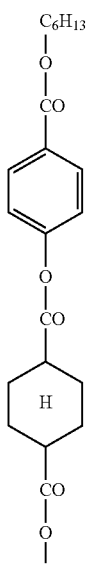
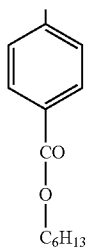
(29)
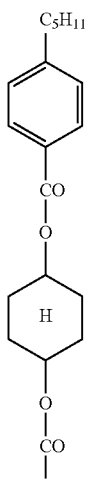
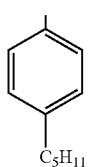
(30)
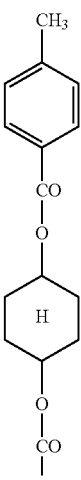
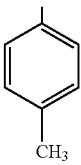
(31)
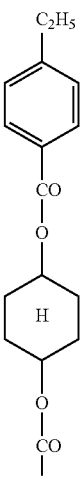
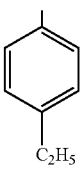

(32)
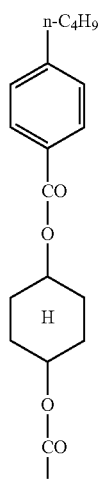
(33)
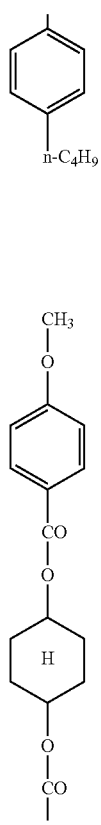
(34)
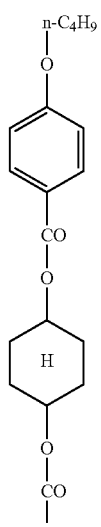
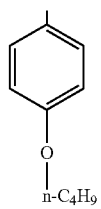
(35)
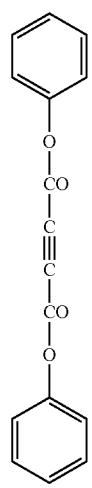

(36)
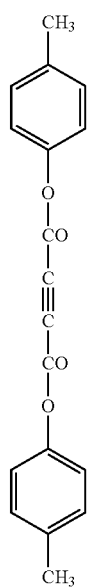
(38)
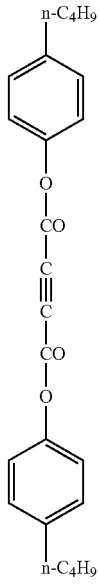
(37)
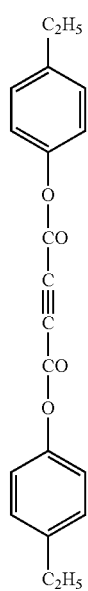
(39)
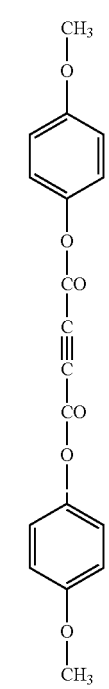

(40)
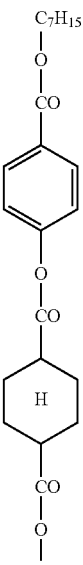
(42)
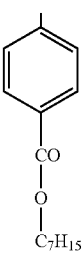
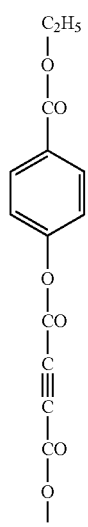
(41)
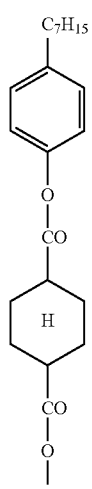
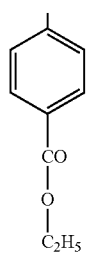
(43)
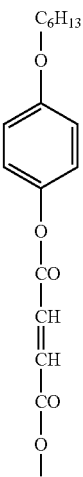
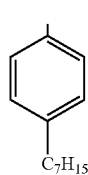
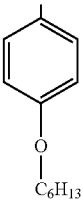

-continued

(44) 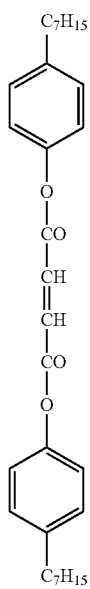

(45) 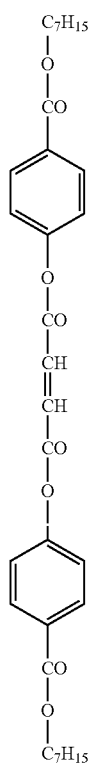

Compounds (1) to (34), (41) and (42) each has two asymmetric carbon atoms at the 1- and 4-positions of the cyclohexane ring. However, since Compounds (1), (4) to (34), (41) and (42) have a symmetric meso-type molecular structure, these compounds have no optical isomer (optical activity) but only geometric isomers (trans- and cis-isomers) are present therefor. The trans (1-trans) and cis (1-cis) isomers of Compound (1) are shown below.

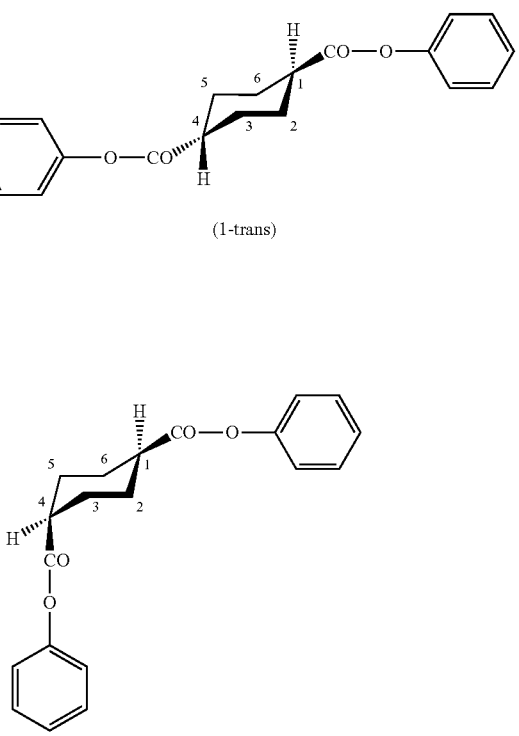

(1-trans)

(1-cis)

As described above, the rod-like compound preferably has a linear molecular structure and therefore, the trans-isomer is preferred rather than the cis-isomer.

Compounds (2) and (3) each has optical isomers (four isomers in total) in addition to geometric isomers. As for the geometric isomers, the trans-isomer is more preferred than the cis-isomer. The optical isomers has no specific difference in the superiority, and may be a D-isomer, an L-isomer or a racemic isomer.

In Compounds (43) to (45), the vinylene bond at the center includes trans- and cis-structures. From the same reason as above, the trans-structure is more preferred than the cis-structure.

Other preferred compounds are set forth below.

(46) 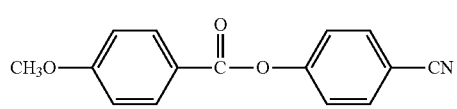 (47) 

(48) 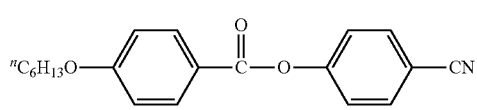 (49)

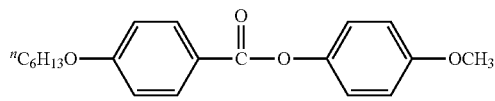 (50)
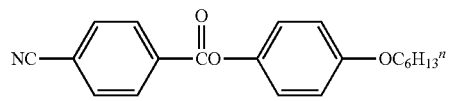 (51)

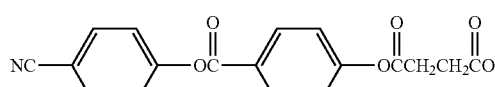 (52)

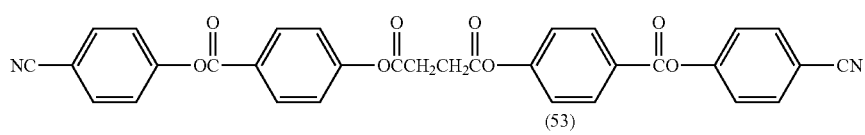 (53)

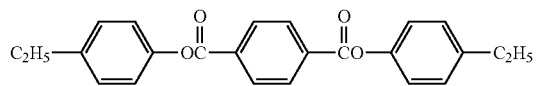 (54)
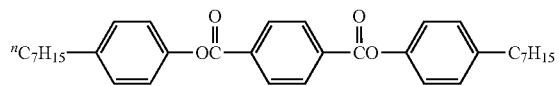 (55)

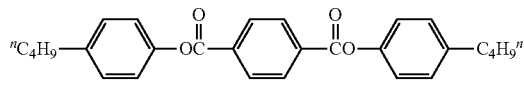 (56)

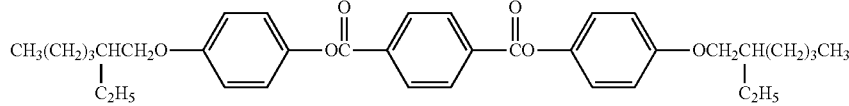 (57)

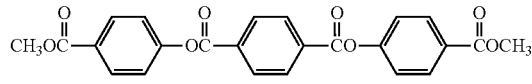 (58)
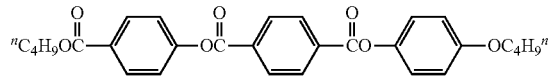 (59)

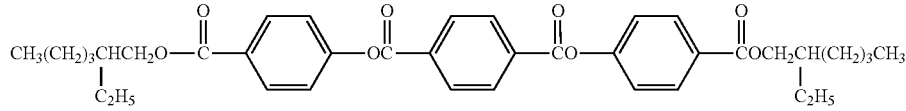 (60)

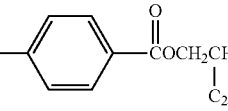 (61)

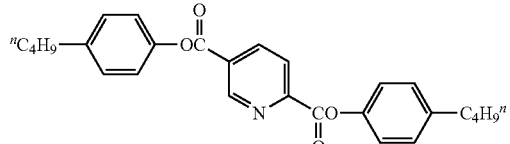 (62)
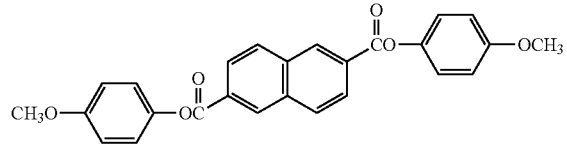 (63)

Two or more rod-like compounds having a maximum absorption wavelength (λmax) shorter than 250 nm in the ultraviolet absorption spectrum of the solution may be used in combination.

The rod-like compound can be produced by the methods described in publications and examples of the publication include *Mol. Cryst. Liq. Cryst.*, Vol. 53, page 229 (1979), ibid., Vol. 89, page 93 (1982), ibid:, Vol. 145, page 111 (1987), ibid., Vol. 170, page 43 (1989), *J. Am. Chem. Soc.*, Vol. 113, page 1349 (1991), ibid., Vol. 118, page 5346 (1886), ibid., Vol. 92, page 1582 (1970), *J. Org. Chem.*, Vol. 40, page 420 (1875), and *Tetrahedron*, Vol. 48, No. 16, page 3437 (1992).

[Fine Particulate Matting Agent]

The cellulose acylate film of the present invention preferably contains a fine particle as a matting agent. Examples of the fine particle for use in the present invention include silicon dioxide, titanium dioxide, aluminum oxide, zirconium oxide, calcium carbonate, talc, clay, calcined kaolin, calcined calcium silicate, hydrated calcium silicate, aluminum silicate, magnesium silicate and calcium phosphate. Among these, fine particles containing silicon are preferred in view of giving low turbidity, and silicon dioxide is more preferred. The silicon dioxide is preferably a fine particle having a primary average particle diameter of 20 nm or less and an apparent specific gravity of 70 g/liter ore more. The primary particle preferably has an average diameter as small as 5 to 16 nm because the film can be decreased in the haze. The apparent specific gravity is preferably from 90 to 200 g/liter or more, more preferably from 100 to 200 g/liter or more. As the apparent specific gravity is larger, a liquid dispersion having a higher concentration can be prepared and this is preferred in view of haze and aggregate.

In the case of using the fine particulate silicon dioxide, the amount used thereof is preferably from 0.01 to 0.3 parts by mass per 100 parts by mass of polymer components including cellulose acylate.

The fine particles usually form a secondary particle having an average particle diameter of 0.1 to 3.0 μm and in the film, these particles are present as an aggregate of primary particles to form asperities of 0.1 to 3.0 μm on the film surface. The secondary average particle diameter is preferably from 0.2 to 1.5 μm, more preferably from 0.4 to 1.2 μm, and most preferably from 0.6 to 1.1 μm. With a secondary average particle diameter in this range, the effect of preventing creak can be satisfactorily expressed and the haze is small.

With respect to the primary and secondary particle diameters, particles in the film are observed through a scanning electron microscope, and the diameter of a circle circumscribing a particle is defined as the particle diameter. Also, 200 particles at different places are observed and the average value thereof is defined as the average particle diameter.

The fine particulate silicon dioxide used may be a commercially available product such as Aerosil R972, R972V, R974, R812, 200, 200V, 300, R202, OX50 and TT600 (all produced by Nihon Aerosil Co., Ltd.). The fine particulate zirconium oxide is commercially available under the trade name of, for example, Aerosil R976 or R811 (both produced by Nihon Aerosil Co., Ltd.), and these may be used.

Among these, Aerosil 200V and Aerosil R972V are preferred because these are fine particulate silicon dioxide having an average primary particle diameter of 20 nm or less and an apparent specific gravity of 70 g/liter or more and provide a high effect of decreasing the coefficient of friction while maintaining low turbidity of the optical film.

In the present invention, in order to obtain a cellulose acylate film containing particles having a small average secondary particle diameter, several techniques may be employed at the preparation of a liquid dispersion of fine particles. For example, in one method, a solvent and fine particles are mixed with stirring to previously prepare a liquid dispersion of fine particles, the obtained liquid dispersion of fine particles is added to a slight amount of a separately prepared cellulose acylate solution and then dissolved with stirring, and the resulting solution is further mixed with a main cellulose acylate dope solution. This preparation method is preferred in that dispersibility of silicone dioxide fine particles is good and re-aggregation of silicon dioxide fine particles scarcely occurs. In another method, a slight amount of a cellulose ester is added to a solvent and then dissolved with stirring, fine particles are added thereto and dispersed by a disperser to obtain a fine particle-added solution, and the fine particle-added solution is thoroughly mixed with a dope solution by an in-line mixer. The present invention is not limited to these methods, but at the time when silicon dioxide fine particles are mixed with a solvent and dispersed, the concentration of silicon dioxide is preferably from 5 to 30 mass %, more preferably from 10 to 25 mass %, and most preferably from 15 to 20 mass %. A higher dispersion concentration is preferred because the liquid turbidity for the amount added becomes low and this is preferred in view of haze and aggregate. In the dope solution of final cellulose acylate, the amount of the matting agent added is preferably from 0.01 to 1.0 g/m², more preferably from 0.03 to 0.3 g/m², and most preferably from 0.08 to 0.16 g/m².

As for the solvent used here, lower alcohols may be used and preferred examples thereof include methyl alcohol, ethyl alcohol, propyl alcohol, isopropyl alcohol and butyl alcohol. The solvents other than the lower alcohol are not particularly limited, but the solvent used at the film formation of cellulose ester is preferably used.

The organic solvent in which the cellulose acylate of the present invention is dissolved is described below.

In the present invention, the organic solvent may be either a chlorine-based solvent using a chlorine-based organic solvent as the main solvent, or a chlorine-free solvent not containing a chlorine-based organic solvent.

[Chlorine-Based Solvent]

At the preparation of a solution of cellulose acylate of the present invention, a chlorine-based organic solvent is preferably used as the main solvent. In the present invention, the chlorine-based organic solvent is not particularly limited in its kind as long as respective purposes in the dissolution, casting and film formation of the cellulose acylate can be achieved. The chlorine-based organic solvent is preferably dichloromethane or chloroform, more preferably dichloromethane. An organic solvent except for a chlorine-based organic solvent may also be mixed. In this case, the dichloromethane must be used to occupy at least 50 mass % in the entire amount of organic solvents. The other organic solvent used in combination with the chlorine-based organic solvent in the present invention is described below. The other organic solvent is preferably a solvent selected from an ester having from 3 to 12 carbon atoms, a ketone having from 3 to 12 carbon, an ether having from 3 to 12 carbon, an alcohol, a hydrocarbon and the like. The ester, ketone, ether and alcohol each may have a cyclic structure. A compound having two or more functional groups of an ester, a ketone and an ether (that is, —O—, —CO— and —COO—) may also be used as the solvent, and the compound may have another functional group such as alcoholic hydroxyl group at the same time. In the case of a solvent having two or more functional groups, the number of carbon atoms may suffice if it falls within the range specified for the compound having any one of the functional groups. Examples of the esters having from 3 to 12 carbon atoms include ethyl formate, propyl formate, pentyl formate, methyl acetate, ethyl acetate and pentyl acetate. Examples of the ketones having from 3 to 12 carbon atoms include acetone, methyl ethyl ketone, diethyl ketone, diisobutyl ketone, cyclopentanone, cyclohexanone and methylcyclohexanone. Examples of the ethers having from 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvent having two or more functional groups include 2-ethoxyethyl acetate, 2-methoxyethanol and 2-butoxyethanol.

The alcohol preferably used in combination with the chlorine-based organic solvent may be linear, branched or cyclic. In particular, a saturated aliphatic hydrocarbon is preferred. The hydroxyl group of the alcohol may be primary, secondary or tertiary. Examples of the alcohol include methanol, ethanol, 1-propanol, 2-propanol, 1-butanol, 2-butanol, tert-butanol, 1-pentanol, 2-methyl-2-butanol and cyclohexanol. Also, a fluorine-based alcohol may be used as the alcohol. Examples thereof include 2-fluoroethanol, 2,2,2-trifluoroethanol and 2,2,3,3-tetrafluoro-1-propanol. The hydrocarbon may be linear, branched or cyclic, and either an aromatic hydrocarbon or an aliphatic hydrocarbon can be used. The aliphatic hydrocarbon may be either saturated or unsaturated. Examples of the hydrocarbon include cyclohexane, hexane, benzene, toluene and xylene.

Examples of the combination of a chlorine-based organic solvent with other organic solvents include, but are not limited to, the following compositions:

dichloromethane/methanol/ethanol/butanol (80/10/5/5, parts by mass), dichloromethane/acetone/methanol/propanol (80/10/5/5, parts by mass)

dichloromethane/methanol/butanol/cyclohexane (80/10/5/5, parts by mass), dichloromethane/methyl ethyl ketone/methanol/butanol (80/10/5/5, parts by mass), dichloromethane/acetone/methyl ethyl ketone/ethanol/isopropanol (75/8/5/5/7, parts by mass)

dichloromethane/cyclopentanone/methanol/isopropanol (80/7/5/8, parts by mass), dichloromethane/methyl acetate/butanol (80/10/10, parts by mass), dichloromethane/cyclohexanone/methanol/hexane (70/20/5/5, parts by mass), dichloromethane/methyl ethyl ketone/acetone/methanol/ethanol (50/20/20/5/5, parts by mass), dichloromethane/1,3-dioxolane/methanol/ethanol (70/20/5/5, parts by mass), dichloromethane/dioxane/acetone/methanol/ethanol (60/20/10/5/5, parts by mass), dichloromethane/acetone/cyclopentanone/ethanol/isobutanol/cyclohexane (65/10/10/5/5/5, parts by mass), dichloromethane/methyl ethyl ketone/acetone/methanol/ethanol (70/10/10/5/5, parts by mass), dichloromethane/acetone/ethyl acetate/ethanol/butanol/hexane (65/10/10/5/5/5, parts by mass), dichloromethane/methyl acetoacetate/methanol/ethanol (65/20/10/5, parts by mass), and dichloromethane/cyclopentanone/ethanol/butanol (65/20/10/5, parts by mass).

[Chlorine-Free Solvent]

The chlorine-free organic solvent preferably used at the preparation of a solution of cellulose acylate of the present invention is described below. In the present invention, the chlorine-free organic solvent is not particularly limited as long as respective purposes in the dissolution, casting and film formation of the cellulose acylate can be achieved. The chlorine-free organic solvent for use is preferably a solvent selected from an ester, a ketone and an ether each having from 3 to 12 carbon atoms. The ester, ketone and ether each may have a cyclic structure. A compound having two or more functional groups of an ester, a ketone and an ether (that is, —O—, —CO— and —COO—) may also be used as the main solvent, and the compound may have another functional group such as alcoholic hydroxyl group. In the case of a main solvent having two or more functional groups, the number of carbon atoms may suffice if it falls within the range specified for the compound having any one of the functional groups. Examples of the esters having from 3 to 12 carbon atoms include ethyl formate, propyl formate, pentyl formate, methyl acetate, ethyl acetate and pentyl acetate. Examples of the ketones having from 3 to 12 carbon atoms include acetone, methyl ethyl ketone, diethyl ketone, diisobutyl ketone, cyclopentanone, cyclohexanone and methylcyclohexanone. Examples of the ethers having from 3 to 12 carbon atoms include diisopropyl ether, dimethoxymethane, dimethoxyethane, 1,4-dioxane, 1,3-dioxolane, tetrahydrofuran, anisole and phenetole. Examples of the organic solvent having two or more functional groups include 2-ethoxyethyl acetate, 2-methoxyethanol and 2-butoxyethanol.

The chlorine-free organic solvents used for cellulose acylate is selected from the above-described various aspects, but is preferably as follows. The chlorine-free solvent is preferably a mixed solvent using a chlorine-free organic solvent described above as the main solvent, and this mixed solvent comprises three or more different solvents where the first solvent is at least one member selected from methyl acetate, ethyl acetate, methyl formate, ethyl formate, acetone, dioxolane and dioxane, or a mixed solution thereof, the second solvent is selected from ketones having from 4 to 7 carbon atoms and acetoacetic acid esters, and the third solvent is selected from alcohols having from 1 to 10 carbon atoms, preferably from 1 to 8 carbon atoms, and hydrocarbons. When the first solvent is a mixed solution of two or more solvents, the second solvent may be omitted. The first solvent is more preferably methyl acetate, acetone, methyl formate, ethyl formate or a mixture thereof, and the second solvent is preferably methyl ethyl ketone, cyclopentanone, cyclohexanone or methyl acetylacetate, and may be a mixed solvent thereof.

The alcohol as the third solvent may be linear, branched or cyclic. In particular, a saturated aliphatic hydrocarbon is preferred. The hydroxyl group of the alcohol may be primary, secondary or tertiary. Examples of the alcohol include methanol, ethanol, 1-propanol, 2-propanol, 1-butanol, 2-butanol, tert-butanol, 1-pentanol, 2-methyl-2-butanol and cyclohexanol. Also, a fluorine-based alcohol may be used as the alcohol. Examples thereof include 2-fluoroethanol, 2,2,2-trifluoroethanol and 2,2,3,3-tetrafluoro-1-propanol. The hydrocarbon may be linear, branched or cyclic, and either an aromatic hydrocarbon or an aliphatic hydrocarbon can be used. The aliphatic hydrocarbon may be either saturated or unsaturated. Examples of the hydrocarbon include cyclohexane, hexane, benzene, toluene and xylene. These alcohols and hydrocarbons as the third solvent may be used individually or as a mixture of two or more thereof and this is not particularly limited. Specific preferred compounds of the alcohol as the third solvent include methanol, ethanol, 1-propanol, 2-propanol, 1-butanol, 2-butanol, cyclohexanol, cyclohexane and hexane. Among these, more preferred are methanol, ethanol, 1-propanol, 2-propanol and 1-butanol.

The mixing ratio of these three solvents in the mixed solvent is preferably such that the first solvent occupies from 20 to 95 mass %, the second solvent occupies from 2 to 60 mass % and the third solvent occupies from 2 to 30 mass %, in the entire amount of the mixed solvent, more preferably such that the first solvent occupies from 30 to 90 mass %, the second solvent occupies from 3 to 50 mass % and the third solvent is an alcohol and occupies from 3 to 25 mass %, still more preferably such that the first solvent occupies from 30 to 90 mass %, the second solvent occupies from 3 to 30 mass % and the third solvent is an alcohol and occupies from 3 to 15 mass %. The chlorine-free organic solvent for use in the present invention is described in more detail in *JIII Journal of Technical Disclosure*, No. 2001-1745, pp. 12-16, Japan Institute of Invention and Innovation (Mar. 15, 2001). Preferred examples of the combination of chlorine-free organic solvents for use in the present invention include, but are not limited to, the following compositions:

methyl acetate/acetone/methanol/ethanol/butanol (75/10/5/5/5, parts by mass), methyl acetate/acetone/methanol/ethanol/propanol (75/10/5/5/5, parts by mass), methyl acetate/acetone/methanol/butanol/cyclohexane (75/10/5/5/5, parts by mass), methyl acetate/acetone/ethanol/butanol (81/8/7/4, parts by mass), methyl acetate/acetone/ethanol/butanol (82/10/4/4, parts by mass), methyl acetate/acetone/ethanol/butanol (80/10/4/6, parts by mass), methyl acetate/methyl ethyl ketone/methanol/butanol (80/10/5/5, parts by mass), methyl acetate/acetone/methyl ethyl ketone/ethanol/isopropanol (75/8/5/5/7, parts by mass), methyl acetate/cyclopentanone/methanol/isopropanol (80/7/5/8, parts by mass), methyl acetate/acetone/butanol (85/10/5, parts by mass), methyl acetate/cyclopentanone/acetone/methanol/butanol (60/15/14/5/6, parts by mass), methyl acetate/cyclohexanone/methanol/hexane (70/20/5/5, parts by mass), methyl acetate/methyl ethyl ketone/acetone/methanol/ethanol (50/20/20/5/5, parts by mass), methyl acetate/1,3-dioxolane/methanol/ethanol (70/20/5/5, parts by mass), methyl acetate/dioxolane/acetone/methanol/ethanol (60/20/10/5/5, parts by mass), methyl acetate/acetone/cyclopentanone/ethanol/isobutanol/cyclohexane (65/10/10/5/5/5, parts by mass), methyl formate/methyl ethyl ketone/acetone/methanol/ethanol (50/20/20/5/5, parts by mass), methyl formate/acetone/ethyl acetate/ethanol/butanol/hexane (65/10/10/5/5/5, parts by mass), acetone/methyl acetoacetate/methanol/ethanol (65/20/10/5, parts by mass), acetone/cyclopentanone/ethanol/butanol (65/20/10/5, parts by mass), acetone/1,3-dioxolane/ethanol/butanol (65/20/10/5, parts by mass), and 1,3-dioxolane/cyclohexanone/methyl ethyl ketone/methanol/butanol (55/20/10/5/5/5, parts by mass).

Furthermore, a cellulose acylate solution prepared by the following method may also be used:

a method of preparing a cellulose acylate solution from methyl acetate/acetone/ethanol/butanol (81/8/7/4, parts by mass), filtering and concentrating the solution and then additionally adding 2 parts by mass of butanol;

a method of preparing a cellulose acylate solution from methyl acetate/acetone/ethanol/butanol (84/10/4/2, parts y mass), filtering and concentrating the solution and then additionally adding 4 parts by mass of butanol; and a method of preparing a cellulose acylate solution from methyl acetate/acetone/ethanol (84/10/6, parts by mass), filtering and concentrating the solution and then additionally adding 5 parts by mass of butanol.

In addition to the above-described chlorine-free organic solvent of the present invention, the dope for use in the present invention may contain dichloromethane in an amount of 10 mass % or less based on the entire amount of organic solvents.

[Properties of Cellulose Acylate Solution]

In view of suitability for film formation by casting, the cellulose acylate solution is preferably a solution prepared by dissolving a cellulose acylate in the above-described organic solvent to a concentration of 10 to 30 mass %, more preferably from 13 to 27 mass %, still more preferably from 15 to 25 mass %. With respect to the method for adjusting the cellulose acylate concentration to such a range, the adjustment to a predetermined concentration may be performed at the stage of dissolving the cellulose acylate, or after previously preparing a low-concentration (for example, from 9 to 14 mass %) solution, the solution may be adjusted to a predetermined high concentration in the concentration step described later. Furthermore, a high-concentration cellulose acylate solution may be previously prepared and then adjusted to a predetermined low concentration by adding various additives. Any of these methods may be used without problem as long as the cellulose acylate solution concentration of the present invention can be obtained.

In the present invention, when the cellulose acylate solution is diluted to a concentration of 0.1 to 5 mass % by an organic solvent having the same composition, the aggregate molecular weight of cellulose acylate in the resulting diluted solution is preferably from 150,000 to 15,000,000, more preferably from 180,000 to 9,000,000. The aggregate molecular weight can be determined by a static light scattering method. The cellulose acylate is preferably dissolved such that the squared radius of inertia simultaneously determined by this method becomes from 10 to 200 nm, more preferably from 20 to 200 nm. Also, the cellulose acylate is preferably dissolved such that the second virial coefficient becomes from $-2\times10^4$ to $+4\times10^4$, more preferably from $-2\times10^4$ to $+2\times10^4$.

The definitions of aggregate molecular weight, squared radius of inertia and second virial coefficient as used in the present invention are described below. These are measured by using a static light scattering process according to the following method. For the convenience's sake of apparatus, the measurement is performed in the dilute region, but these measured values reflect the behavior of dope in the high-concentration region of the present invention.

First, solutions of 0.1 mass %, 0.2 mass %, 0.3 mass % or 0.4 mass % are prepared by dissolving cellulose acylate in a solvent which is used for the dope. Here, in order to prevent absorption of moisture, cellulose acylate dried at 120° C. for 2 hours is used and weighed at 25° C. and 10% RH. The dissolution is performed by the method employed at the dissolution of dope (ordinary temperature dissolution, cooling dissolution or high temperature dissolution). Subsequently, these solutions with solvent are filtered through a 0.2-μm Teflon-made filter, and static light scattering of each filtered solution is measured at 25° C. by using a light scattering spectrophotometer (DLS-700, manufactured by Otsuka Electronics Co., Ltd.) in 10° steps from 30° to 140°. The obtained data are analyzed by the BERRY plotting method. In this analysis, the value of the solvent determined by Abbe refraction system is used as the refractive index necessary therefor, and the concentration gradient (dn/dc) of refractive index is measured by using a differential refractometer (DRM-1021, manufactured by Otsuka Electronics Co., Ltd.) and using the solvent and solution used for the measurement of light scattering.

[Preparation of Dope]

The preparation of the cellulose acylate solution (dope) is described below. The method for dissolving cellulose acylate is not particularly limited, and the dissolution may be performed at room temperature or by using a cooling dissolution method, a high temperature dissolution method or a combination thereof. With respect to these dissolution methods, the preparation method of a cellulose acylate solution is described, for example, in JP-A-5-163301, JP-A-61-106628, JP-A-58-127737, JP-A-9-95544, JP-A-10-95854, JP-A-10-45950, JP-A-2000-53784, JP-A-11-322946, JP-A-11-322947, JP-A-2-276830, JP-A-2000-273239, JP-A-11-71463, JP-A-04-259511, JP-A-2000-273184, JP-A-11-323017 and JP-A-11-302388.

The method for dissolving cellulose acylate in an organic solvent described in these patent publications can be appropriately applied also in the present invention as long as it is within the scope of the present invention. In particular, as for the chlorine-free solvent system, the method described in detail in *JIII Journal of Technical Disclosure*, No. 2001-1745, pp. 22-25, Japan Institute of Invention and Innovation (Mar. 15, 2001) can be employed. Furthermore, the dope solution of cellulose acylate for use in the present invention is usually subjected to concentration of solution and filtration, and these are also described in detail in *JIII Journal of Technical Disclosure*, No. 2001-1745, page 25, Japan Institute of Invention and Innovation (Mar. 15, 2001). In the case of performing the dissolution at a high temperature, the temperature is most often higher than the boiling point of the organic solvent used and in such a case, a system under applied pressure is used.

The cellulose acylate solution preferably has a viscosity and a dynamic storage modulus in the following ranges, because the casting is facilitated. A sample solution (1 mL) is measured by using Steel Cone with a diameter of 4 cm/2' of Rheometer (CLS 500) (both manufactured by TA Instruments). The measurement is performed under the conditions of oscillation step and temperature ramp by varying the temperature at 2° C./min in the range from 40° C. to −10° C., and the static non-Newton viscosity n*(Pa·s) at 40° C. and storage modulus G'(Pa) at −5° C. are determined. Incidentally, the measurement is started after previously keeping the sample solution at the measurement initiation temperature until the liquid temperature becomes constant. In the present invention, the dope preferably has a viscosity of 1 to 400 Pa·s at 40° C. and a dynamic storage modulus of 500 Pa or more at 15° C., more preferably a viscosity of 10 to 200 Pa·s at 40° C. and a dynamic storage modulus of 100 to 1,000,000 Pa at 15° C. Furthermore, the dynamic storage modulus at low temperature is preferably larger and, for example, when the casting support is at −5° C., the dynamic storage modulus at −5° C. is preferably from 10,000 to 1,000,000 Pa, and when the support is at −50° C., the dynamic storage modulus at −50° C. is preferably from 10,000 to 5,000,000 Pa.

In the present invention, the above-described specific cellulose acylate is used and therefore, a high-concentration dope is characteristically obtained, so that a high-concentration dope having excellent stability can be obtained even without relying on the concentrating means. In order to more facilitate the dissolution, after dissolving the cellulose acylate to a low concentration, the solution may be concentrated by using the concentrating means. The method for concentrating the solution is not particularly limited but, for example, the solution can be concentrated by a method of introducing a low-concentration solution between a cylindrical body and a rotation trajectory of the outer circumference of a rotary blade rotating in the circumferential direction inside the cylindrical body and at the same time, giving a temperature difference between the cylindrical body and the solution, thereby obtaining a high-concentration solution while evaporating the solvent (see, for example, JP-A-4-259511); or a method of injecting a heated low-concentration solution into a vessel from a nozzle, flash-evaporating the solvent during traveling of the solution from the nozzle until reaching the inner wall of vessel, and extracting the solvent vapor from the container while extracting a high-concentration solution from the vessel bottom (see, for example, U.S. Pat. Nos. 2,541,012, 2,858, 229, 4,414,341 and 4,504,355).

In advance of casting, the foreign matters in the solution, such as undissolved material, dust and impurity, are preferably removed by filtration with use of an appropriate filter medium. The filter used for the filtration of cellulose acylate solution preferably has an absolute filtration precision of 0.1 to 100 μm, more preferably from 0.5 to 25 μm. The thickness of the filter is preferably from 0.1 to 10 mm, more preferably from 0.2 to 2 mm. The filtration pressure is preferably 1.6 MPa or less, more preferably 1.2 MPa or less, still more preferably 1.0 MPa or less, yet still more preferably 0.2 MPa or less. As for the filter medium, a conventionally known material such as glass fiber, cellulose fiber, filter paper and fluororesin (e.g., ethylene tetrafluoride resin) can be preferably used. In particular, ceramic, metal and the like are preferred. The viscosity of the cellulose acylate solution immediately before film formation may be sufficient if the solution can be cast at the film formation. Usually, the solution is preferably prepared to have a viscosity of 10 to 2,000 Pa·s, more preferably from 30 to 1,000 Pa·s, still more preferably from 40 to 500 Pa·s. At this time, the temperature is not particularly limited as long as it is a temperature at the casting, but the temperature is preferably from −5 to +70° C., more preferably from −5 to +55° C.

[Film Formation]

The cellulose acylate film of the present invention can be obtained by film-forming the above-described cellulose acylate solution. As for the method and apparatus for film formation, the solution casting film formation method and the solution casting film formation apparatus conventionally used for the production of cellulose triacetate film are used. The dope (cellulose acylate solution) prepared in a dissolving machine (kettle) is once stored in a storing kettle and finalized by removing the bubbles contained in the dope. The dope is supplied to a pressure-type die from the dope discharge port through, for example, a pressure-type quantitative pump capable of feeding a constant amount of solution with high precision by the number of rotation, and uniformly cast on a metal support in the casting part endlessly running from the mouth ring (slit) of the pressure-type die, and the damp-dry dope film (also called web) is peeled off from the metal support at the peeling point after nearly one round of the metal support. The obtained web is nipped by clips at both ends, transported by a tenter while keeping the width, thereby being dried, then transported by a roll group of a drying apparatus to complete the drying, and taken up to a predetermined length by a take-up machine. The combination of the tenter and the drying apparatus comprising a roll group varies depending on the purpose. In the solution casting film formation method used for a functional protective film of electronic displays, in addition to the solution casting film formation apparatus, a coating apparatus is added in many cases so as to apply surface treatment to the film, such as subbing layer, antistatic layer, antihalation layer and protective layer. Each production step is simply described below, but the present invention is not limited thereto.

In producing a cellulose acylate film by a solvent cast method, the prepared cellulose acylate solution (dope) is cast on a drum or a band and the solvent is evaporated to form a film. The dope before casting is preferably adjusted to a concentration of giving a solid content amount of 5 to 40 mass %. The surface of the drum or band is preferably finished to provide a mirror state. The dope is preferably cast on a drum or band having a surface temperature of 30° C. or less. In particular, the metal support temperature is preferably from −10 to 20° C. Furthermore, the methods described in JP-A-2000-301555, JP-A-2000-301558, JP-A-07-032391, JP-A-03-193316, JP-A-05-086212, JP-A-62-037113, JP-A-02-276607, JP-A-55-014201, JP-A-02-111511 and JP-A-02-208650 may be used in the present invention.

[Multilayer Casting]

In casting the cellulose acylate solution on a smooth band or drum working as a metal support, a single-layer solution may be cast or a plurality of cellulose acylate solutions for two or more layers may be cast. In the case of casting a plurality of cellulose acylate solutions, respective cellulose acylate-containing solutions may be cast from multiple casting ports provided with spacing in the travelling direction of the metal support to produce a film while stacking one on another and, for example, the methods described in JP-A-61-158414, JP-A-1-122419 and JP-A-11-198285 may be applied. Also, cellulose acylate solutions may be cast from two casting ports to effect film formation and this can be practiced by the method described, for example, in JP-B-60-27562 (the term "JP-B" as used herein means an "examined Japanese patent publication"), JP-A-61-94724, JP-A-61-947245, JP-A-61-104813, JP-A-61-158413 and JP-A-6-134933. In addition, a cellulose acylate film casting method described in JP-A-56-162617 of encompassing the flow of a high-viscosity cellulose acylate solution with a low-viscosity cellulose acylate solution and simultaneously extruding the high-viscosity and low-viscosity cellulose acylate solutions may be used. A method of incorporating a large amount of an alcohol component as a poor solvent into the solution on the outer side than into the solution on the inner side described in JP-A-61-94724 and JP-A-61-94725 is also a preferred embodiment. Furthermore, the film can be produced by separating a film cast from a first casting port and formed on a metal support, and applying a second casting on the side contacted with the metal support surface and this method is described, for example, in JP-B-44-20235. The cellulose acylate solutions may be the same or different and are not particularly limited. In order to impart functions to multiple cellulose acylate layers, a cellulose acylate solution according to the function may be extruded from each casting port. The cellulose acylate solution may also be cast simultaneously with other functional layers (for example, adhesive layer, dye layer, antistatic layer, antihalation layer, UV absorbing layer and polarizing layer).

Many of conventional single-layer solutions have a problem that a cellulose acylate solution having high concentration and high viscosity must be extruded so as to obtain a required film thickness and in this case, the cellulose acylate solution has bad stability to cause particle failure or poor planarity. For solving this problem, a plurality of cellulose acylate solutions are cast from casting ports, whereby high-viscosity solutions can be simultaneously extruded on the metal support and not only the planarity can be enhanced and a film having excellent surface state can be produced but also the drying load can be reduced by the use of thick cellulose acylate solutions and the production speed of film can be elevated. In the case of co-casting, the layers on the inner and outer sides are not particularly limited in the thickness but the thickness on the outer side preferably occupies from 1 to 50%, more preferably from 2 to 30%, of the entire film thickness. Here, in the case of co-casting of three or more layers, the total thickness of the layer in contact with the metal support and the layer in contact with the air side is defined as the thickness on the outer side. In the case of co-casting, a cellulose acylate film having a laminate structure may also be produced by co-casting cellulose acylate solutions differing in the concentration of the above-described additive such as plasticizer, ultraviolet absorbent and matting agent. For example, a cellulose acylate film having a constitution of skin layer/core layer/skin layer can be produced. In this case, for example, the matting agent may be incorporated in a larger amount into the skin layer or may be incorporated only into the skin layer. The plasticizer and ultraviolet absorbent can be incorporated in a larger amount into the core layer than in the skin layer or may be incorporated only into the core layer. The plasticizer and ultraviolet absorbent each may be different between the core layer and the skin layer and, for example, at least either one of a low-volatile plasticizer and a low-volatile ultraviolet absorbent may be incorporated into the skin layer, while adding a plasticizer with excellent plasticity or an ultraviolet absorbent with excellent ultraviolet absorptivity into the core layer. It is also a preferred embodiment to incorporate a separation accelerator only into the skin layer on the metal support side. In addition, an alcohol as a poor solvent may be added in a larger amount into the skin layer than in the core layer and this is preferred. The Tg may differ between the skin layer and the core layer, and the Tg of the core layer is preferably lower than the Tg of the skin layer. The viscosity of the cellulose acylate-containing solution at the casting may also be different between the skin layer and the core layer, and the viscosity of the skin layer is preferably lower than the viscosity of the core layer, but the viscosity of the core layer may be lower than the viscosity of the skin layer.

[Casting]

Examples of the method for casting the solution include a method of uniformly extruding the prepared dope on a metal support from a pressure die, a doctor blade method of controlling the thickness of the dope once cast on a metal support by using a blade, and a reverse roll coater method of controlling the thickness by using a roll rotating in reverse. Among these, the method using a pressure die is preferred. The pressure die includes a coat hanger die, a "T" die and the like, and any of these can be preferably used. Other than the methods described above, conventionally known various methods for casting and film-forming a cellulose triacetate solution can be employed, and the same effect as that described in each publication can be obtained by setting respective conditions while taking account of difference in the boiling point or the like of the solvent used. The endlessly running metal support used in the production of the cellulose acylate film of the present invention is a drum with the surface being mirror-finished by chromium plating or a stainless steel belt (may also be called a band) mirror-finished by surface polishing. As for the pressure die used in the production of the cellulose acylate film of the present invention, one unit or two or more units may be provided on the upper side of the metal support. The pressure die provided is preferably one or two unit(s). In the case of providing two or more units, the amount of the dope cast may be divided into respective dies at various ratios, or the dope may be supplied to the dies at respective ratios by a plurality of precision quantitative gear pumps. The temperature of the cellulose acylate solution used for the casting is preferably from −10 to 55° C., more preferably from 25 to 50° C. In this case, the temperature may be the same in all steps or may differ among respective step portions. When the temperature differs, it may sufficient if the temperature immediately before casting is a desired temperature.

[Drying]

In the production of the cellulose acylate film, the dope on the metal support may be generally dried, for example, by a method of blowing hot air from the surface side of the metal support (drum or belt), that is, from the surface of the web on the metal support; a method of blowing hot air from the back surface of the drum or belt; or a liquid heat transfer method of bringing a liquid controlled in the temperature into contact with the drum or belt from the back surface opposite the dope casting surface, and heating the drum or belt through heat transfer, thereby controlling the surface temperature. The back surface liquid heat transfer method is preferred. The metal support surface before casting may be at any temperature as long as it is lower than the boiling point of the solvent used for the dope. However, in order to accelerate the drying or deprive the solution of its fluidity on the metal support, the surface temperature is preferably set to a temperature 1 to 10° C. lower than the boiling point of the solvent having a lowest boiling point out of the solvents used. Incidentally, this does not apply to the case where the cast dope is cooled and peeled off without drying it.

[Stretching Treatment]

The cellulose acylate film of the present invention can be stretched to adjust the retardation. A method of aggressively stretching the film in the width direction is also known and this is described, for example, in JP-A-62-115035, JP-A-4-152125, JP-A-4-284211, JP-A-4-298310 and JP-A-11-48271. In this method, the produced film is stretched so as to elevate the in-plane retardation value of the cellulose acylate film.

The stretching of film is performed at ordinary temperature or under heating condition. The heating temperature is preferably in the range from 10° C. lower to 10° C. higher than the glass transition temperature of the film. The stretching of film may be uniaxial stretching only in the machine or transverse direction or may be simultaneous or successive biaxial stretching. The stretching is performed at a ratio of 1 to 200%, preferably from 1 to 100%, more preferably from 1 to 80%. An optical film preferably has birefringence such that the refractive index in the width direction is larger than the refractive index in the lengthwise direction. Accordingly, the stretching is preferably performed at a larger ratio in the width direction. The stretching may be performed on the way of film-formation step or the stock film produced and taken up may be stretched. In the former case, the film may be stretched in the state containing a residual solvent amount, and the residual solvent amount (residual solvent amount/(residual solvent amount+solid content amount)) is preferably from 2 to 50%.

In order to improve the wavelength dispersion property of the retardation in the frontal and thickness directions of the film, the film is preferably stretched at a temperature higher than the glass transition temperature by 30 to 100° C., preferably 35 to 90° C., most preferably 40 to 80° C.

By setting the stretching temperature of the film to be higher than the glass transition temperature by 30 to 100° C., the wavelength dispersion property of Re and the wavelength dispersion property of Rth are approximated to a reverse dispersion ($Re_{(400)} < Re_{(700)}$) and a forward dispersion ($Rth_{(400)} > Rth_{(700)}$), respectively, and when the film is loaded in a liquid crystal display, the viewing angle, contrast and change in black color tint can be improved.

The thickness of the cellulose acylate film of the present invention obtained after drying varies depending on the use end but usually, the film thickness is preferably from 5 to 500 µm, more preferably from 20 to 300 µm, still more preferably from 30 to 150 µm. In the case of optical use, particularly, use for VA liquid crystal display devices, the film thickness is preferably from 40 to 110 µm.

When the film thickness is from 110 to 180 µm, the drying load at the casting and film formation becomes large but since the size of optical property is proportional to the film thickness, a desired optical property can be achieved by increasing the film thickness. Also, the moisture permeability decreases in inverse proportion to the film thickness and therefore, when the film thickness is made large, the moisture permeability becomes small to allow for less permeation of water. This is advantageous in a polarizing plate endurance test at 60° C.–90% RH for 500 hours.

The film thickness may be adjusted to a desired thickness by controlling, for example, the concentration of solid contents contained in the dope, the slit gap of die mouth ring, the extrusion pressure from die or the speed of metal support. The thus-obtained cellulose acylate film preferably has a width of 0.5 to 3 m, more preferably from 0.6 to 2.5 m, still more preferably from 0.8 to 2.2 m. The length of the film taken up is preferably from 100 to 10,000 m, more preferably from 500 to 7,000 m, still more preferably from 1,000 to 6,000 m, per roll. At the time of taking up the film, knurling is preferably provided to at least one edge. The width thereof is preferably from 3 to 50 mm, more preferably from 5 to 30 mm, and the height is preferably from 0.5 to 500 µm, more preferably from 1 to 200 µm. The knurling may be provided by either one-sided pressing or double-sided pressing.

[Optical Property of Cellulose Acylate Film]

As for the optical property of the cellulose acylate film of the present invention, in order to widen the viewing angle of a liquid crystal display device, particularly a VA-mode liquid crystal display device, the Re retardation value and the Rth retardation value represented by:

$$Re(\lambda) = (nx - ny) \times d \qquad \text{Formula (IX)}$$

$$Rth(\lambda) = \{(nx + ny)/2 - nz\} \times d \qquad \text{Formula (X)}$$

$$30 \text{ nm} < Re_{(590)} \leq 200 \text{ nm} \qquad \text{Formula (XI)}$$

$$70 \text{ nm} \leq Rth_{(590)} \leq 400 \text{ nm} \qquad \text{Formula (XII)}$$

[wherein $Re(\lambda)$ is a front retardation value (unit: nm) at a wavelength of λ nm, $Rth(\lambda)$ is a retardation value (unit: nm) in the film thickness direction at a wavelength of λ nm, nx is a refractive index in the slow axis direction in the film plane, ny is a refractive index in the fast axis direction in the film plane, nz is a refractive index in the film thickness direction, and d is a film thickness].

The Re retardation value more preferably satisfy the Formula (XIII)

$$40 \leq Re_{(590)} \leq 100 \qquad \text{Formula (XIII)}$$

Also, the cellulose acylate film of the present invention preferably satisfies the following Formula (XIV), because particularly the viewing angle of a VA-mode liquid crystal display device can be widened:

$$170 \text{ nm} \leq Rth_{(590)} \leq 300 \text{ nm}. \qquad \text{Formula (XIV)}$$

Furthermore, in the cellulose acylate film of the present invention, $Re_{(630)}$ and $Rth_{(630)}$ at 25° C.–60% RH preferably satisfy the following formulae (A) to (C):

$$46 \leq Re_{(630)} \leq 150 \qquad \text{Formula (A)}$$

$$Rth_{(630)} = a - 5.9 Re_{(630)} \qquad \text{Formula (B)}$$

$$580 \leq a \leq 670 \qquad \text{Formula (C)}$$

[wherein $Re_{(630)}$ is a front retardation value (unit: nm) at a wavelength of 630 nm, $Rth_{(630)}$ is a retardation value (unit: nm) in the film thickness direction at a wavelength of 630 nm, and a is an adjustment factor (unit: nm) of optical property].

a is an adjustment factor for Re and Rth and is more preferably $590 \leq a \leq 660$, still more preferably $600 \leq a \leq 650$. When a is in the above-described range, the viewing angle property of a vertically aligned-mode liquid crystal display device is widened and this is preferred.

As for the optical properties (Re and Rth), from the standpoint of improving the viewing angle, contrast and change in black color tint of a liquid crystal display, particularly a VA- or OCB-mode liquid crystal display, the cellulose acylate film of the present invention preferably has a wavelength dispersion property such that $Re_{(400)}$, $Re_{(550)}$, $Re_{(700)}$, $Rth_{(400)}$, $Rth_{(550)}$ and $Rth_{(700)}$ satisfy the following formulae D1 and E1:

$$Re_{(400)} < Re_{(550)} < Re_{(700)} \qquad \text{Formula (D1)}$$

$$Rth_{(400)} > Rth_{(550)} > Rth_{(700)} \qquad \text{Formula (E1)}$$

In addition, it is more preferable that $Re_{(400)}$, $Re_{(550)}$, $Re_{(700)}$, $Rth_{(400)}$, $Rth_{(550)}$ and $Rth_{(700)}$ satisfy the following formulae D2 and E2:

$$0.2 \leq Re_{(400)}/Re_{(550)} \leq 0.8, \ 1.7 \geq Re_{(700)}/Re_{(550)} \geq 1.2 \qquad \text{Formula (D2)}$$

$$1.7 \geq Rth_{(400)}/Rth_{(550)} \geq 0.90, \ 0.2 \leq Rth_{(700)}/Rth_{(550)} \leq 1.1 \qquad \text{Formula (E2)}$$

The range of $Re_{(400)}$, $Re_{(550)}$ and $Re_{(700)}$ is more preferably $0.22 \leq Re_{(400)}/Re_{(550)} \leq 0.78$ and $1.68 \geq Re_{(700)}/Re_{(550)} \geq 1.21$, and most preferably $0.24 \leq Re_{(400)}/Re_{(550)} \leq 0.77$ and $1.66 \geq Re_{(700)}/Re_{(550)} \geq 1.22$. Also, the range of $Rth_{(400)}$, $Rth_{(550)}$ and $Rth_{(700)}$ is more preferably $1.68 \geq Rth_{(400)}/Rth_{(550)} \geq$ 0.95 and $0.22 \leq Rth_{(700)}/Rth_{(550)} \leq 1.05$, and most preferably $1.66 \geq Rth_{(400)}/Rth_{(550)} \geq 1.00$ and $0.24 \leq Rth_{(700)}/Rth_{(550)} \leq 1.00$.

In the cellulose acylate film of the present invention, the difference ΔRe (=Re10% RH−Re80% RH) between the Re value at 25° C.−10% RH and the Re value at 25° C.−80% RH is preferably from 0 to 10 nm and the difference ΔRth (=Rth10% RH−Rth80% RH) between the Rth value at 25° C.−10% RH and the Rth value at 25° C.−80% RH is preferably from 0 to 30 nm, because the change of color tint in aging of a liquid crystal display device is decreased.

The Re and Rth distributions were measured as follows. The film was sampled by using a cutting plotter such that 10 samples of 2 cm (width direction)×3 cm (direction orthogonal to width direction) were sequentially sampled in the casting width direction from the position at 5 cm inside the film edge part for 20 points at equal intervals. As for the film casting direction, the sampling was performed 5 times at intervals of 1 m in the casting direction. Also, the sampling was randomly performed 20 times per 1 film roll. In this way, distributions of Re, Rth and film thickness were determined. In determining the film thickness of each specimen (2 cm×3 cm), the film thickness was measured for 9 points in total at 3 portions in each of the machine and transverse directions in the film plane and used as the film thickness of the sample.

When the film thickness distribution R is defined as R (%)=(Rmax−Rmin)/Rave×100 with the assumption that the maximum value, minimum value and average value of the film thickness in the width direction are Rmax, Rmin and Rave, respectively, the film thickness distribution is preferably adjusted to 0 to 8%, more preferably from 0 to 7.8%, still more preferably from 0 to 7.6%. Since the Re and Rth values are proportional to the film thickness, the film thickness distribution in the width direction is preferably smaller because the $Re_{(590)}$ and $Rth_{(590)}$ are more reduced in the fluctuation.

The distributions of $Re_{(590)}$ and $Rth_{(590)}$ are generated due to fluctuation in the above-described film thickness or due to unevenness of stretching or drying. The Re distribution (fluctuation) is preferably adjusted to 5% or less, more preferably 4.8% or less, still more preferably 4.6% or less, and the Rth distribution is preferably adjusted to 10% or less, more preferably 9.8% or less, still more preferably 9.6% or less.

The film thickness distribution R, Re distribution and Rth distribution in these ranges are preferred because when a liquid crystal display device (particularly, VA liquid crystal display device) using the film is displayed, the display unevenness is decreased.

The optical property was measured by using an automatic birefringence meter (KOBRA-21ADH, manufactured by Oji Test Instruments) at 25° C.−60% RH after moisture-conditioning the film in an environment of 25° C.−60% RH for 2 hours or more. The optical properties at 25° C.−10% RH and at 25° C.−80% RH were also measured by setting the measuring environment to 25° C.−10% RH and 25° C.−80% RH after moisture-conditioning the film in respective environments.

In the cellulose acylate film of the present invention, the sound velocity V(MD) at 25° C.−60% RH in the casting (transportation) direction is preferably from 1.0 to 3.0 km/s, more preferably from 1.3 to 2.7 km/s, still more preferably from 1.6 to 2.3 k/ms. The sound velocity V(TD) in the casting width direction (direction perpendicular to casting) is preferably from 1.0 to 3.0 km/s, more preferably from 1.5 to 2.8 km/s, still more preferably from 1.7 to 2.7 km/s, yet still more preferably from 1.9 to 2.6 km/s. The sound velocity was measured by using SST-110 of Nomura.

Furthermore, the ratio of sound velocity V(MD) to V(TD) preferably satisfies the following Formula (VIII), because a liquid crystal display device reduced in the change of viewing angle property is obtained.

$$0.5 \leq V(MD)/V(TD) \leq 2 \qquad \text{Formula (VIII)}$$

In the cellulose acylate film of the present invention, the equilibrium moisture content at 25° C.−80% RH is preferably 5.0% or less, more preferably 4.0% or less, still more preferably 3.2% or less, so that the color tint of a liquid crystal display device can be less changed in aging.

In determining the moisture content, a sample (7 mm×35 mm) of the cellulose acylate film of the present invention is measured by the Karl Fischer's method with use of a water content measuring meter and a sample drying apparatus (CA-03 and VA-05, both manufactured by Mitsubishi Chemical Corporation). The moisture content is calculated by dividing the water content (g) by the sample weight (g).

In the cellulose acylate film of the present invention, the moisture permeability (in terms of moisture permeability with a film thickness of 80 μm) at 60° C.−95% RH for 24 hours is preferably from 400 to 1,800 g/m²·24 hr, because the change of color tint in aging of a liquid crystal display device can be decreased.

The film is preferably decreased in the moisture permeability from the standpoint of suppressing the change in color tint and polarization degree at an environmental test of film and an endurance test of polarizing plate.

The moisture permeability becomes small when the thickness of cellulose acylate film is large, and becomes large when the film thickness is small. The measured moisture permeability is reduced assuming that the standard film thickness is 80 μm. The reduced value of moisture permeability is calculated according to "80 μm-reduced moisture permeability=measured moisture permeability×measured film thickness μm/80 μm".

As for the measurement method of moisture permeability, the methods described in "Measurement of Amount of Water Vapor Permeated (weighing method, thermometer method, water vapor pressure method, adsorption amount method)" of *Kobunshi Jikken Koza* 4, *Kobunshi no Bussei II (Polymer Experiment Lecture 4 Physical Properties II of Polymers)*, pp. 285-294, Kyoritsu Shuppan, can be applied.

In the measurement of glass transition temperature, a sample (unstretched) (5 mm×30 mm) of the cellulose acylate film of the present invention is moisture-conditioned at 25° C.−60% RH for 2 hours or more and then measured by a dynamic viscoelasticity meter (Bibron DVA-225 (manufactured by IT Keisoku Seigyo K.K.)) under the conditions such that the gripping distance is 20 mm, the temperature rising rate is 2° C./min, the measurement temperature range is from 30 to 200° C. and the frequency is 1 Hz. The storage modulus is taken as a logarithmic axis on the ordinate, the temperature (° C.) is taken as a linear axis on the abscissa, and a straight line 1 in the solid region and a straight line 2 in the glass transition region are drawn to determine the abrupt decrease of the storage modulus which is observed when the storage modulus transfers from the solid region to the glass transition region. The intersection of straight line 1 and straight line 2 is the temperature where the storage modulus abruptly decreases at the temperature rise and the film starts softening, and this is a temperature where the transfer to the glass transition region starts, and is defined as the glass transition temperature Tg (dynamic viscoelasticity).

In the measurement of modulus of elasticity, a sample (10 mm×150 mm) of the cellulose acylate film of the present invention is moisture-conditioned at 25° C.−60% RH for 2 hours or more and then measured by a tensile tester (Strography R2 (manufactured by Toyo Seiki Seisaku-Sho, Ltd.)) under the conditions such that the chuck-to-chuck distance was 100 mm, the temperature was 25° C. and the drawing rate was 10 mm/min.

In the cellulose acylate film of the present invention, the haze is preferably from 0.01 to 2%. The haze is measured as follows.

A sample (40 mm×80 mm) of the cellulose acylate film of the present invention is measured according to JIS K-6714 by a haze meter (HGM-2DP, manufactured by Suga Test Instruments Co., Ltd.) at 25° C. and 60% RH.

In the cellulose acylate film of the present invention, the change in the mass when the film is left standing for 48 hours under the conditions of 80° C. and 90% RH is preferably from 0 to 5%.

In the cellulose acylate film of the present invention, the dimensional change when the film is left standing for 24 hours under the conditions of 60° C. and 95% RH, and the dimensional change when the film is left standing for 24 hours under the conditions of 90° C. and 5% RH, each is preferably from 0 to 5%.

In the cellulose acylate film of the present invention, the photoelastic coefficient is preferably $50 \times 10^{-13}$ cm$^2$/dyne or less, because the change of color tint in aging of a liquid crystal display device is decreased.

As for the specific measuring method, a cellulose acylate film sample (10 mm×10 mm) is applied with a tensile stress in the long axis direction and the retardation at this time is measured by an ellipsometer (M150, manufactured by JASCO Corporation). The photoelastic coefficient is calculated from the variation of retardation based on the stress.

[Polarizing Plate]

The polarizing plate of the present invention is described below.

A polarizing plate usually comprises a polarizer and two transparent protective films disposed on both sides of the polarizer. In the present invention, the cellulose acylate film of the present invention is used as at least one protective film. The another protective film may be the cellulose acylate film of the present invention or may be an ordinary cellulose acetate film. The polarizer includes an iodine-based polarizer, a dye-based polarizer using a dichromatic dye, and a polyene-based polarizer. The iodine-based polarizer and dye-based polarizer are generally produced by using a polyvinyl alcohol-based film. In the case of using the cellulose acylate film of the present invention as the protective film of the polarizing plate, the polarizing plate is not particularly limited in its production method and can be produced by a general method. For example, a method where the obtained cellulose acylate film is alkali-treated and with use of an aqueous solution of completely saponified polyvinyl alcohol, the alkali-treated film is laminated to both surfaces of a polarizer obtained by dipping and stretching a polyvinyl alcohol film in an iodine solution may be used. Instead of the alkali treatment, a process for easy adhesion described in JP-A-6-94915 and JP-A-6-118232 may be applied. Examples of the adhesive used for laminating the treated surface of protective film to the polarizer include a polyvinyl alcohol-based adhesive such as polyvinyl alcohol and polyvinyl butyral, and a vinyl-based latex such as butyl acrylate. The polarizing plate is constituted by a polarizer and protective films protecting both surfaces of the polarizer, and may be constituted by further laminating a protect film to one surface of the polarizing plate and a separate film to the opposite surface. The protect film and separate film are used for the purpose of protecting the polarizing plate, for example, at the shipment of polarizing plate or at the inspection of product. In this case, the protect film is laminated for the purpose of protecting the polarizing plate surface and used on the side-opposite the surface through which the polarizing plate is attached to a liquid crystal plate. The separate film is used for the purpose of covering the adhesive layer which adheres to a liquid crystal plate and used on the side of the surface through which the polarizing plate is attached to a liquid crystal plate.

The cellulose acylate film of the present invention is preferably laminated to a polarizer so that, as shown in FIG. 1, the transmission axis of polarizer can agree with the slow axis of the cellulose acylate film (TAC1 in the Figure) of the present invention.

Incidentally, in the case of a polarizing plate produced in the polarizing plate cross-Nicol state, if the orthogonal precision between the slow axis of the cellulose acylate film of the present invention and the absorption axis (axis orthogonal to transmission axis) of the polarizer exceeds 1°, the polarization degree performance in the polarizing plate cross-Nicol state decreases to cause light-through and when combined with a liquid crystal cell, a sufficiently high black level or contrast cannot be obtained. Therefore, the slippage between the main refractive index nx direction of the cellulose acylate film of the present invention and the transmission axis direction of the polarizer is preferably within 1°, more preferably within 0.5°.

In the present invention, the single plate transmittance, parallel transmittance and cross transmittance of the polarizing plate were measured by using UV3100PC (manufactured by Shimadzu Corporation). The measurement was performed under the conditions of 25° C.–60% RH in the range from 280 to 780 nm, and an average of 10 measurements was used for all of the single plate transmittance, parallel transmittance and cross transmittance. The endurance test of polarizing plate was performed in two modes, that is, (1) a polarizing plate alone and (2) a polarizing plate attached to a glass through a pressure-sensitive adhesive. In the measurement of a polarizing plate alone, two polarizers were combined by inserting an optical compensatory sheet therebetween and two samples having the same crossing were prepared. For the glass-laminated mode, the polarizing plate was laminated on a glass such that the optical compensatory film came to the glass side, and two samples (about 5 cm×5 cm) were prepared. The single plate transmittance was measured by directing the film side of the sample toward the light source. Two samples were measured and the average of the obtained values was used as the single plate transmittance. The polarizing performance is preferably, in the order of single plate transmittance, parallel transmittance and cross transmittance, $40.0 \leq TT \leq 45.0$, $20.0 \leq PT \leq 40.0$ and $CT \leq 2.0$, more preferably $40.2 \leq TT \leq 44.8$, $32.2 \leq PT \leq 39.5$ and $CT \leq 1.6$, still more preferably $41.0 \leq TT \leq 44.6$, $34 \leq PT \leq 39.1$ and $CT \leq 1.3$.

The polarization degree P is calculated from these transmittances and as the polarization degree P is larger, the light leakage in the cross arrangement decreases and the performance of the polarizing plate is higher. The polarization degree P is preferably 95.0% or more, more preferably 96.0% or more, still more preferably 97.0% or more.

In the polarizing plate of the present invention, assuming that the cross transmittance at a wavelength of λ is T(λ), $T_{(380)}$, $T_{(410)}$ and $T_{(700)}$ preferably satisfy at least one of the following formulae (e) to (g):

$$T(380) \leq 2.0 \tag{e}$$

$$T(410) \leq 0.1 \tag{f}$$

$$T(700) \leq 0.5. \tag{g}$$

The cross transmittance is more preferably T(380)≦1.95, T(410)≦0.9 and T(700)≦0.49, still more preferably T(380) ≦1.90, T(410)≦0.8 and T(700)≦0.48.

In the polarizing plate of the present invention, when the polarizing plate is left standing at 60° C.–95% RH for 500 hours, the variation ΔCT of single plate cross transmittance and the variation ΔP of polarization degree preferably satisfy at least one or more of the following formulae (j) and (k):

$$-6.0 \leq \Delta CT \leq 6.0 \tag{j}$$

$$-10.0 \leq \Delta P \leq 0.0. \tag{k}$$

(here, the variation means a value obtained by subtracting the measured value before test from the measured value after test).

The variation is more preferably −5.8≦ΔCT≦5.8 and −9.5≦ΔP≦0.0, still more preferably −5.6≦ΔCT≦5.6 and −9.0≦ΔP≦0.0.

In the polarizing plate of the present invention, when the polarizing plate is left standing at 60° C.–90% RH for 500 hours, the variation ΔCT of single plate cross transmittance and the variation ΔP of polarization degree preferably satisfy at least one or more of the following formulae (h) and (i):

$$-3.0 \leq \Delta CT \leq 3.0 \tag{h}$$

$$-5.0 \leq \Delta P \leq 0.0. \tag{i}$$

In the polarizing plate of the present invention, when the polarizing plate is left standing at 80° C. for 500 hours, the variation ΔCT of single plate cross transmittance and the variation ΔP of polarization degree preferably satisfy at least one or more of the following formulae (l) and (m):

$$-3.0 \leq \Delta CT \leq 3.0 \tag{l}$$

$$-2.0 \leq \Delta P \leq 0.0. \tag{m}$$

In the endurance test of polarizing plate, the variation is preferably smaller.

[Surface Treatment]

The cellulose acylate film of the present invention may be surface-treated depending on the case, whereby the adhesion of the cellulose acylate film to respective functional layers (for example, undercoat layer and back layer) can be enhanced. Examples of the surface treatment which can be used include glow discharge treatment, ultraviolet irradiation treatment, corona treatment, flame treatment and acid or alkali treatment. The glow discharge treatment may be a low-temperature plasma occurring in a low-pressure gas of $10^{-3}$ to 20 Torr. A plasma treatment in an atmospheric pressure is also preferred. The plasma-exciting gas means a gas which is plasma-excited under such a condition, and examples thereof include argon, helium, neon, krypton, xenon, nitrogen, carbon dioxide, fluorocarbons such as tetrafluoromethane, and a mixture thereof. These are described in detail in *JIII Journal of Technical Disclosure*, No. 2001-1745, pp. 30-32, Japan Institute of Invention and Innovation (Mar. 15, 2001). The atmospheric pressure plasma treatment which is recently taken notice of uses, for example, an irradiation energy of 20 to 500 Kgy at 10 to 1,000 Kev, preferably an irradiation energy of 20 to 300 Kgy at 30 to 500 Kev. Among these treatments, an alkali saponification treatment is preferred and this is a very effective surface treatment for cellulose acylate film.

The alkali saponification treatment is preferably performed by a method of dipping the cellulose acylate film directly in a bath containing a saponification solution or a method of coating a saponification solution on the cellulose acylate film. Examples of the coating method include a dip coating method, a curtain coating method, an extrusion coating method, a bar coating method and an E-type coating method. Since the saponification solution is coated on the cellulose acylate film, the solvent for the alkali saponification treatment coating solution is preferably selected from those having good wettability and assuring good surface state without forming irregularities on the cellulose acylate film surface. More specifically, an alcohol-based solvent is preferred, and isopropyl alcohol is more preferred. An aqueous solution of surfactant may also be used as the solvent. The alkali in the alkali saponification coating solution is preferably an alkali dissolvable in the above-described solvent, more preferably KOH or NaOH. The pH of the saponification coating solution is preferably 10 or more, more preferably 12 or more. The reaction conditions at the alkali saponification are preferably room temperature and from 1 second to 5 minutes, more preferably from 5 seconds to 5 minute, still more preferably from 20 seconds to 30 minutes. After the alkali saponification reaction, the saponification solution-coated surface is preferably washed with water or washed with an acid and then with water.

Figure 2:
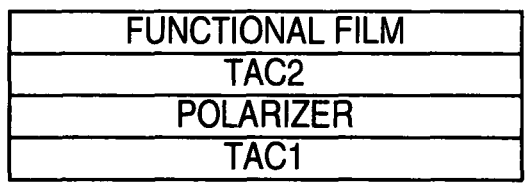
[FIG. 2] A cross-sectional view schematically showing the cross-sectional structure of the polarizing plate of the present invention.

In the polarizing plate of the present invention, at least one layer selected from a hard coat layer, an antiglare layer and an antireflection layer is preferably provided on the surface of the protective film on another side of the polarizing plate. That is, as shown in FIG. 2, a functional film such as antireflection layer is preferably provided on the protective film (TAC2) disposed on the side opposite the liquid crystal cell at the application of the polarizing plate to a liquid crystal display device, and at least one layer selected from a hard coat layer, an antiglare layer and an antireflection layer is preferably provided as such a functional film. Incidentally, these layers need not be provided as individual layers but, for example, function as an antiglare layer may be imparted to an antireflection layer, so that the antireflection layer can function both as an antireflection layer and as an antiglare layer.

[Antireflection Layer]

In the present invention, an antireflection layer obtained by stacking at least a light scattering layer and a low refractive index layer in this order on the protective layer, or an antireflection layer obtained by stacking a medium refractive index layer, a high refractive index layer and a low refractive index layer in this order on the protective film is suitably used. Preferred examples thereof are described below.

Preferred examples of the antireflection layer obtained by providing a light scattering layer and a low refractive index layer on the protective film are described below.

In the light scattering layer, matting particles are preferably dispersed, and the material for the light scattering layer in the portion except for matting particles preferably has a refractive index of 1.50 to 2.00. The refractive index of the low refractive index layer is preferably from 1.20 to 1.49. In the present invention, the light scattering layer has both an antiglare property and a hard-coat property and may comprise a single layer or a plurality of layers, for example, from 2 to 4 layers.

The antireflection layer is preferably designed to have a surface irregularity shape such that the center line average roughness Ra is from 0.08 to 0.40 μm, the 10-point average roughness Rz is 10 times or less of Ra, the average peak-to-trough distance Sm is from 1 to 100 μm, the standard deviation of the protrusion height from the deepest portion of irregularities is 0.5 μm or less, the standard deviation of the average peak-to-trough distance Sm based on the center line is 20 μm or less, and the plane at a tilt angle of 0 to 5° occupies 10% or more, because satisfactory antiglare property and visually uniform matted feeling is achieved. Also, when the color tint of reflected light under a C light source has a* value of −2 to 2 and b* value of −3 to 3 and the ratio of minimum reflectance to maximum reflectance in the range of 380 to 780 nm is from 0.5 to 0.99, the reflected light gives a neutral color tint and this is preferred. Furthermore, the b* value of transmitted light under a C light source is preferably adjusted to 0 to 3, so that yellow tinting of white display when applied to a display device can be decreased. In addition, when a lattice of 120 μm×40 μm is inserted between the surface light source and the antireflection film of the present invention and the brightness distribution on the film is measured, the standard deviation of the brightness distribution is preferably 20 or less, because the film of the present invention less glares when applied to a high-definition panel.

The antireflection layer usable in the present invention preferably has optical properties such that the mirror reflectivity is 2.5% or less, the transmittance is 90% or more, and the 60-degree glossiness is 70% or less. With such optical properties, the reflection of external light can be inhibited and the visibility is enhanced. In particular, the mirror reflectivity is more preferably 1% or less, and most preferably 0.5% or less. Also, when the haze is from 20 to 50%, the internal haze/entire haze value is from 0.3 to 1, the decrease of the haze value after formation of the low refractive index layer from the haze value with layers up to the light scattering layer is within 15%, the clearness of transmitted image is from 20 to 50% with a comb width of 0.5 mm, and the vertical light transmittance/transmittance in the direction inclined at 2° from the vertical direction is from 1.5 to 5.0, the high-definition LCD panel can be prevented from glaring or blurring of letters or the like and this is preferred.

[Low Refractive Index Layer]

The refractive index of the low refractive index layer which can be used in the present invention is preferably from 1.20 to 1.49, more preferably from 1.30 to 1.44. Furthermore, in view of reducing the reflectance, the low refractive index layer preferably satisfies the following Formula (XV):

$$(m/4) \times 0.7 < n1 d1 < (m/4) \times 1.3 \quad \text{Formula (XV)}$$

wherein m is a positive odd number, n1 is a refractive index of the low refractive index layer, d1 is a film thickness (nm) of the low refractive index layer, and λ is a wavelength and a value in the range of 500 to 550 nm.

The materials constituting the low refractive index layer are described below.

The low refractive index layer preferably contains a fluorine-containing polymer as the low refractive index binder. The fluorine polymer is preferably a fluorine polymer in which the coefficient of dynamic friction is from 0.03 to 0.20, the contact angle with water is from 90 to 120°, and the slipping angle of pure water is 70° or less and which is crosslinked by ionizing radiation. When the polarizing plate of the present invention is mounted in an image display device, the peel force with a commercially available adhesive tape is preferably lower because a seal or memo attached can be easily peeled off, and the peel force as measured by a tensile tester is preferably 500 gf or less, more preferably 300 gf or less, and most preferably 100 gf or less. Also, as the surface hardness is higher, the scratching is less caused, and the surface hardness as measured by a microhardness meter is preferably 0.3 GPa or more, more preferably 0.5 GPa or more.

Examples of the fluorine-containing polymer for use in the low refractive index layer include a hydrolysate or dehydrating condensate of a perfluoroalkyl group-containing silane compound (e.g., (heptadecafluoro-1,1,2,2-tetrahydrodecyl) triethoxysilane), and a fluorine-containing copolymer in which a fluorine-containing monomer unit and a constituent unit for imparting crosslinking reactivity are contained as the constituent components.

Specific examples of the fluorine-containing monomer unit include fluoroolefins (e.g., fluoroethylene, vinylidene fluoride, tetrafluoroethylene, perfluorooctylethylene, hexafluoropropylene, perfluoro-2,2-dimethyl-1,3-dioxol), partial or complete fluorinated alkyl ester derivatives of (meth)acrylic acid (e.g., BISCOTE 6FM (produced by Osaka Yuki Kagaku), M-2020 (produced by Daikin)), and complete or partial fluorinated vinyl ethers. Among these, perfluoroolefins are preferred and in view of refractive index, solubility, transparency, availability and the like, hexafluoropropylene is more preferred.

Examples of the constituent unit for imparting crosslinking reactivity include a constituent unit obtained by the polymerization of a monomer previously having a self-crosslinking functional group within the molecule, such as glycidyl (meth) acrylate and glycidyl vinyl ether; a constituent unit obtained by the polymerization of a monomer having a carboxyl group, a hydroxyl group, an amino group or the like, such as (meth) acrylic acid, methylol (meth)acrylate, hydroxyalkyl (meth) acrylate, allyl acrylate, hydroxyethyl vinyl ether, hydroxybutyl vinyl ether, maleic acid and crotonic acid; and a constituent unit obtained by introducing a crosslinking reactive group such as (meth)acryloyl group into the above-described constituent units by a polymer reaction (for example, the crosslinking reactive group can be introduced by causing an acrylic acid chloride to act on a hydroxyl group).

Other than the above-described fluorine-containing monomer unit and constituent unit for imparting crosslinking reactivity, in view of transparency or the like of the film, a monomer not containing a fluorine atom may also be appropriately copolymerized. The monomer unit which can be used in combination is not particularly limited and examples thereof include olefins (e.g., ethylene, propylene, isoprene, vinyl chloride, vinylidene chloride), acrylic acid esters (e.g., methyl acrylate, methyl acrylate, ethyl acrylate, 2-ethylhexyl acrylate), methacrylic acid esters (e.g., methyl methacrylate, ethyl methacrylate, butyl methacrylate, ethylene, glycol dimethacrylate), styrene derivatives (e.g., styrene, divinylbenzene, vinyltoluene, α-methylstyrene), vinyl ethers (e.g., methyl vinyl ether, ethyl vinyl ether, cyclohexyl vinyl ether), vinyl esters (e.g., vinyl acetate, vinyl propionate, vinyl cinnamate), acrylamides (e.g., N-tert-butylacrylamide, N-cyclohexylacrylamide), methacryl-amides and acrylonitrile derivatives.

With such a polymer, a hardening agent may be appropriately used in combination as described in JP-A-10-25388 and JP-A-10-147739.

[Light Scattering Layer]

The light scattering layer is formed for the purpose of providing the film with light scattering property by virtue of at least either surface scattering or inner scattering, and hard-coat property for enhancing the scratch resistance of the film. Accordingly, the light scattering layer comprises a binder for imparting hard-coat property, a matting particle for imparting light scattering property, and, if desired, an inorganic filler for elevating the refractive index, preventing crosslinking shrinkage and intensifying the strength. Furthermore, when such a light scattering layer is formed, the light scattering layer functions also as an antiglare layer and the polarizing plate comes to have an antiglare layer.

From the standpoint of imparting the hard-coat property, the thickness of the light scattering layer is preferably from 1 to 10 μm, more preferably from 1.2 to 6 μm. If the thickness is too small, the hard property is insufficient, whereas if it is too large, the curling or brittleness changes for the worse and the suitability for processing is not satisfied.

The binder of the light scattering layer is preferably a polymer having a saturated hydrocarbon chain or a polyether chain as the main chain, more preferably a polymer having a saturated hydrocarbon chain as the main chain. Also, the binder polymer preferably has a crosslinked structure. The binder polymer having a saturated hydrocarbon chain as the main chain is preferably a polymer of an ethylenically unsaturated monomer. The binder polymer having a saturated hydrocarbon chain as the main chain and having a crosslinked structure is preferably a (co)polymer of a monomer having two or more ethylenically unsaturated groups. In order to obtain a binder polymer having a high refractive index, a monomer where an aromatic ring or at least one atom selected from a halogen atom (except for fluorine), a sulfur atom, a phosphorus atom and a nitrogen atom is contained in the structure may also be selected.

Examples of the monomer having two or more ethylenically unsaturated groups include esters of a polyhydric alcohol and a (meth)acrylic acid, such as ethylene glycol di(meth)acrylate, butanediol di(meth)acrylate, hexanediol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate and polyester polyacrylate; ethylene oxide-modified products of these esters; vinylbenzene and derivatives thereof, such as 1,4-divinylbenzene, 4-vinylbenzoic acid-2-acryloyl ethyl ester, 1,4-divinylcyclohexanone; vinylsulfones such as divinylsulfone; acrylamides such as methylenebisacrylamide; and methacrylamides. These monomers may be used in combination of two or more thereof.

Specific examples of the high refractive index monomer include bis(4-methacryloylthiophenyl)sulfide, vinylnaphthalene, vinylphenyl sulfide and 4-methacryloxyphenyl-4'-methoxyphenyl thioether. These monomers may also be used in combination of two or more thereof.

Such a monomer having ethylenically unsaturated groups can be polymerized by the irradiation of ionizing radiation or under heat, in the presence of a photo-radical initiator or a thermal radical initiator.

Accordingly, the antireflection film can be formed by preparing a coating solution containing a monomer having ethylenically unsaturated groups, a photo-radical initiator or a thermal radical initiator, a matting particle and an inorganic filler, coating the coating solution on the protective film, and curing the coating solution by a polymerization reaction under the irradiation of ionization radiation or under heat. As for the photo-radical initiator and the like, known materials can be used.

The polymer having a polyether as the main chain is preferably a ring-opening polymerization product of a polyfunctional epoxy compound. The ring-opening polymerization of a polyfunctional epoxy compound can be performed by the irradiation of ionizing radiation or under heat, in the presence of a photoacid generator or a heat-acid generator.

Accordingly, the antireflection film can be formed by preparing a coating solution containing a polyfunctional epoxy compound, a photoacid generator or a heat-acid generator, a matting particle and an inorganic filler, coating the coating solution on the protective film, and curing the coating solution by a polymerization reaction under the irradiation of ionizing radiation or under heat.

The crosslinked structure may also be introduced into the binder polymer with use of a monomer having a crosslinking functional group in place of or in addition to the monomer having two or more ethylenically unsaturated groups, by introducing the crosslinking functional group into the polymer and causing a reaction of the crosslinking functional group.

Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivative, a melamine, an etherified methylol, an ester, a urethane, and a metal alkoxide such as tetramethoxysilane can be used as a monomer for introducing the crosslinked structure. A functional group of exhibiting crosslinking property as a result of decomposition reaction, such as blocked isocyanate group, may also be used. That is, the crosslinking functional group for use in the present invention may not be a functional group which directly causes a reaction, but may be a functional group which exhibits reactivity as a result of decomposition.

Such a binder polymer having a crosslinking functional group is coated and then heated, whereby a crosslinked structure can be formed.

In the light scattering layer, a matting particle larger than the filler particle and having an average particle size of 1 to 10 µm, preferably 1.5 to 7.0 µm, such as inorganic compound particle or resin particle, is contained for the purpose of imparting antiglare property.

Specific preferred examples of the matting particle include an inorganic compound particle such as silica particle and $TiO_2$ particle; and a resin particle such as acrylic particle, crosslinking acrylic particle, polystyrene particle, crosslinking styrene particle, melamine resin particle and benzoguanamine resin particle. Among these, a crosslinking styrene particle, a crosslinking acryl particle, a crosslinking acrylstyrene particle and a silica particle are preferred. The shape of the matting particle may be either spherical or amorphous.

Furthermore, two or more matting particles differing in the particle diameter may also be used in combination. A matting particle having a larger particle diameter can impart antiglare property, while imparting another optical property by a matting particle having a smaller particle diameter.

The particle diameter distribution of the matting particle is most preferably monodisperse, and individual particles preferably have the same particle diameter as much as possible. For example, when a particle having a particle diameter 20% or more larger than the average particle diameter is defined as a coarse particle, the percentage of coarse particles in all particles is preferably 1% or less, more preferably 0.1% or less, still more preferably 0.01% or less. The matting particle having such a particle diameter distribution is obtained by classifying the particles after a normal synthesis reaction, and when the number of classifications is increased or the level of classification is elevated, a matting agent having a more preferred distribution can be obtained.

The matting particle is preferably contained in the light scattering layer such that the amount of the matting particle in the formed light scattering layer is from 10 to 1,000 mg/m$^2$, more preferably from 100 to 700 mg/m$^2$.

The particle size distribution of the matting particle is measured by a Coulter counter method, and the measured distribution is reduced to a particle number distribution.

In order to increase the refractive index of the light scattering layer, the layer preferably contains, in addition to the above-described matting particle, an inorganic filler comprising an oxide of at least one metal selected from titanium, zirconium, aluminum, indium, zinc, tin and antimony and having a particle diameter of 0.2 µm or less, preferably 0.1 µm or less, more preferably 0.06 µm or less.

On the contrary, in order to increase the difference in the refractive index from the matting particle, a silicon oxide is preferably used in the light scattering layer using a high refractive index matting particle so that the refractive index of the layer can be kept rather low. The preferred particle diameter is the same as that of the above-described inorganic filler.

Specific examples of the inorganic filler for use in the light scattering layer include $TiO_2$, $ZrO_2$, $Al_2O_3$, $In_2O_3$, ZnO, $SnO_2$, $Sb_2O_3$, ITO and $SiO_2$. Among these, $TiO_2$ and $ZrO_2$ are preferred from the standpoint of elevating the refractive index. It is also preferred to treat the inorganic filler surface by silane coupling treatment or titanium coupling treatment. A surface treating agent having a functional group capable of reacting with the binder species on the filler surface is preferably used.

The amount of the inorganic filler added is preferably from 10 to 90%, more preferably from 20 to 80%, still more preferably from 30 to 75%, of the entire mass of the light scattering layer.

Such as filler causes no scattering because the particle diameter is sufficiently smaller than the wavelength of light, and the dispersion of the filler in the binder polymer behaves as an optically uniform material.

The bulk of a mixture of the binder and the inorganic filler in the light scattering layer preferably has a refractive index of 1.50 to 2.00, more preferably from 1.51 to 1.80. The refractive index in this range can be obtained by appropriately selecting the kind of the binder and inorganic filler and the ratio of amounts thereof. The kind and ratio to be selected can be easily known by previously performing an experiment.

Particularly, in order to prevent coating unevenness, drying unevenness, point defect or the like and ensure surface uniformity of the light scattering layer, the coating composition for the formation of the light scattering layer contains either a fluorine-containing surfactant or a silicone-containing surfactant or both thereof. Among these surfactants, a fluorine-containing surfactant is preferably used, because with a smaller amount of the surfactant added, the effect of improving surface failures such as coating unevenness, drying unevenness and point defect of the antireflection film of the present invention can be brought out. It is a purpose to impart suitability for high-speed coating while enhancing the surface uniformity and thereby elevate the productivity.

The antireflection layer formed by stacking a medium refractive index layer, a high refractive index layer and a low refractive index layer in this order on the protective film is described below.

The antireflection layer comprising a layer structure of at least a medium refractive index layer, a high refractive index layer and a low refractive index layer (outermost layer) on the protective film is designed to have a refractive index satisfying the following relationships:

refractive index of high refractive index
 layer>refractive index of medium refractive
 index layer>refractive index of protective
 film>refractive index of low refractive index
 layer.

Also, a hard coat layer may be provided between the protective film and the medium refractive index layer. Furthermore, the antireflection layer may comprises a medium refractive index layer, a hard coat layer, a high refractive index layer and a low refractive index layer.

Examples thereof include antireflection layers described in JP-A-8-122504, JP-A-8-110401, JP-A-10-300902, JP-A-2002-243906 and JP-A-2000-111706.

Other functions may be imparted to each layer, and examples thereof include an antifouling low refractive index layer and an antistatic high refractive index layer (see, for example, JP-A-10-206603 and JP-A-2002-243906).

The haze of the antireflection layer is preferably 5% or less, more preferably 3% or less. The strength of the film is, in a pencil hardness test according to JIS K5400, preferably H or more, more preferably 2H or more, and most preferably 3H or more.

[High Refractive Index Layer and Medium Refractive Index Layer]

In the antireflection layer, the layer having a high refractive index comprises a cured film containing at least an inorganic compound fine particle having a high refractive index and an average particle diameter of 100 nm or less, and a matrix binder.

The inorganic compound fine particle having a high refractive index includes an inorganic compound fine particle having a refractive index of 1.65 or more, preferably 1.9 or more. Examples thereof include a fine particle of an oxide of Ti, Zn, Sb, Sn, Zr, Ce, Ta, La or In, and a fine particle of a composite oxide containing such a metal atom.

Examples of the method for preparing a fine particle having an average particle diameter of 100 nm or less include a method of treating the particle surface with a surface-treating agent (for example, silane coupling agent, see JP-A-11-295503, JP-A-11-153703, JP-A-2000-9908, etc.; anionic compound or organic metal coupling agent, see JP-A-2001-310432, etc.), a method of constituting a core-shell structure using a high refractive index particle as the core (see, JP-A-2001-166104, etc.), and a method of using a specific dispersant in combination (see, JP-A-11-153703, U.S. Pat. No. 6,210,858B1, JP-A-2002-2776069, etc.).

Examples of the material for forming the matrix include conventionally known thermoplastic resin and curable resin films, Furthermore, at least one composition selected from a polyfunctional compound-containing composition containing two or more polymerizable groups which are at least either one of a radical polymerizable group and a cation polymerizable group, and a composition comprising a hydrolyzable group-containing organic compound or a partial condensation product thereof is preferred. Examples thereof include compounds described in JP-A-2000-47004, JP-A-2001-315242, JP-A-2001-31871 and JP-A-2001-296401.

A colloidal metal oxide obtained from a hydrolysis condensate of a metal oxide, and a curable film obtained from a metal alkoxide composition are also preferred, and these are described, for example, in JP-A-2001-293818.

The refractive index of the high refractive index layer is preferably from 1.70 to 2.20, and the thickness of the high refractive index layer is preferably from 5 nm to 10 µm, more preferably from 10 nm to 1 µm.

The refractive index of the medium refractive index layer is adjusted to a value between the refractive index of the low refractive index layer and the refractive index of the high refractive index layer. The refractive index of the medium refractive index layer is preferably from 1.50 to 1.70, and the thickness is preferably from 5 nm to 10 µm, more preferably from 10 nm to 1 µm.

[Low Refractive Index Layer]

The low refractive index layer is sequentially stacked on the high refractive index layer. The refractive index of the low refractive index layer is preferably from 1.20 to 1.55, more preferably from 1.30 to 1.50.

The low refractive index layer is preferably constituted as an outermost layer having scratch resistance and antifouling property. For greatly enhancing the scratch resistance, it is effective to impart slipperiness to the surface, and conventionally known techniques for forming a thin film layer by the introduction of silicone, fluorine or the like can be applied.

The fluorine-containing compound is preferably a compound containing from 35 to 80 mass % of a fluorine atom and having a crosslinking or polymerizable functional group.

Examples thereof include compounds described in JP-A-9-222503 (paragraphs [0018] to [0026]), JP-A-11-38202 (paragraphs [0019] to [0030]), JP-A-2001-40284 (paragraphs [0027] to [0028]) and JP-A-2000-284102.

The refractive index of the fluorine-containing compound is preferably from 1.35 to 1.50, more preferably from 1.36 to 1.47.

The silicone compound is preferably a compound having a polysiloxane structure, containing a curable functional group or a polymerizable functional group in the polymer chain, and forming a bridged structure in the film. Examples thereof include a reactive silicone (e.g., SILAPLANE (produced by Chisso Corp.)) and a polysiloxane containing a silanol group at both ends (see, for example, JP-A-11-258403).

The crosslinking or polymerization reaction of at least either one polymer of a fluorine-containing polymer having a crosslinking or polymerizable group and a siloxane polymer is preferably performed by irradiating light or applying heat simultaneously with or after the coating of a coating composition containing a polymerization initiator, a sensitizer and the like for forming the outermost layer, whereby the low refractive index layer is formed.

A sol-gel cured film obtained by the condensation reaction and curing of an organic compound such as silane coupling agent, and a specific silane coupling agent containing a fluorine-containing hydrocarbon group, in the co-presence of a catalyst is also preferred.

Examples of the specific silane coupling agent include a polyfluoroalkyl group-containing silane compound or a partial hydrolysis condensate thereof (e.g., compounds described in JP-A-58-142958, JP-A-58-147483, JP-A-58-147484, JP-A-9-157582 and JP-A-11-106704), and a silyl compound containing a poly(perfluoroalkyl ether) group which is a fluorine-containing long chain group (e.g., compounds described in JP-A-2000-117902, JP-A-2001-48590 and JP-A-2002-53804).

In addition to these additives, the low refractive index layer may contain a filler (for example, a low refractive index compound having an average primary particle diameter of 1 to 150 nm, such as silicon dioxide (silica), fluorine-containing particle (e.g., magnesium fluoride, calcium fluoride, barium fluoride) and organic fine particle described in JP-A-11-3820 (paragraphs [0020] to [0038])), a silane coupling agent, a slipping agent, a surfactant and the like.

When the low refractive index layer underlies an outermost layer, the low refractive index layer may be formed by a vapor phase process (e.g., vacuum deposition, sputtering, ion plating, plasma CVD). In view of stable production, a coating method is preferred.

The thickness of the low refractive index layer is preferably from 30 to 200 nm, more preferably from 50 to 150 nm, and most preferably from 60 to 120 nm.

[Hard Coat Layer]

The hard coat layer is provided on the surface of the protective film so as to impart physical strength to the protective film having provided thereon the antireflection layer. In particular, the hard coat layer is provided between the transparent support and the high refractive index layer. The hard coat layer is preferably formed through crosslinking reaction or polymerization reaction of a curable compound by applying at least either light or heat. The curable functional group in the curable compound is preferably a photopolymerizable functional group. A hydrolyzable functional group-containing organic metal compound or organic alkoxysilyl compound is also preferred.

Specific examples of these compound include those described above for the high refractive index layer. Specific examples of the constitutional composition for the hard coat layer include those include those described in JP-A-2002-144913, JP-A-2000-9908 and WO00/46617.

The high refractive index layer can serve also as the hard coat layer. In such a case, the hard coat layer is preferably formed after finely dispersing fine particles by using the means described for the high refractive index layer.

The hard coat layer can be made to serve also as an antiglare layer by incorporating thereinto particles having an average particle diameter of 0.2 to 10 μm and thereby imparting an antiglare function.

The thickness of the hard coat layer can be appropriately designed according to usage. The thickness of the hard coat layer is preferably from 0.2 to 10 μm, more preferably from 0.5 to 7 μm.

The strength of the hard coat layer is, in a pencil hardness test according to JIS K5400, preferably H or more, more preferably 2H or more, and most preferably 3H or more. Also, in a Taber test according to JIS K5400, the abrasion loss of a specimen between before and after the test is preferably smaller.

[Other Layers of Antireflection Layer]

In addition to these layers, a forward scattering layer, a primer layer, an antistatic layer, an undercoat layer, a protective layer and the like may be provided.

[Antistatic Layer]

In the case of providing an antistatic layer, an electrical conductivity having a volume resistivity of $10^{-8}$ ($\Omega cm^{-3}$) or less is preferably imparted. A volume resistivity of $10^{-8}$ ($\Omega cm^{-3}$) may be imparted by using a hygroscopic substance, a water-soluble inorganic salt, a certain kind of surfactant, a cationic polymer, an anionic polymer, a colloidal silica or the like, but these have a problem that the dependency on temperature and humidity is large and a sufficient electrical conductivity cannot be ensured at low humidity. Therefore, the material for the electrically conducting layer is preferably a metal oxide. Some metal oxides are colored but if such a metal oxide is used as the material for the electrically conducting layer, the film as a whole is detrimentally colored. Examples of the metal for forming a non-colored metal oxide include Zn, Ti, Al, In, Si, Mg, Ba, Mo, W and V. A metal oxide mainly comprising such a metal is preferably used. Specific examples of the metal oxide include ZnO, $TiO_2$, $SnO_2$, $Al_2O_3$, $In_2O_3$, $SiO_2$, MgO, BaO, $MoO_3$, $V_2O_5$ and a composite oxide thereof. Among these, ZnO, $TiO_2$ and $SnO_2$ are preferred. In the case of containing a heteroatom, for example, addition of Al, In or the like is effective for ZnO, addition of Sb, Nb, halogen atom or the like is effective for $SnO_2$, and addition of Nb, TA or the like is effective for $TiO_2$. Furthermore, as described in JP-B-59-6235, a material prepared by attaching the above-described metal oxide to another crystalline metal particle or fibrous material (for example, titanium oxide) may also be used. Incidentally, the volume resistance value is a physical value different from the surface resistance value and these cannot be simply compared, but in order to ensure electrical conductivity of $10^{-8}$ ($\Omega cm^{-3}$) or less in terms of the volume resistance value, it is sufficient that the antistatic layer has a surface resistance value of generally $10^{-10}$ (Ω/square) or less, preferably $10^{-8}$ (Ω/square) or less. The surface resistance value of the antistatic layer is a value when the antistatic layer is an outermost layer, and this value can be measured on the way of forming the antistatic layer.

[Liquid Crystal Display Device]

The liquid crystal display device of the present invention is a liquid crystal display device using either the cellulose acylate film of the present invention or the polarizing plate of the present invention (first embodiment, an OCB- or VA-mode liquid crystal display device using two sheets of the polarizing plate of the present invention by disposing one on the top of a cell and another on the bottom (second embodiment), or a VA-mode liquid crystal display device using one sheet of the polarizing plate of the present invention on the backlight side (third embodiment).

That is, the cellulose acylate film of the present invention is advantageously used as an optical compensatory sheet. Also, the polarizing plate using the cellulose acylate film is advantageously used for a liquid crystal display device. The cellulose acylate film of the present invention can be used for liquid cells of various display modes. Various display modes such as TN (twisted nematic), IPS (in-plane switching), FLC (ferroelectric liquid crystal), AFLC (anti-ferroelectric liquid crystal), OCB (optically compensatory bend), STN (super twisted nematic), VA (vertically aligned) and HAN (hybrid aligned nematic) have been proposed. Among these, VA mode and OCB mode can be preferably used.

In the VA-mode liquid crystal cell, rod-like liquid crystalline molecules are oriented substantially in the vertical alignment when a voltage is not applied.

The VA-mode liquid crystal cell includes (1) a strict VA-mode liquid crystal where rod-like liquid crystalline molecules are oriented substantially in the vertical alignment when a voltage is not applied, and are oriented substantially in the horizontal alignment when a voltage is applied (see, JP-A-2-176625), (2) a (MVA-mode) liquid crystal cell where the VA mode is modified to a multi-domain type so as to enlarge the viewing angle (see, *SID97, Digest of Tech. Papers (Preprints)*, 28, 845 (1997)), (3) a liquid crystal cell in a mode (n-ASM mode) where rod-like liquid crystalline molecules are oriented substantially in the vertical alignment when a voltage is not applied, and are oriented in the twisted multi-domain alignment when a voltage is applied mode (see, Preprints of Nippon Ekisho Toronkai (Liquid Crystal Forum of Japan), 58-59 (1998)), and (4) a SURVAIVAL-mode liquid crystal cell (published in *LCD International* 98).

Figure 3:
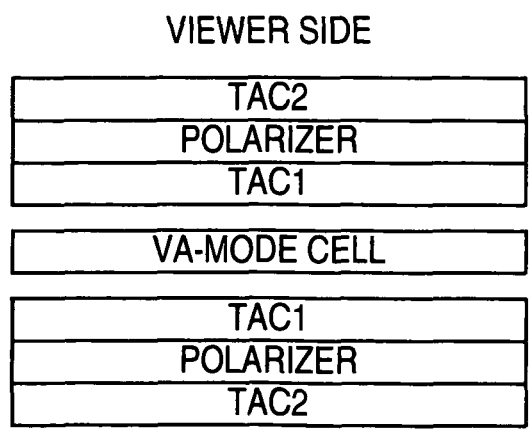
[FIG. 3] A cross-sectional view schematically showing the cross-sectional structure of the polarizing plate of the present invention.

The VA-mode liquid crystal display device includes a liquid crystal device comprising, as shown in FIG. 3, a liquid crystal cell (VA-mode cell) and two polarizing plates (polarizing plates each comprising TAC1 polarizer and TAC2) disposed on both sides of the liquid crystal cell. In the liquid cell, although not shown, a liquid crystal is supported between two electrode substrates.

In one embodiment of the transmission-type liquid crystal display device of the present invention, the cellulose acylate film of the present invention is used as the optical compensatory sheet, and one sheet is disposed between the liquid crystal cell and one polarizing plate, or two sheets are used by disposing the sheet both between the liquid crystal cell and one polarizing plate and between the liquid crystal cell and another polarizing plate.

In another embodiment of the transmission-type liquid crystal display device of the present invention, the cellulose acylate film of the present invention is used as the protective film of the polarizing plate, which is disposed between the liquid crystal cell and the polarizer. The cellulose acylate film may be used only for the protective film of one polarizing plate (protective film between liquid crystal cell and polarizer), or may be used for two protective films of both polarizing plates (protective film between liquid crystal cell and each polarizer). The protective film is preferably laminated with the liquid crystal cell such that the cellulose acylate film (TAC1) of the present invention comes to the VA cell side. When the cellulose acylate film is used only for the protective film of one polarizing plate (protective film between liquid crystal cell and polarizer), the polarizing plate may be either an upper polarizing plate (on the viewing side) or a lower polarizing plate (on the backlight side) and whichever side the cellulose acylate film is disposed, there arises no problem in view of function. However, if the polarizing plate is used as the upper polarizing plate, a functional film must be provided on the viewing side (upper side) and the production yield may decrease. The production yield is considered to be high when polarizing plate is used as the lower polarizing plate, and this seems to be a more preferred embodiment.

The liquid crystal display device in the second embodiment is a liquid crystal display device where the polarizing plates on both the light source side and the viewer side in FIG. 3 are the polarizing plate of the present invention, and the liquid crystal display device in the third embodiment is a liquid crystal display device where the polarizing plate only on the light source side is the polarizing plate of the present invention.

The protective film (TAC2) in FIG. 3 may be a normal cellulose acylate film and this is preferably thinner than the cellulose acylate film of the present invention. For example, the thickness is preferably from 40 to 80 μm. Examples of the normal cellulose acylate film include, but are not limited to, commercially available KC4UX2M (produced by Konica Opt, Inc., 40 μm), KC5UX (produced by Konica Opt, Inc., 60 μm) and TD80 (produced by Fuji Photo Film Co., Ltd., 80 μm).

EXAMPLES

The present invention is described in greater detail below by referring to Examples, but the present invention is not limited to the Examples.

Example 1

Formation of Cellulose Acylate Film (Cellulose Acylate)

Cellulose acylates differing in the kind and substitution degree of acyl group, shown in Tables 1 and 2, were prepared. More specifically, a sulfuric acid (7.8 parts by mass per 100 parts by mass of cellulose) as a catalyst was added, a carboxylic acid as a raw material of the acyl substituent was added, and an acylation reaction was performed at 40° C. At this time, the kind of substitution degree of acyl group were adjusted by controlling the kind and amount of carboxylic acid. After the acylation, ripening was performed. Furthermore, the low molecular weight components of the obtained cellulose acylate were washed with acetone and removed. In Tables, CAB denotes a cellulose acetate butyrate (a cellulose ester derivative where the acyl group comprises an acetate and a butyryl group), CAP denotes cellulose acetate propionate (a cellulose ester derivative where the acyl group comprises an acetate group and a propionyl group), and CTA denotes cellulose triacetate (a cellulose ester derivative where the acyl group comprises only an acetate group).

(Dissolution (Preparation of Dope))

The cellulose acylate shown in Tables 1 and 2, plasticizer and a retardation adjusting agent shown below were charged with stirring into a mixed solvent dichloromethane/methanol (87/13 parts by mass) to give a cotton mass concentration of 15 mass %, and dissolved under heat and stirring. At the same time, 0.05 parts by mass of matting agent (silicon dioxide (primary particle diameter: 20 nm), Moh's hardness: about 7), 0.375 parts by mass of ultraviolet absorbent B (TINUVIN 327, produced by Ciba Specialty Chemicals) and 0.75 parts by mass of ultraviolet absorbent C (TINUVIN 328, produced by Ciba Specialty Chemicals), each a fine particle, were charged and then stirred under heat to prepare a dope.

Retardation Adjusting Agent

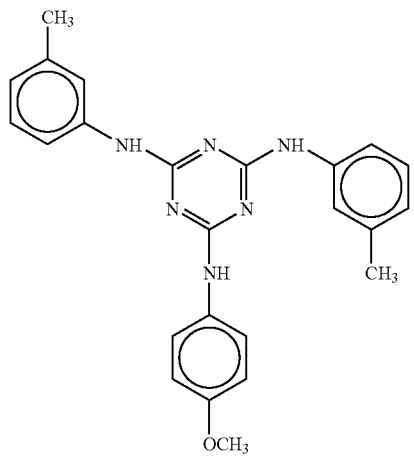

(Casting)

The obtained dope was cast by using a band casting machine. The film having a residual solvent amount of 25 to 35 mass % was stripped off from the band and stretched in the width direction to a draw ratio of 0 to 30% (see, Tables 1 and 2) by using a tenter at a stretching temperature in the range from about Tg (see, Tables 1 and 2) −5 to Tg (see Tables 1 and 2)+5° C. to produce a cellulose acylate film (thickness: 92 μm). The draw ratio of the tenter is shown in Tables 1 and 2. The produced cellulose acylate film (optical compensatory sheet) was measured on the Re retardation value and Rth retardation value at a wavelength of 590 nm at 25° C.–60% RH by using an automatic birefringence meter (KOBRA 21ADH, manufactured by Oji Test Instruments). The results are shown in Tables 1 and 2. Also, the film was moisture-conditioned at 25° C.–10% RH or 25° C.–80% RH for 2 hours or more and measured in that environment. The variations ΔRe and ΔRth (ΔRe=Re(10% RH)−Re(80% RH), ΔRth=Rth (10% RH)—Rth(80% RH)) of retardation of the cellulose acylate film between 80% RH and 10% RH are shown in Tables 1 and 2.

TABLE 1

| Example No. | Kind of Cotton | Ac Group Kind | Ac Group Substitution Degree A | Bu/Pr Group Kind | Bu/Pr Group Substitution Degree B | Total Substitution Degree A + B | Plasticizer*1 TPP/BDP | Retardation-Expressing Agent | Remarks |
|---|---|---|---|---|---|---|---|---|---|
| 1-1 | CAB | Ac | 1.40 | Bu | 1.30 | 2.70 | 11.7 | — | Invention |
| 1-2 | " | " | " | " | " | " | " | 5 | " |
| 1-3 | CAB | Ac | 1.10 | Bu | 1.60 | 2.70 | 11.7 | — | " |
| 1-4 | " | " | " | " | " | " | " | 5 | " |
| 1-5 | CAB | Ac | 0.90 | Bu | 1.80 | 2.70 | 11.7 | — | " |
| 1-6 | " | " | " | " | " | " | " | 5 | " |
| 1-7 | CAB | Ac | 0.20 | Bu | 2.30 | 2.50 | 11.7 | — | " |
| 1-8 | " | " | " | " | " | " | " | 5 | " |
| 1-9 | CAB | Ac | 0.30 | Bu | 2.50 | 2.80 | 11.7 | — | " |
| 1-10 | " | " | " | " | " | " | " | 5 | " |
| 1-11 | CAP | Ac | 0.18 | Pr | 2.47 | 2.65 | 0 | — | " |
| 1-12 | " | " | " | " | " | " | 11.7 | — | " |
| 1-13 | " | " | " | " | " | " | " | — | " |
| 1-14 | " | " | " | " | " | " | " | — | " |
| 1-15 | " | " | " | " | " | " | " | — | " |
| 1-16 | " | " | " | " | " | " | " | — | " |
| 1-17 | " | " | " | " | " | " | " | — | " |
| 1-18 | " | " | " | " | " | " | " | — | " |
| 1-19 | " | " | " | " | " | " | " | — | " |
| 1-20 | " | " | " | " | " | " | 11.7 | 5 | " |
| 1-21 | " | " | " | " | " | " | " | " | " |
| 1-22 | " | " | " | " | " | " | " | " | " |
| 1-23 | " | " | " | " | " | " | " | " | " |
| 1-24 | " | " | " | " | " | " | " | " | " |
| 1-25 | " | " | " | " | " | " | " | " | " |
| 1-26 | " | " | " | " | " | " | " | " | " |
| 1-27 | " | " | " | " | " | " | " | " | " |
| 1-28 | " | " | " | " | " | " | " | " | " |
| 1-29 | " | " | " | " | " | " | " | " | " |
| 1-30 | " | " | " | " | " | " | " | " | " |
| 1-31 | " | " | " | " | " | " | " | " | " |
| 1-32 | " | " | " | " | " | " | " | " | " |
| 1-33 | " | " | " | " | " | " | " | " | " |
| 1-34 | " | " | " | " | " | " | " | " | " |
| 1-35 | " | " | " | " | " | " | " | " | " |
| 1-36 | " | " | " | " | " | " | " | " | " |
| 1-37 | " | " | " | " | " | " | " | " | " |
| 1-38 | " | " | " | " | " | " | " | " | " |
| 1-39 | " | " | " | " | " | " | " | " | " |

TABLE 1-continued

| | | | | | | | | | |
|---|---|---|---|---|---|---|---|---|---|
| 1-40 | " | " | " | " | " | " | " | " | " |
| 1-41 | " | " | " | " | " | " | " | " | " |
| 1-42 | " | " | " | " | " | " | " | " | " |
| 1-43 | " | " | " | " | " | " | " | " | " |
| 1-89 | CAP | Ac | 1.90 | Pr | 0.80 | 2.70 | 11.7 | — | " |
| 1-90 | " | " | " | " | " | " | 11.7 | — | " |
| 1-91 | " | " | " | " | " | " | 11.7 | 5 | " |
| 1-2c | CTA | Ac | 2.87 | — | 0.00 | 2.87 | 11.7 | | Comparison |
| 1-3c | " | " | " | " | " | " | 11.7 | 5 | Comparison |

| Example No. | Draw Ratio MD Direction | Draw Ratio TD Direction | Tg [° C.] | Film Thickness after Drying [μm] | Optical Property Re [nm] | Optical Property Rth [nm] | Temperature Dependency ΔRe [nm] | Temperature Dependency ΔRth [nm] | Modulus of Elasticity MD [Mpa] | Modulus of Elasticity TD [Mpa] | Remarks |
|---|---|---|---|---|---|---|---|---|---|---|---|
| 1-1 | 10% | 30% | 108 | 92 | 29 | 101 | 1 | 8 | 1860 | 1970 | Invention |
| 1-2 | 10% | 30% | 100 | 92 | 65 | 196 | 1 | 6 | 2170 | 2260 | " |
| 1-3 | 10% | 30% | 104 | 92 | 27 | 99 | 1 | 8 | 1800 | 1900 | " |
| 1-4 | 10% | 30% | 95 | 92 | 68 | 200 | 1 | 6 | 2100 | 2200 | " |
| 1-5 | 10% | 30% | 103 | 92 | 30 | 102 | 1 | 8 | 1750 | 1850 | " |
| 1-6 | 10% | 30% | 96 | 92 | 72 | 205 | 2 | 6 | 2050 | 2150 | " |
| 1-7 | 10% | 30% | 105 | 92 | 29 | 101 | 1 | 8 | 1700 | 1800 | " |
| 1-8 | 10% | 30% | 96 | 92 | 70 | 202 | 2 | 6 | 2000 | 2100 | " |
| 1-9 | 10% | 30% | 101 | 92 | 29 | 101 | 1 | 8 | 1850 | 1940 | " |
| 1-10 | 10% | 30% | 93 | 92 | 70 | 202 | 1 | 6 | 2150 | 2250 | " |
| 1-11 | unstretched | | 147 | 92 | 2 | 30 | 2 | 16 | 2200 | 2000 | " |
| 1-12 | unstretched | | 102 | 92 | 3 | 28 | 1 | 10 | 2100 | 1900 | " |
| 1-13 | fixed | 20% | " | 92 | 17 | 56 | 7 | 14 | 2100 | 2200 | " |
| 1-14 | fixed | 30% | " | 92 | 24 | 79 | 8 | 16 | 2100 | 2300 | " |
| 1-15 | fixed | 40% | " | 92 | 29 | 88 | 9 | 13 | 2120 | 2400 | " |
| 1-16 | fixed | 50% | " | 92 | 31 | 100 | 10 | 15 | 2210 | 2500 | " |
| 1-17 | 10% | 20% | " | 92 | 11 | 76 | 7 | 16 | 2200 | 2200 | " |
| 1-18 | 10% | 30% | " | 92 | 15 | 107 | 8 | 14 | 2200 | 2300 | " |
| 1-19 | 10% | 40% | " | 92 | 19 | 120 | 9 | 13 | 2200 | 2400 | " |
| 1-20 | unstretched | | 94 | 92 | 3 | 74 | 1 | 9 | 2400 | 2200 | " |
| 1-21 | fixed | 20% | " | 92 | 50 | 130 | 3 | 7 | 2400 | 2500 | " |
| 1-22 | fixed | 30% | " | 93 | 74 | 169 | 4 | 8 | 2400 | 2600 | " |
| 1-23 | fixed | 40% | " | 93 | 92 | 201 | 5 | 8 | 2410 | 2700 | " |
| 1-24 | 7% | 17% | " | 92 | 30 | 150 | 3 | 5 | 2470 | 2450 | " |
| 1-25 | 3% | 18% | " | 92 | 40 | 140 | 3 | 6 | 2430 | 2460 | " |
| 1-26 | 5% | 20% | " | 92 | 41 | 158 | 3 | 6 | 2450 | 2500 | " |
| 1-27 | 10% | 20% | " | 92 | 31 | 185 | 3 | 7 | 2500 | 2500 | " |
| 1-28 | fixed | 25% | " | 92 | 62 | 151 | 4 | 6 | 2410 | 2540 | " |
| 1-29 | 5% | 25% | " | 92 | 51 | 182 | 3 | 7 | 2450 | 2540 | " |
| 1-30 | 10% | 25% | " | 92 | 43 | 206 | 3 | 6 | 2500 | 2550 | " |
| 1-31 | 3% | 30% | " | 92 | 65 | 192 | 4 | 5 | 2430 | 2600 | " |
| 1-32 | 5% | 30% | " | 92 | 60 | 201 | 4 | 8 | 2450 | 2610 | " |
| 1-33 | 10% | 30% | " | 92 | 48 | 229 | 3 | 7 | 2520 | 2610 | " |
| 1-34 | fixed | 35% | " | 92 | 84 | 185 | 5 | 6 | 2410 | 2650 | " |
| 1-35 | 2% | 35% | " | 93 | 79 | 190 | 4 | 8 | 2430 | 2650 | " |
| 1-36 | 3% | 35% | " | 92 | 75 | 202 | 3 | 9 | 2430 | 2660 | " |
| 1-37 | 5% | 35% | " | 92 | 70 | 220 | 3 | 8 | 2460 | 2650 | " |
| 1-38 | 7% | 35% | " | 92 | 65 | 230 | 3 | 8 | 2470 | 2650 | " |
| 1-39 | 8% | 35% | " | 93 | 63 | 238 | 3 | 9 | 2490 | 2660 | " |
| 1-40 | 10% | 35% | " | 92 | 55 | 257 | 3 | 9 | 2500 | 2660 | " |
| 1-41 | 2% | 40% | " | 92 | 87 | 211 | 5 | 7 | 2440 | 2700 | " |
| 1-42 | 5% | 40% | " | 91 | 78 | 232 | 4 | 8 | 2460 | 2700 | " |
| 1-43 | 7% | 40% | " | 91 | 70 | 250 | 4 | 8 | 2480 | 2710 | " |
| 1-89 | unstretched | | 133 | 92 | 3 | 33 | 2 | 21 | 2200 | 2000 | " |
| 1-90 | 10% | 30% | 133 | 92 | 25 | 97 | 1 | 8 | 1900 | 2000 | " |
| 1-91 | 10% | 30% | 124 | 92 | 61 | 190 | 1 | 5 | 2220 | 2300 | " |
| 1-2c | unstretched | | 147 | 92 | 2 | 38 | 3 | 53 | 4200 | 3800 | Comparison |
| 1-3c | 30% | — | 140 | 92 | 32 | 151 | 9 | 45 | 4500 | 4100 | Comparison |

TABLE 2

| Example No. | Kind of Cotton | Ac Group Kind | Ac Group Substitution Degree A | Bu/Pr Group Kind | Bu/Pr Group Substitution Degree B | Total Substitution Degree A + B | Plasticizer*1 TPP/BDP | Retardation-Expressing Agent | Remarks |
|---|---|---|---|---|---|---|---|---|---|
| 1-44 | CAB | Ac | 1.00 | Bu | 1.66 | 2.66 | 0 | — | Invention |
| 1-45 | " | " | " | " | " | " | 0 | — | " |
| 1-46 | " | " | " | " | " | " | 11.7 | — | " |
| 1-47 | " | " | " | " | " | " | " | — | " |

TABLE 2-continued

| | | | | | | | | | |
|---|---|---|---|---|---|---|---|---|---|
| 1-48 | " | " | " | " | " | " | " | — | " |
| 1-49 | " | " | " | " | " | " | " | — | " |
| 1-50 | " | " | " | " | " | " | " | — | " |
| 1-51 | " | " | " | " | " | " | " | — | " |
| 1-52 | " | " | " | " | " | " | " | — | " |
| 1-53 | " | " | " | " | " | " | " | — | " |
| 1-54 | " | " | " | " | " | " | " | — | " |
| 1-55 | " | " | " | " | " | " | " | — | " |
| 1-56 | " | " | " | " | " | " | 11.7 | 5 | " |
| 1-57 | " | " | " | " | " | " | " | " | " |
| 1-58 | " | " | " | " | " | " | " | " | " |
| 1-59 | " | " | " | " | " | " | " | " | " |
| 1-58 | " | " | " | " | " | " | " | " | " |
| 1-59 | " | " | " | " | " | " | " | " | " |
| 1-60 | " | " | " | " | " | " | " | " | " |
| 1-61 | " | " | " | " | " | " | " | " | " |
| 1-62 | " | " | " | " | " | " | " | " | " |
| 1-63 | " | " | " | " | " | " | " | " | " |
| 1-64 | " | " | " | " | " | " | " | " | " |
| 1-65 | " | " | " | " | " | " | " | " | " |
| 1-66 | " | " | " | " | " | " | " | " | " |
| 1-67 | " | " | " | " | " | " | " | " | " |
| 1-68 | " | " | " | " | " | " | " | " | " |
| 1-69 | " | " | " | " | " | " | " | " | " |
| 1-70 | " | " | " | " | " | " | " | " | " |
| 1-71 | " | " | " | " | " | " | " | " | " |
| 1-72 | " | " | " | " | " | " | " | " | " |
| 1-73 | " | " | " | " | " | " | " | " | " |
| 1-74 | " | " | " | " | " | " | " | " | " |
| 1-75 | " | " | " | " | " | " | " | " | " |
| 1-76 | " | " | " | " | " | " | " | " | " |
| 1-77 | " | " | " | " | " | " | " | " | " |
| 1-78 | " | " | " | " | " | " | " | " | " |
| 1-79 | " | " | " | " | " | " | " | " | " |
| 1-80 | " | " | " | " | " | " | " | " | " |
| 1-81 | " | " | " | " | " | " | " | " | " |
| 1-82 | " | " | " | " | " | " | " | " | " |
| 1-83 | " | " | " | " | " | " | " | " | " |
| 1-84 | " | " | " | " | " | " | " | " | " |
| 1-85 | " | " | " | " | " | " | " | " | " |
| 1-86 | " | " | " | " | " | " | " | " | " |
| 1-87 | " | " | " | " | " | " | " | " | " |
| 1-88 | " | " | " | " | " | " | " | " | " |

| Example No. | Draw Ratio MD Direction | Draw Ratio TD Direction | Tg [° C.] | Film Thickness after Drying [μm] | Optical Property Re [nm] | Optical Property Rth [nm] | Temperature Dependency ΔRe [nm] | Temperature Dependency ΔRth [nm] | Modulus of Elasticity MD [Mpa] | Modulus of Elasticity TD [Mpa] | Remarks |
|---|---|---|---|---|---|---|---|---|---|---|---|
| 1-44 | | | 151 | 92 | 3 | 75 | 2 | 10 | 2200 | 2000 | Invention |
| 1-45 | 20% | — | 151 | 93 | 32 | 203 | 7 | 13 | 2500 | 2200 | " |
| 1-46 | unstretched | | 104 | 92 | 2 | 14 | 1 | 5 | 1700 | 1500 | " |
| 1-47 | fixed | 20% | " | 92 | 36 | 46 | 4 | 6 | 1700 | 1800 | " |
| 1-48 | fixed | 30% | " | 92 | 44 | 74 | 5 | 5 | 1710 | 1910 | " |
| 1-49 | fixed | 40% | " | 92 | 56 | 88 | 6 | 8 | 1700 | 2020 | " |
| 1-50 | fixed | 50% | " | 92 | 66 | 96 | 6 | 12 | 1710 | 2080 | " |
| 1-51 | fixed | 60% | " | | 73 | 120 | 8 | 11 | 1710 | 2190 | " |
| 1-52 | 10% | 20% | " | 92 | 23 | 62 | 1 | 5 | 1800 | 1800 | " |
| 1-53 | 10% | 30% | " | 92 | 29 | 101 | 1 | 8 | 1800 | 1900 | " |
| 1-54 | 10% | 40% | " | 92 | 36 | 120 | 1 | 6 | 1800 | 2000 | " |
| 1-55 | 10% | 50% | " | 92 | 43 | 130 | 1 | 11 | 1800 | 2100 | " |
| 1-56 | unstretched | | 95 | 92 | 5 | 10 | 1 | 3 | 2000 | 1800 | " |
| 1-57 | fixed | 20% | " | 92 | 70 | 111 | 1 | 5 | 2000 | 2100 | " |
| 1-58 | fixed | 30% | " | 93 | 112 | 148 | 2 | 7 | 2020 | 2200 | " |
| 1-59 | fixed | 40% | " | 93 | 138 | 172 | 2 | 5 | 2010 | 2300 | " |
| 1-58 | fixed | 50% | " | 92 | 171 | 205 | 2 | 5 | 2020 | 2400 | " |
| 1-59 | fixed | 60% | " | 92 | 194 | 217 | 3 | 5 | 2020 | 2500 | " |
| 1-60 | 13% | 17% | " | 92 | 30 | 150 | 1 | 4 | 2130 | 2050 | " |
| 1-61 | 7% | 18% | " | 92 | 40 | 140 | 1 | 5 | 2070 | 2050 | " |
| 1-62 | 10% | 18% | " | 92 | 50 | 130 | 2 | 4 | 2100 | 2050 | " |
| 1-63 | fixed | 25% | " | 92 | 90 | 170 | 2 | 4 | 2000 | 2150 | " |
| 1-64 | 5% | 25% | " | 92 | 75 | 154 | 1 | 6 | 2050 | 2150 | " |
| 1-65 | 10% | 25% | " | 92 | 60 | 178 | 1 | 4 | 2100 | 2150 | " |
| 1-66 | fixed | 28% | " | 92 | 103 | 140 | 2 | 5 | 2000 | 2180 | " |
| 1-67 | 5% | 28% | " | 92 | 83 | 167 | 1 | 6 | 2050 | 2180 | " |
| 1-68 | 9% | 28% | " | 92 | 70 | 184 | 1 | 6 | 2080 | 2180 | " |
| 1-69 | 10% | 28% | " | 92 | 68 | 188 | 1 | 4 | 2100 | 2180 | " |
| 1-70 | 11% | 28% | " | 92 | 65 | 198 | 1 | 4 | 2100 | 2180 | " |

TABLE 2-continued

| 1-71 | 12% | 28% | " | 92 | 60 | 203 | 1 | 5 | 2120 | 2180 | " |
|------|-----|-----|---|----|----|-----|---|---|------|------|---|
| 1-72 | 13% | 28% | " | 92 | 57 | 207 | 1 | 6 | 2130 | 2180 | " |
| 1-73 | 3% | 30% | " | 92 | 98 | 165 | 2 | 4 | 2030 | 2200 | " |
| 1-74 | 5% | 30% | " | 92 | 89 | 180 | 2 | 5 | 2050 | 2200 | " |
| 1-75 | 10% | 30% | " | 92 | 70 | 202 | 1 | 6 | 2100 | 2200 | " |
| 1-76 | 12% | 30% | " | 92 | 65 | 210 | 1 | 5 | 2120 | 2200 | " |
| 1-77 | 13% | 30% | " | 92 | 60 | 215 | 1 | 5 | 2130 | 2200 | " |
| 1-78 | fixed | 32% | " | 92 | 120 | 152 | 2 | 4 | 2000 | 2220 | " |
| 1-79 | 5% | 32% | " | 93 | 98 | 186 | 2 | 5 | 2050 | 2220 | " |
| 1-80 | 8% | 32% | " | 92 | 85 | 200 | 2 | 6 | 2080 | 2220 | " |
| 1-81 | 10% | 32% | " | 92 | 78 | 210 | 1 | 5 | 2100 | 2220 | " |
| 1-82 | 11% | 32% | " | 92 | 70 | 220 | 1 | 6 | 2110 | 2220 | " |
| 1-83 | 12% | 32% | " | 93 | 65 | 230 | 1 | 6 | 2120 | 2220 | " |
| 1-84 | 13% | 32% | " | 92 | 60 | 240 | 1 | 7 | 2130 | 2220 | " |
| 1-85 | 10% | 40% | " | 92 | 90 | 233 | 2 | 7 | 2100 | 2300 | " |
| 1-86 | 13% | 40% | " | 91 | 71 | 250 | 1 | 7 | 2130 | 2300 | " |
| 1-87 | 14% | 40% | " | 91 | 65 | 257 | 1 | 6 | 2140 | 2300 | " |
| 1-88 | 15% | 40% | " | 91 | 60 | 265 | 1 | 6 | 2150 | 2300 | " |

*[1] A 2/1 (parts by mass) mixture of TPP (triphenyl phosphate) and BDP (biphenyldiphenyl phosphate)

As seen from the results in Table 1, when samples having a total substitution degree (A+B) of 2.70 (Example Nos. 1-1 to 1-6) are compared, as the butanoyl substitution degree (B) is larger or as the amount of the retardation-expressing agent is larger, the optical property (Re, Rth) is more readily expressed. In the case of the product (CAB) of the present invention, even when the retardation-expressing agent is added in the same amount as CTA (1-3c) of comparison, a larger optical property than 1-3c is expressed and the change due to environmental humidity is small. Also in the case of the product (CAP) of the present invention (1-11 to 1-43), the expression of optical property is higher than the comparative product (CTA) (1-2c and 1-3c), and the change in ΔRe and ΔRth is smaller.

Furthermore, the optical property is more enhanced by using a retardation-expressing agent. When the samples not using a retardation-expressing agent are compared, the product of the present invention has small humidity dependency as compared with the cellulose triacetate (comparative product; 1-2c and 1-3c).

The sound velocity in the casting direction of the films obtained in this Example was from 1.5 to 2.2 km/s, and the sound velocity in the direction perpendicular to casting was from 1.8 to 2.5 km/s.

The Re distribution and Rth distribution of the films obtained in this Example were from 1.2 to 5% and from 3 to 10%, respectively, and the film thickness distribution in the width direction was from 1 to 7%.

The elastic modulus at 25° C. of the films obtained in this Examples was from 1,500 to 3,400 MPa, and the films stretched to MD and TD exhibited excellent dimensional stability of 5% or less despite environmental change. Also, in all films of the Invention containing a plasticizer, the moisture content at 25° C.–80% RH was 2.3 or less and this reveals excellent humidity dimensional stability.

When the films having the same substitution degree are compared, it is seen that as the propyl (butyryl) substitution degree is larger, the humidity dependency is more decreased. In Films 1-16 and 1-23 of the Invention, the total substitution degree of hydroxyl group at the 6-position was 0.87 and 0.88, respectively.

In all samples, the haze was from 0.1 to 0.9 and when the average secondary particle diameter of the matting agent was 1.0 μm or less and the sample was left standing for 48 hours under the conditions of 80° C.–90% RH, the change in the mass was from 0 to 3%. When the sample was left standing for 24 hours under the conditions of 60° C.–95% RH and 90° C.–5% RH, the dimensional change was from 0 to 4.5%. In all samples, the photoelastic coefficient was $50 \times 10^{-3}$ cm$^2$/dyne or less.

The moisture permeability was as shown in the following table:

| Example No. | Moisture permeability (g/m$^2$ · 24 hr) |
|---|---|
| 1-1 | 2200 |
| 1-2 | 1640 |
| 1-3 | 2230 |
| 1-4 | 1610 |
| 1-5 | 2220 |
| 1-6 | 1580 |
| 1-7 | 2500 |
| 1-8 | 1900 |
| 1-9 | 2210 |
| 1-10 | 1620 |
| 1-11 | 2800 |
| 1-12 to 1-19 | 1780 to 1740 |
| 1-20 to 1-43 | 1600 to 1650 |
| 1-89 to 1-90 | 2000 to 1900 |
| 1-91 | 1400 |
| 1-2c | 1510 |
| 1-3c | 1140 |
| 1-44 to 1-45 | 2450 to 2350 |
| 1-46 to 1-55 | 2100 to 2000 |
| 1-56 to 1-88 | 1300 to 1200 |

Example 3-5

Films of Example No. 2-37 and 2-82 were obtained thoroughly in the same manner as Films of Example No. 1-37 and 1-82 by using the materials of Films of Example No. 1-37 and 1-87 except for stretching the film at a temperature of 125° C. The Re, Rth and wavelength dispersion values of Film of Example No. 2-37 are shown in the Table 3 below.

TABLE 3

| Measurement Wavelength [nm] | Re [nm] | Rth [nm] | Re(λ)/Re(550) | Rth(λ)/Rth(550) |
|---|---|---|---|---|
| 400 | 56 | 225 | 0.80 | 1.02 |
| 550 | 70 | 220 | 1.00 | 1.00 |
| 700 | 84 | 218 | 1.20 | 0.99 |

The Re, Rth and wavelength dispersion values of Film of Example No. 2-82 are shown in the Table 4 below.

TABLE 4

| Measurement Wavelength [nm] | Re [nm] | Rth [nm] | Re(λ)/Re(550) | Rth(λ)/Rth(550) |
|---|---|---|---|---|
| 400 | 55 | 224 | 0.80 | 1.02 |
| 550 | 69 | 219 | 1.00 | 1.00 |
| 700 | 83 | 217 | 1.20 | 0.99 |

Example 3-6

Films of Example No. 3-37 and 3-82 were obtained thoroughly in the same manner as Films of Example No. 1-37 and 1-82 by using the materials of Films of Example No. 1-37 and 1-87 except for stretching the film at a temperature of 145° C. The Re, Rth and wavelength dispersion values of Film of Example No. 3-37 are shown in the Table 5 below.

TABLE 5

| Measurement Wavelength [nm] | Re [nm] | Rth [nm] | Re(λ)/Re(550) | Rth(λ)/Rth(550) |
|---|---|---|---|---|
| 400 | 51 | 229 | 0.78 | 1.02 |
| 550 | 65 | 225 | 1.00 | 1.00 |
| 700 | 79 | 220 | 1.22 | 0.98 |

The Re, Rth and wavelength dispersion values of Film of Example No. 3-82 are shown in the Table 6 below.

TABLE 6

| Measurement Wavelength [nm] | Re [nm] | Rth [nm] | Re(λ)/Re(550) | Rth(λ)/Rth(550) |
|---|---|---|---|---|
| 400 | 50 | 228 | 0.78 | 1.02 |
| 550 | 64 | 223 | 1.00 | 1.00 |
| 700 | 78 | 218 | 1.22 | 0.98 |

Example 3-7

Films of Example No. 4-37 and 4-82 were obtained thoroughly in the same manner as Films of Example No. 1-37 and 1-82 by using the materials of Films of Example No. 1-37 and 1-87 except for stretching the film at a temperature of 165° C. The Re, Rth and wavelength dispersion values of Film of Example No. 4-37 are shown in the Table 7 below.

TABLE 7

| Measurement Wavelength [nm] | Re [nm] | Rth [nm] | Re(λ)/Re(550) | Rth(λ)/Rth(550) |
|---|---|---|---|---|
| 400 | 43 | 243 | 0.72 | 1.03 |
| 550 | 60 | 235 | 1.00 | 1.00 |
| 700 | 75 | 228 | 1.25 | 0.97 |

The Re, Rth and wavelength dispersion values of Film of Example No. 4-82 are shown in the Table 8 below.

TABLE 8

| Measurement Wavelength [nm] | Re [nm] | Rth [nm] | Re(λ)/Re(550) | Rth(λ)/Rth(550) |
|---|---|---|---|---|
| 400 | 42 | 241 | 0.72 | 1.03 |
| 550 | 58 | 233 | 1.00 | 1.00 |
| 700 | 74 | 226 | 1.28 | 0.97 |

Example 2

<2-1-1>
(Production of Polarizing Plate 01)

Iodine was adsorbed to a stretched polyvinyl alcohol film to produce a polarizer.

The cellulose acylate film produced in Example 1 (1-1 to 1-88, 1-2c and 1-3c; corresponding to TAC1 of FIGS. 1 to 3) was laminated on one side of the polarizer similarly to TAC1 of FIG. 2 by using a polyvinyl alcohol-based adhesive. Here, the saponification treatment was performed under the following conditions.

An aqueous solution containing 1.5 mol/liter of sodium hydroxide was prepared and kept at 55° C. Also, an aqueous solution containing 0.005 mol/liter of dilute sulfuric acid was prepared and kept at 35° C. The cellulose acylate film produced was dipped in the aqueous sodium hydroxide solution prepared above for 2 minutes and then dipped in water to thoroughly wash out the aqueous sodium hydroxide solution. Subsequently, the film was dipped in the aqueous dilute sulfuric acid solution prepared above for 1 minute and then dipped in water to thoroughly wash out the aqueous dilute sulfuric acid solution. Thereafter, the sample was thoroughly dried at 120° C.

A commercially available cellulose acetate film (Fujitac TD80UF, produced by Fuji Photo Film Co., Ltd.; corresponding to TAC2 of FIG. 2) was subjected to saponification treatment and laminated on the opposite side of the polarizer by using a polyvinyl alcohol-based adhesive.

At this time, as shown in FIG. 1, the transmission axis of the polarizer was disposed to run in parallel with the slow axis of the cellulose acylate film produced in Example 1 (however, in the case of films of 1-11 and 1-2c used in Example 3, <3-1-1> later, the slow axis of the film and the transmission axis of the polarizer were exceptionally disposed to cross each other at right angles)). The transmission axis of the polarizer and the slow axis of the commercially available cellulose triacetate film were disposed to cross each other at right angles.

In this way, Polarizing Plates A1-1 to A1-88, A1-2c and A1-3c were produced (corresponding to the optical compensatory film-integrated polarizing plate of FIG. 2 without functional film).

<2-2-1>
(Preparation of Coating Solution for Light Scattering Layer)

A mixture (50 g) of pentaerythritol triacrylate and pentaerythritol tetraacrylate (PETA, produced by Nippon Kayaku Co., Ltd.) was diluted with 38.5 g of toluene, and 2 g of a polymerization initiator (Irgacure 184, produced by Ciba Specialty Chemicals) was added thereto and mixed with stirring. When this solution was coated and UV-cured, the obtained coating film had a refractive index of 1.51.

To the solution prepared above, 1.7 g of a 30% toluene liquid dispersion of crosslinked polystyrene particles having an average particle size of 3.5 μm (SX-350, produced by Soken Kagaku K.K., refractive index: 1.60) dispersed at 10,000 rpm for 20 minutes by a polytron dispersing machine, and 13.3 g of a 30% toluene liquid dispersion of crosslinked acryl-styrene particles having an average particle diameter of 3.5 μm (produced by Soken Kagaku K.K., refractive index: 1.55) were added. Thereafter, 0.75 g of a fluorine-based surface modifier (FP-1) and 10 g of a silane coupling agent (KBM-5103, produced by Shin-Etsu Chemical Co., Ltd.) were added to complete the solution.

The resulting mixed solution was filtered through a polypropylene-made filter having a pore size of 30 μm to prepare a coating solution for the light scattering layer.

<2-2-2>
(Preparation of Coating Solution for Low Refractive Index Layer)

Sol Solution a was prepared as follows. In a reactor equipped with a stirrer and a reflux condenser, 120 parts of methyl ethyl ketone, 100 parts of acryloyloxypropyltrimethoxysilane (KBM5103, produced by Shin-Etsu Chemical Co., Ltd.) and 3 parts of diisopropoxyaluminum ethyl acetoacetate were added and mixed, 30 parts of ion exchanged water was added thereto and after allowing the reaction to proceed at 60° C. for 4 hours, the reaction solution was cooled to room temperature to obtain Sol Solution a. The mass average molecular weight was 1,600 and in the components having a molecular weight larger than the oligomer component, the components having a molecular weight of 1,000 to 20,000 occupied 100%. From the analysis by gas chromatography, it was confirmed that the raw material acryloyloxypropyltrimethoxysilane was not remaining at all.

A thermally crosslinking fluorine-containing polymer (13 g) having a refractive index of 1.42 (JN-7228, solid content concentration: 6%, produced by JSR), 1.3 g of a silica sol (silica, product differing in the particle size from MEK-ST, average particle diameter: 45 nm, solid content concentration: 30%, produced by Nissan Chemicals Industries, Ltd.), 0.6 g of Sol Solution a prepared above, 5 g of methyl ethyl ketone and 0.6 g of cyclohexanone were added and stirred, and the resulting solution was filtered through a polypropylene-made filter having a pore size of 1 μm to prepare a coating solution for the low refractive index layer.

<2-2-3>
<Production of Transparent Protective Film 01 with Antireflection Layer>

A 80 μm-thick triacetyl cellulose film (TAC-TD80U, produced by Fuji Photo Film Co., Ltd.; corresponding to TAC2 of FIG. 2) was unrolled, and the coating solution for the functional layer (light scattering layer) prepared above was coated by using a 50 mm-diameter microgravure roll having a gravure pattern with a line number of 180 lines/inch and a depth of 40 μm and also using a doctor blade, under the conditions such that the rotation number of gravure roll was 30 rpm and the transportation rate was 30 m/min. The resulting coated layer was dried at 60° C. for 150 seconds and then cured under ultraviolet irradiation at an illuminance of 400 mW/cm$^2$ and a dose of 250 mJ/cm$^2$ by using an air-cooled metal halide lamp of 160 W/cm (manufactured by I-Graphics K.K.) in nitrogen purging to form a functional layer having a thickness of 6 μm. The obtained film was taken up.

The triacetyl cellulose film having provided thereon the functional layer (light scattering layer) was again unrolled, and the coating solution for the low refractive index layer prepared above was coated on the light scattering side by using a 50 mm-diameter microgravure roll having a gravure pattern with a line number of 180 lines/inch and a depth of 40 μm and also using a doctor blade, under the conditions such that the rotation number of gravure roll was 30 rpm and the transportation rate was 15 m/min. The resulting coated layer was dried at 120° C. for 150 seconds, further dried at 140° C. for 8 minutes and then irradiated with ultraviolet rays at an illuminance of 400 mW/cm$^2$ and a dose of 900 mJ/cm$^2$ by using an air-cooled metal halide lamp of 240 W/cm (manufactured by I-Graphics K.K.) in nitrogen purging to form a low refractive index layer having a thickness of 100 nm. The obtained film (corresponding to functional film/TAC2 of FIG. 2) was taken up.

<2-3-1>
(Production of Polarizing Plate 02)

Iodine was adsorbed to a stretched polyvinyl alcohol film to produce a polarizer.

The produced transparent protective film 01 with antireflection layer (corresponding to functional film/TAC2 of FIG. 2) was subjected to the same saponification as performed in the (Production of Polarizing Plate 01), and the side not having a functional film was laminated on one side of the polarizer by using a polyvinyl alcohol-based adhesive.

The cellulose acylate film produced in Example 1 (from 1-1 to 1-88, 1-2c and 1-3c; corresponding to TAC1 of FIG. 1) was subjected to the same saponification treatment and laminated on the opposite side of the polarizer by using a polyvinyl alcohol-based adhesive to obtain a polarizing plate having a constitution shown in FIG. 2.

The transmission axis of the polarizer was disposed to run in parallel with the slow axis of the cellulose acylate film produced in Example 1 (FIG. 1). The transmission axis of the polarizer and the slow axis of the commercially available cellulose triacetate film were disposed to cross each other at right angles. In this way, Polarizing Plates 02 (B1-1 to B1-88, B1-2c and B1-3c; polarizing plate integrated with functional film and optical compensatory film (FIG. 2)) were produced.

The spectral reflectance at an incident angle of 5° in the wavelength region of 380 to 780 nm was measured from the functional film side by using a spectrophotometer (manufactured by JASCO Corporation), and the integrating sphere average reflectance in the range from 450 to 650 nm was determined and found to be 2.3%.

The polarizing plate combined such that the optical compensatory film came to the inner side of the polarizer was measured on the single plate transmittance TT, parallel transmittance PT and cross transmittance CT in the range of 380 to 780 nm by using a spectrophotometer (UV3100PC), and the average value in the region of 400 to 700 nm was determined, as a result, TT was from 40.8 to 44.7, PT was from 4 to 38.8, CT was 1.0 or less and polarization degree P was 99.99 to 99.97.

When the cross transmittance at a wavelength of λ is represented by T(λ), T(380), T(410) and T(700) were 1.0 or less, 0.08 or less, and 0.45 or less, respectively.

Also, in the endurance test of polarizing plate at 60° C.–95% RH for 500 hours, all samples satisfied the conditions of $-0.1 \leq \Delta CT \leq 0.2$ and $-2.0 \leq \Delta P \leq 0$, in the test at 60° C.–90% RH, the results were $-0.05 \leq \Delta CT \leq 0.15$ and $-1.5 \leq \Delta P \leq 0$, and in the test at 80° C. for 500 hours, the results were $-0.05 \leq \Delta CT \leq 0.15$ and $-1.5 \leq \Delta P \leq 0$.

<2-4-1>
(Preparation of Coating Solution for Hard Coat Layer)

To 750.0 parts by mass of trimethylolpropane triacrylate (TMPTA, produced by Nippon Kayaku Co., Ltd.), 270.0 parts by mass of poly(glycidyl methacrylate) having a mass average molecular weight of 3,000, 730.0 g of methyl ethyl ketone, 500.0 g of cyclohexanone and 50.0 g of a photopolymerization initiator (Irgacure 184, produced by Nippon Ciba Geigy) were added and stirred. The resulting solution was filtered through a polypropylene-made filter having a pore size of 0.4 μm to prepare a coating solution for the hard coat layer.

<2-4-2>
(Preparation of Liquid Dispersion of Titanium Dioxide Fine Particle>

The titanium dioxide fine particle used was a titanium dioxide fine particle containing cobalt and being surface-treated with aluminum hydroxide and zirconium hydroxide (MPT-129, produced by Ishihara Sangyo Kaisha, Ltd.).

After adding 38.6 g of a dispersant shown below and 704.3 g of cyclohexanone to 257.1 g of this particle, the resulting mixture was dispersed by a Dyno mill to prepare a titanium dioxide liquid dispersion having a mass average diameter of 70 nm.

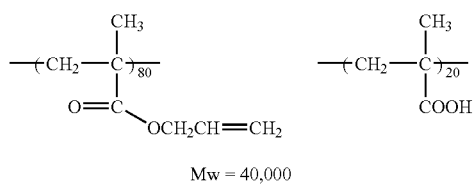

Mw = 40,000

<2-4-3>
(Preparation of Coating Solution for Medium Refractive Index Layer)

To 88.9 g of the titanium dioxide liquid dispersion prepared above, 58.4 g of a mixture (DPHA) of dipentaerythritol pentaacrylate and dipentaerythritol hexaacrylate, 3.1 g of a photopolymerization initiator (Irgacure 907), 1.1 g of a photosensitizer (Kayacure DETX, produced by Nippon Kayaku Co., Ltd.), 482.4 g of methyl ethyl ketone and 1,869.8 g of cyclohexanone were added and stirred. After thorough stirring, the resulting solution was filtered through a polypropylene-made filter having a pore size of 0.4 μm to prepare a coating solution for the medium refractive index layer.

<2-4-4>
(Preparation of Coating Solution for High Refractive Index Layer)

To 586.8 g of the titanium dioxide liquid dispersion prepared above, 47.9 g of a mixture (DPHA, produced by Nippon Kayaku Co., Ltd.) of dipentaerythritol pentaacrylate and dipentaerythritol hexaacrylate, 4.0 g of a photopolymerization initiator (Irgacure 907, produced by Nippon Ciba Geigy), 1.3 g of a photosensitizer (Kayacure DETX, produced by Nippon Kayaku Co., Ltd.), 455.8 g of methyl ethyl ketone and 1,427.8 g of cyclohexanone were added and stirred. The resulting solution was filtered through a polypropylene-made filter having a pore size of 0.4 μm to prepare a coating solution for the high refractive index layer.

<2-4-5>
(Preparation of Coating Solution for Low Refractive Index Layer)

Copolymer (P-1) shown below was dissolved in methyl isobutyl ketone to a concentration of 7 mass % and thereto, a terminal methacrylate group-containing silicon resin X-22-164C (produced by Shin-Etsu Chemical Co., Ltd.) in an amount of 3% based on the solid content and a photoradical generator Irgacure 907 (trade name) in an amount of 5 mass % based on the solid content were added to prepare a coating solution for the low refractive index layer.

P-1:

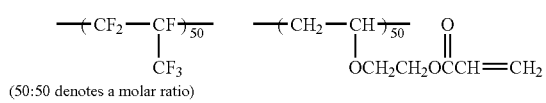

(50:50 denotes a molar ratio)

<2-4-6>
(Production of Transparent Protective Film 02 with Antireflection Layer)

On a 80 μm-thick triacetyl cellulose film (TD-80UF, produced by Fuji Photo Film Co., Ltd.), the coating solution for the hard coat layer was coated by a gravure coater. After drying at 100° C., the resulting coated layer was cured under ultraviolet irradiation at an illuminance of 400 mW/cm$^2$ and a dose of 300 mJ/cm$^2$ by using an air-cooled metal halide lamp of 160 W/cm (manufactured by I-Graphics K.K.) while effecting nitrogen purging to give an atmosphere having an oxygen concentration of 1.0 vol % or less, whereby a hard coat layer having a thickness of 8 μm was formed.

On the hard coat layer, the coating solution for the medium refractive index layer, the coating solution for the high refractive index layer and the coating solution for the low refractive index layer were continuously coated by using a gravure coater having three coating stations.

The drying conditions for the medium refractive index layer were 100° C. and 2 minutes, and the UV curing conditions were such that an air-cooled metal halide lamp of 180 W/cm$^2$ (manufactured by I-Graphics K.K.) was used while effecting nitrogen purging to give an atmosphere having an oxygen concentration of 1.0 vol % or less, and the illuminance and the dose were 400 mW/cm$^2$ and 400 mJ/cm$^2$, respectively. The medium refractive index layer after curing had a refractive index of 1.630 and a film thickness of 67 nm.

The drying conditions for both the high refractive index layer and the low refractive index layer were 90° C. for 1 minute and then 100° C. for 1 minute, and the UV curing conditions were such that an air-cooled metal halide lamp of 240 W/cm$^2$ (manufactured by I-Graphics K.K.) was used while effecting nitrogen purging to give an atmosphere having an oxygen concentration of 1.0 vol % or less, and the illuminance and the dose were 600 mW/cm$^2$ and 600 mJ/cm$^2$, respectively.

The high refractive index layer after curing had a refractive index of 1.905 and a film thickness of 107 nm, and the low refractive index layer had a refractive index of 1.440 and a film thickness of 85 nm. In this way, a transparent protective 02 with antireflection layer was produced (corresponding to functional film/TAC2 of FIG. 2).

<2-5-1>
(Production of Polarizing Plate 03)

A polarizing plate 03 (C1-1 to C1-88, C1-2c and C1-3c; polarizing plate integrated with functional film and optical compensatory film (the polarizing plate shown in FIG. 2)) was produced in the same manner as in <2-3-1> except for using the transparent protective 02 with antireflection layer in place of the transparent protective film 01 with antireflection layer.

The spectral reflectance at an incident angle of 5° in the wavelength region of 380 to 780 nm was measured from the functional film side by using a spectrophotometer (manufactured by JASCO Corporation), and the integrating sphere average reflectance in the range from 450 to 650 nm was determined and found to be 0.4%.

Example 3

(Mounting to Panel)
<3-0-1>
(Mounting to TN Panel)

A pair of polarizing plates provided in a liquid crystal display device (6E-A3, manufactured by Sharp Corporation) using a TN-mode liquid crystal cell were removed, and Polarizing Plate A1-11 or A1-2c produced in Example 2 was laminated instead such that the film produced in Example 1 came to the liquid crystal cell side (in Polarizing Plates A1-11 and A1-2c, the slow axis of the film was agreeing with the absorption axis of the polarizer). After each panel was aged at ambient temperature/humidity (25° C.–10% RH or 25° C.–80% RH), the contrast of the panel using Polarizing Plate A1-2c was seriously decreased in either condition as compared with the panel using Polarizing Plate A1-11, and the panel using Polarizing Plate A1-16 exhibited excellent viewing angle property. This reveals that when the polarizing plate is aged, each optical property is varied due to change in the ambient humidity and the variation thereof is smaller in A1-11 than in A1-2c, as a result, the contrast of the panel is less decreased.

Example 3-1

(Mounting to VA Panel) (Two-Sheet Type)

A liquid crystal display device of FIG. 3 was produced. That is, an upper polarizing plate (TAC2 (with or without functional film), polarizer, TAC1), a VA-mode liquid crystal cell (upper substrate, liquid crystal layer, lower substrate) and a lower polarizing plate (TAC1, polarizer, TAC2) were stacked in this order from the viewing direction (upper side), and a backlight source was further disposed.

<Production of Liquid Crystal Cell>

The liquid crystal cell was produced by setting the cell gap between the substrates to 3.6 μm, dropping and injecting a liquid crystal material ("MLC6608", produced by Merck) with a negative dielectric anisotropy between the substrates, and enclosing it to form a liquid crystal layer between the substrates. The retardation (that is, a product Δn·d of the thickness d (μm) and the refractive index anisotropy Δn of the liquid crystal layer) of the liquid crystal layer was set to 300 nm. Incidentally, the liquid crystal material was oriented in the vertical alignment.

As the upper and lower polarizing plates of a liquid crystal display device (FIG. 3) using the vertically aligned liquid crystal cell produced above, one sheet of the polarizing plate (A1-21, A1-24, A1-25, A1-31, A1-37, A1-38) produced in <2-1-1> of Example 2 by using the optical compensatory sheet (1-21, 1-24, 1-25, 1-31, 1-37, 1-38) produced in Example 1 was laminated through a pressure-sensitive adhesive on both the viewer side and the backlight side such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

As seen from Table 9 below, the liquid crystal display device of the present invention comprising the polarizing plate of the present invention could realize a wide viewing angle.

Example 3-2

In a liquid crystal display device (FIG. 3) using the vertically aligned liquid crystal cell produced above, one sheet of the polarizing plate (A1-21, A1-24, A1-25, A1-31, A1-37, A1-38) produced in <2-1-1> of Example 2 using the optical compensatory sheet (1-21, 1-24, 1-25, 1-31, 1-37, 1-38) produced in Example 1, which was used for the lower polarizing plate, and one sheet of the polarizing plate (B1-21, B1-24, B1-25, B1-31, B1-37, B1-38) produced in <2-3-1> of Example 2, which was used for the upper polarizing plate, were laminated through a pressure-sensitive adhesive, one on the viewer side and another on the backlight side, such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

As seen from Table 9 below, the liquid crystal display device of the present invention comprising the polarizing plate of the present invention could realize a wide viewing angle.

Example 3-3

In a liquid crystal display device (FIG. 3) using the vertically aligned liquid crystal cell produced above, one sheet of the polarizing plate (A1-21, A1-24, A1-25, A1-31, A1-37, A1-38) produced in <2-1-1> of Example 2 using the optical compensatory sheet (1-21, 1-24, 1-25, 1-31, 1-37, 1-38) produced in Example 1, which was used as for lower polarizing plate, and one sheet of the polarizing plate (C1-21, C1-24, C1-25, C1-31, C1-37, C1-38) produced in <2-5-1> of Example 2, which was used as for upper polarizing plate, were laminated through a pressure-sensitive adhesive, one on the viewer side and another on the backlight side, such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

As seen from Table 9 below, the liquid crystal display device of the present invention comprising the polarizing plate of the present invention could realize a wide viewing angle.

Comparative Example 3-1

As the upper and lower polarizing plates of a liquid crystal display device (FIG. 3) using the vertically aligned liquid crystal cell, one sheet of the polarizing plate (A1-2c, A1-3c) produced in <2-1-1> of Example 2 by using the optical compensatory sheet (1-2c, 1-3c) produced in Comparative Example was laminated through a pressure-sensitive adhesive on both the viewer side and the backlight side such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

The results are shown in Table 9. It is seen that the viewing angle is narrow as compared with the liquid crystal display device using the polarizing plate of the present invention.

Comparative Example 3-2

In a liquid crystal display device (FIG. 3) using the vertically aligned liquid crystal cell, one sheet of the polarizing plate (A1-2c, A1-3c) produced in <2-1-1> of Example 2 using the optical compensatory sheet (1-2c, 1-3c) produced in Example 1, which was used as for lower polarizing plate, and one sheet of the polarizing plate (B1-2c, B1-3c) produced in <2-3-1> of Example 2, which was used as for upper polarizing plate, were laminated through a pressure-sensitive adhesive, one on the viewer side and another on the backlight side, such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

The results are shown in Table 9. It is seen that the viewing angle is narrow as compared with the liquid crystal display device using the polarizing plate of the present invention.

Comparative Example 3-3

In a liquid crystal display device (FIG. 3) using the vertically aligned liquid crystal cell, one sheet of the polarizing plate (A1-2c, A1-3c) produced in <2-1-1> of Example 2 using the optical compensatory sheet (1-2c, 1-3c) produced in Example 1, which was used as for lower polarizing plate, and one sheet of the polarizing plate (C1-2c, C1-3c) produced in <2-5-1> of Example 2, which was used as for upper polarizing plate, were laminated through a pressure-sensitive adhesive, one on the viewer side and another on the backlight side, such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display-device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

The results are shown in Table 9. It is seen that the viewing angle is narrow as compared with the liquid crystal display device using the polarizing plate of the present invention.

TABLE 9

| Liquid Crystal Display Device | Viewing Angle | |
|---|---|---|
| | Transmission Axis Direction | Direction at 45° from Transmission Axis |
| Example 3-1 | >80° | >80° |
| Example 3-2 | >80° | >80° |
| Example 3-3 | >80° | >80° |
| Comparative Example 3-1 | 74° | 69° |
| Comparative Example 3-2 | 76° | 71° |
| Comparative Example 3-3 | 75° | 70° |

Example 3-4

(Mounting to VA Panel) (One-Sheet Type)

A liquid crystal display device of FIG. 3 was produced. That is, an upper polarizing plate (TAC2 (with or without functional film), polarizer, TAC1), a VA-mode liquid crystal cell (upper substrate, liquid crystal layer, lower substrate) and a lower polarizing plate (TAC1, polarizer, TAC2) were stacked in this order from the viewing direction (upper side), and a backlight source was further disposed. In the following Examples, a commercially available polarizing plate (HLC2-5618) was used for the upper polarizing plate, and an optical compensatory film-integrated polarizing plate was used for the lower polarizing plate.

<Production of Liquid Crystal Cell>

The liquid crystal cell was produced by setting the cell gap between the substrates to 3.6 μm, dropping and injecting a liquid crystal material ("MLC6608", produced by Merck) with a negative dielectric anisotropy between the substrates, and enclosing it to form a liquid crystal layer between the substrates. The retardation (that is, a product Δn·d of the thickness d (μm) and the refractive index anisotropy Δn of the liquid crystal layer) of the liquid crystal layer was set to 300 nm. Incidentally, the liquid crystal material was oriented in the vertical alignment.

In a liquid crystal display device (FIG. 3) using the vertically aligned liquid crystal cell produced above, one sheet of a commercially available super-high contrast product (HLC2-5618, manufactured by Sanritz Corporation), which was used for the upper polarizing plate, and one sheet of the polarizing plate (A1-31, A1-37, A1-38, A1-75, A1-76, A1-82, A1-83) produced in <2-1-1> of Example 2 by using the optical compensatory sheet (1-31, 1-37, 1-38, 1-75, 1-76, 1-82, 1-83) produced in Example 1, which was used for the lower polarizing plate, were laminated through a pressure-sensitive adhesive, one on the viewer side and another on the backlight side, such that the cellulose acylate film (TAC1) produced in Example 1 came to the liquid crystal cell side. At this time, a cross-Nicol arrangement was employed such that the transmission axis of the polarizing plate on the viewer side ran in the vertical direction and the transmission axis of the polarizing plate on the backlight side ran in the horizontal direction.

The fabricated liquid crystal display device was observed, as a result, a neutral black display was being realized in the frontal direction as well as in the viewing angle direction. Also, the viewing angle in 8 steps from black display (L1) to white display (L8) (the range where the contrast ratio was 10 or more and the black side was free from gradation reversal) was measured by using a measuring apparatus (EZ-Contrast 160D, manufactured by ELDIM).

As seen from Table 10 below, the liquid crystal display device of the present invention comprising the polarizing plate of the present invention could realize a wide viewing angle.

Comparative Example 3-4

The production was performed thoroughly in the same manner as in Example 3-4 except for changing the lower polarizing plate of Example 3-4 to Polarizing Plate A1-2c or A1-3c.

The results are shown in Table 10. It is seen that the viewing angle is narrow as compared with the liquid crystal display device using the polarizing plate of the present invention.

TABLE 10

| Liquid Crystal Display Device | Viewing Angle | |
|---|---|---|
| | Transmission Axis Direction | Direction at 45° from Transmission Axis |
| Example 3-4 | >80° | >80° |
| Comparative Example 3-4 | 74° | 71° |

Example 3-8

Mounting of a film in a liquid crystal display device was performed in the same manner as in Example 3-4 except that the films (2-37, 2-82) produced in Example 3-5, the films (3-37, 3-82) produced in Example 3-6 and the films (4-37, 4-82) produced in Example 3-7 were used in place of Films 1-31, 1-37, 1-38, 1-75, 1-76, 1-82 and 1-83 of Example 3-4. As seen in the Table 11 below, the variation of the black color tint changed when obliquely viewed was smaller than that of Example 3-4 and good display properties were obtained.

TABLE 11

| | Change in Color Tint |
|---|---|
| Example 3-5 | ○ △ |
| Example 3-6 | ○ |
| Example 3-7 | ◎ |
| Example 3-4 | △ |

Change in black color tine when obliquely viewed:
◎: Change in color tint was very small.
○: Change in color tint was slightly observed but negligible.
○ △: Change in color tint was moderately observed and not negligible.
△: Change in color tine was seriously observed.

This application is based on Japanese Patent application JP 2004-145294, filed May 14, 2004, and Japanese Patent application JP 2004-175904, filed Jun. 14, 2004, the entire contents of which are hereby incorporated by reference, the same as if set forth at length.

The invention claimed is:

1. An optical cellulose acylate film comprising a polymer component which is a cellulose acylate obtained by substituting hydroxyl groups of a cellulose by an acetyl group and an acyl group having 3 or more carbon atoms, wherein
   (i) a substitution degree A of the acetyl group and a substitution degree B of the acyl group having 3 or more carbon atoms satisfy the following formulae (I) and (II):

$$2.0 \leq A+B \leq 3.0 \tag{I}$$

$$0 < B \tag{II}$$

and
   (ii) an elastic modulus E(MD) in a casting direction and an elastic modulus E(TD) in a casting width direction satisfy the following formulae (III) and (IV):

$$1,500 \text{ MPa} \leq E(MD) \leq 3,400 \text{ Mpa} \tag{III}$$

$$1,200 \text{ MPa} \leq E(TD) \leq 3,400 \text{ Mpa} \tag{IV},$$

wherein Re($\lambda$) and Rth($\lambda$) defined by the following formulae (IX) and (X) satisfy the following formulae (XI) and (XII):

$$Re(\lambda) = (nx - ny) \times d \tag{IX}$$

$$Rth(\lambda) = \{(nx+ny)/2 - nz\} \times d \tag{X}$$

$$30 \text{ nm} < Re_{(590)} \leq 200 \text{ nm} \tag{XI}$$

$$70 \text{ nm} \leq Rth_{(590)} \leq 400 \text{ nm} \tag{XII}$$

wherein Re($\lambda$) is a front retardation value (unit: nm) at a wavelength of $\lambda$ nm, Rth($\lambda$) is a retardation value (unit: nm) in a film thickness direction at a wavelength of $\lambda$ nm, nx is a refractive index in a slow axis direction in a film plane, ny is a refractive index in a fast axis direction in a film plane, nz is a refractive index in a film thickness direction, and d is a thickness of the film, and
   wherein $Re_{(400)}$, $Re_{(550)}$, $Re_{(700)}$, $Rth_{(400)}$, $Rth_{(550)}$ and $Rth_{(700)}$ of the film satisfy the following formulae (D1) and (E1):

$$Re_{(400)} < Re_{(550)} < Re_{(700)} \tag{D1}$$

$$Rth_{(400)} > Rth_{(550)} > Rth_{(700)} \tag{E1}.$$

2. The optical cellulose acylate film according to claim 1, wherein a sound velocity V(MD) in the casting direction and a sound velocity V(TD) in the casting width direction satisfy the following formulae (V) and (VI):

$$1.0 \text{ km/s} \leq V(MD) \leq 3.0 \text{ km/s} \tag{V}$$

$$1.0 \text{ km/s} \leq V(TD) \leq 3.0 \text{ km/s} \tag{VI}.$$

3. The optical cellulose acylate film according to claim 1, wherein the elastic moduli E(MD) and E(TD) satisfy the following formula (VII):

$$0.5 \leq E(MD)/E(TD) \leq 2 \tag{VII}.$$

4. The optical cellulose acylate film according to claim 1, wherein the sound velocities V(MD) and V(TD) satisfy the following formula (VIII):

$$0.5 \leq V(MD)/V(TD) \leq 2 \tag{VIII}.$$

5. The optical cellulose acylate film according to claim 1, which comprises a retardation-expressing agent which is at least one of a rod-like compound and a discotic compound.

6. The optical cellulose acylate film as claimed in claim 1, wherein the acyl group is a butanoyl group.

7. The optical cellulose acylate film according to claim 1, wherein the acyl group is a propionyl group and the substitution degree B is 0.6 or more.

8. The optical cellulose acylate film according to claim 1, wherein $Re_{(590)}$ and $Rth_{(590)}$ satisfy the following formulae (XIII) and (XIV):

$$40 \leq Re_{(590)} \leq 100 \quad \text{(XIII)}$$

$$170\,nm \leq Rth_{(590)} \leq 300\,nm \quad \text{(XIV)}.$$

9. The optical cellulose acylate film according to claim 1, wherein $Re_{(630)}$ and $Rth_{(630)}$ measured at 25° C. and an ambient humidity of 60% RH satisfy the following formulae (A) to (C):

$$46 \leq Re_{(630)} \leq 150 \quad \text{(A)}$$

$$Rth_{(630)} = a - 5.9 Re_{(630)} \quad \text{(B)}$$

$$580 \leq a \leq 670 \quad \text{(C)}$$

wherein a is an adjustment factor (unit: nm) of optical property.

10. The optical cellulose acylate film according to claim 1, wherein a difference ΔRe between a Re value at 25° C.–10% RH and a Re value at 25° C.–80% RH is from 0 to 10 nm and a difference ΔRth between a Rth value at 25° C.–10% RH and a Rth value at 25° C.–80% RH is from 0 to 30 nm.

11. The optical cellulose acylate film according to claim 1, wherein a $Re_{(590)}$ distribution is adjusted to 5% or less.

12. The optical cellulose acylate film according to claim 1, wherein a $Re_{(590)}$ distribution is adjusted to 10% or less.

13. The optical cellulose acylate film according to claim 1, which has a moisture permeability in terms of moisture permeability with a film thickness of 80 μm at 60° C.–95% RH for 24 hours is from 400 to 3,500 g/m²·24 hr.

14. The optical cellulose acylate film according to claim 1, which comprises at least one member of a plasticizer, an ultraviolet absorbent and a separation accelerator.

15. The optical cellulose acylate film according to claim 1, wherein the film has a thickness of from 40 to 180 μm.

16. The optical cellulose acylate film according to claim 1, which is stretched by a monoaxial stretching method, a simultaneous biaxial stretching method or a successive biaxial stretching method.

17. The optical cellulose acylate film according to claim 1, which is stretched at a temperature higher than the glass transition temperature of the film by 30 to 100° C.

18. The optical cellulose acylate film according to claim 1, wherein assuming that a maximum value, a minimum value and an average value of a thickness of the film in a width direction are Rmax, Rmin and Rave, respectively, a film thickness distribution R calculated according to R (%)= [(Rmax−Rmin)/Rave]×100 is adjusted to 0 to 8%.

19. A polarizing plate comprising a polarizer and two protective films for the polarizer, wherein at least one of the protective films comprises the optical cellulose acylate film according to claim 1.

20. The polarizing plate according to claim 19, wherein a single plate transmittance TT, a parallel transmittance PT, a cross transmittance CT and a polarization degree P of the polarizing plate as measured at 25° C.–60% RH satisfy at least one of the following formulae (a) to (d):

$$40.0 \leq TT \leq 45.0 \quad \text{(a)}$$

$$30.0 \leq PT \leq 40.0 \quad \text{(b)}$$

$$CT \leq 2.0 \quad \text{(c)}$$

$$95.0 \leq P \quad \text{(d)}.$$

21. The polarizing plate according to claim 19, wherein assuming that the cross transmittance at a wavelength of λ is T(λ), T(380), T(410) and T(700) satisfy at least one of the following formulae (e) to (g):

$$T(380) \leq 2.0 \quad \text{(e)}$$

$$T(410) \leq 0.1 \quad \text{(f)}$$

$$T(700) \leq 0.5 \quad \text{(g)}.$$

22. The polarizing plate according to claim 19, wherein when the polarizing plate is left standing at 60° C.–95% RH for 500 hours, a variation ΔCT of single plate cross transmittance and a variation ΔP of polarization degree satisfy at least one of the following formulae (j) and (k):

$$-6.0 \leq \Delta CT \leq 6.0 \quad \text{(j)}$$

$$-10.0 \leq \Delta P \leq 0.0 \quad \text{(k)}.$$

23. The polarizing plate according to claim 19, wherein at least one of a hard coat layer, an antiglare layer and an antireflection layer is provided on a surface of one of the protective films.

24. A liquid crystal display device comprising the polarizing plate according to claim 19.

25. An OCB- or VA-mode liquid crystal display device comprising the polarizing plate according to claim 19 provided on a top and bottom of a cell.

26. A VA-mode liquid crystal display device comprising the polarizing plate according to claim 19 on a backlight side.

* * * * *